United States Patent
Greifeneder et al.

(10) Patent No.: US 9,811,362 B2
(45) Date of Patent: *Nov. 7, 2017

(54) METHOD AND SYSTEM FOR TRANSACTION CONTROLLED SAMPLING OF DISTRIBUTED HETEROGENEOUS TRANSACTIONS WITHOUT SOURCE CODE MODIFICATIONS

(71) Applicant: Dynatrace Software GmbH, Linz (AT)

(72) Inventors: Bernd Greifeneder, Linz (AT); Christian Schwarzbauer, Linz (AT); Stefan Chiettini, St. Georgen an der Gusen (AT); Jurgen Richtsfeld, Linz (AT); Erich Georg Hochmuth, Linz (AT)

(73) Assignee: Dynatrace Software GmbH, Linz (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,302

(22) Filed: Feb. 29, 2016

(65) Prior Publication Data

US 2016/0314005 A1     Oct. 27, 2016

Related U.S. Application Data

(63) Continuation of application No. 13/455,764, filed on Apr. 25, 2012, now Pat. No. 9,274,919.
(Continued)

(51) Int. Cl.
  *G06F 9/455*    (2006.01)
  *G06F 11/30*    (2006.01)
  *G06F 11/34*    (2006.01)

(52) U.S. Cl.
  CPC ...... *G06F 9/45504* (2013.01); *G06F 11/3409* (2013.01); *G06F 11/3419* (2013.01);
  (Continued)

(58) Field of Classification Search
  None
  See application file for complete search history.

(56) References Cited

U.S. PATENT DOCUMENTS 5,432,932 A    7/1995   Chen et al.
5,727,147 A    3/1998   van Hoff
(Continued)

OTHER PUBLICATIONS

Michael Dunlavey, Performance Tuning with Instruction-Level Cost Derived from Call-Stack Sampling, 2007, ACM, SIGPLAN Notices, vol. 42(8), pp. 1-5.*
(Continued)

*Primary Examiner* — Abu Ghaffari
(74) *Attorney, Agent, or Firm* — Harness, Dickey & Pierce, P.L.C.

(57) ABSTRACT

A system and method for tracing individual transactions on method call granularity is disclosed. The system uses instrumentation based transaction tracing mechanisms to enhance thread call stack sampling mechanisms by a) only sampling threads executing monitored transactions while execution is ongoing b) tagging sampled call stacks with a transaction identifier for correlation of sampled call stacks with instrumentation bases tracing data. The combination of instrumentation based tracing with thread call stack sampling reduces sampling generated overhead by only sampling relevant thread, and reduces instrumentation generated overhead because it allows reducing instrumentation.

17 Claims, 40 Drawing Sheets

Related U.S. Application Data

(60) Provisional application No. 61/480,689, filed on Apr. 29, 2011, provisional application No. 61/482,642, filed on May 5, 2011, provisional application No. 61/534,490, filed on Sep. 14, 2011.

(52) U.S. Cl.
CPC ...... *G06F 11/3495* (2013.01); *G06F 11/3024* (2013.01); *G06F 11/3476* (2013.01); *G06F 2201/815* (2013.01); *G06F 2201/87* (2013.01)

(56) References Cited

U.S. PATENT DOCUMENTS

| | | | |
|---|---|---|---|
| 5,781,778 A | 7/1998 | Meier et al. | |
| 5,794,046 A | 8/1998 | Meier et al. | |
| 5,819,093 A | 10/1998 | Davidson et al. | |
| 5,867,712 A | 2/1999 | Shaw et al. | |
| 5,933,639 A | 8/1999 | Meier et al. | |
| 5,953,530 A | 9/1999 | Rishi et al. | |
| 6,101,524 A | 8/2000 | Choi et al. | |
| 6,134,603 A | 10/2000 | Jones et al. | |
| 6,145,121 A | 11/2000 | Levy et al. | |
| 6,151,639 A | 11/2000 | Tucker et al. | |
| 6,202,199 B1 | 3/2001 | Wygodny et al. | |
| 6,266,805 B1 | 7/2001 | Nwana et al. | |
| 6,332,212 B1 | 12/2001 | Organ et al. | |
| 6,353,923 B1 | 3/2002 | Bogle et al. | |
| 6,539,541 B1 | 3/2003 | Geva | |
| 6,721,941 B1 | 4/2004 | Morshed et al. | |
| 6,728,949 B1 | 4/2004 | Bryant et al. | |
| 6,754,890 B1 | 6/2004 | Berry et al. | |
| 6,760,903 B1 | 7/2004 | Morshed et al. | |
| 6,795,962 B1 | 9/2004 | Hanson | |
| 6,802,054 B2 | 10/2004 | Faraj | |
| 6,862,711 B1 | 3/2005 | Bahrs et al. | |
| 6,938,246 B2 | 8/2005 | Alford et al. | |
| 6,961,926 B2 | 11/2005 | Koyama | |
| 6,968,540 B2 | 11/2005 | Beck et al. | |
| 6,978,444 B1 | 12/2005 | Farchi et al. | |
| 7,137,120 B2 * | 11/2006 | Armstrong | G06F 11/3466 700/109 |
| 7,143,392 B2 | 11/2006 | Ii et al. | |
| 7,158,924 B2 | 1/2007 | Williams et al. | |
| 7,162,586 B2 * | 1/2007 | Chauvel | G06F 9/30101 711/132 |
| 7,162,710 B1 | 1/2007 | Edwards et al. | |
| 7,263,689 B1 | 8/2007 | Edwards et al. | |
| 7,293,259 B1 | 11/2007 | Dmitriev | |
| 7,293,260 B1 | 11/2007 | Dmitriev | |
| 7,346,632 B2 * | 3/2008 | Bischof | G06F 9/466 |
| 7,367,025 B1 | 4/2008 | Nikolov et al. | |
| 7,376,940 B1 | 5/2008 | Bush et al. | |
| 7,380,239 B1 | 5/2008 | Srivastava et al. | |
| 7,386,839 B1 | 6/2008 | Golender et al. | |
| 7,409,676 B2 | 8/2008 | Agarwal et al. | |
| 7,493,607 B2 | 2/2009 | Moritz | |
| 7,496,903 B2 | 2/2009 | Rees et al. | |
| 7,500,227 B1 | 3/2009 | Fontana et al. | |
| 7,526,760 B1 | 4/2009 | Daynes et al. | |
| 7,606,814 B2 | 10/2009 | Deily et al. | |
| 7,685,183 B2 | 3/2010 | Pace et al. | |
| 7,689,558 B2 | 3/2010 | Rossmann | |
| 7,698,691 B2 | 4/2010 | Chen et al. | |
| 7,707,555 B2 | 4/2010 | Spertus et al. | |
| 7,721,266 B2 | 5/2010 | Frey et al. | |
| 7,765,527 B1 | 7/2010 | Burka et al. | |
| 7,779,390 B1 | 8/2010 | Allavarpu et al. | |
| 7,810,075 B2 | 10/2010 | Dostert et al. | |
| 7,818,721 B2 | 10/2010 | Sundararajan et al. | |
| 7,823,137 B2 * | 10/2010 | Chagoly | G06F 11/3624 717/116 |
| 7,836,438 B1 | 11/2010 | Nikolov | |
| 7,941,789 B2 | 5/2011 | Ivanov et al. | |
| 7,950,004 B2 | 5/2011 | Vieira et al. | |
| 7,957,934 B2 | 6/2011 | Greifeneder | |
| 7,992,133 B1 | 8/2011 | Theroux et al. | |
| 7,992,134 B2 | 8/2011 | Hinchey et al. | |
| 8,032,872 B2 | 10/2011 | Violleau et al. | |
| 8,037,458 B2 | 10/2011 | Shekov | |
| 8,117,599 B2 * | 2/2012 | Edmark | G06F 11/3612 717/127 |
| 8,176,480 B1 | 5/2012 | Spertus | |
| 8,266,595 B2 | 9/2012 | Alexander, III et al. | |
| 8,312,435 B2 | 11/2012 | Wygodny et al. | |
| 8,347,273 B2 * | 1/2013 | Nageshappa | G06F 11/3636 717/127 |
| 8,375,367 B2 | 2/2013 | Briggs | |
| 8,438,427 B2 | 5/2013 | Beck et al. | |
| 8,464,223 B2 | 6/2013 | Choi et al. | |
| 8,539,452 B2 | 9/2013 | Chapman et al. | |
| 8,601,443 B2 | 12/2013 | Barker et al. | |
| 8,938,533 B1 | 1/2015 | Bansal et al. | |
| 9,167,028 B1 * | 10/2015 | Bansal | H04L 43/50 |
| 9,632,817 B2 * | 4/2017 | Emuchay | G06Q 10/06 |
| 2001/0004766 A1 | 6/2001 | Koyama | |
| 2002/0032754 A1 | 3/2002 | Logston et al. | |
| 2002/0174415 A1 | 11/2002 | Hines | |
| 2002/0199173 A1 | 12/2002 | Bowen | |
| 2003/0056200 A1 | 3/2003 | Li et al. | |
| 2003/0097652 A1 * | 5/2003 | Roediger | G06F 8/443 717/160 |
| 2003/0163275 A1 | 8/2003 | Farrell et al. | |
| 2004/0010570 A1 | 1/2004 | Kaler et al. | |
| 2004/0078691 A1 * | 4/2004 | Cirne | G06F 11/3624 714/38.13 |
| 2004/0093588 A1 | 5/2004 | Gschwind et al. | |
| 2005/0039171 A1 | 2/2005 | Avakian et al. | |
| 2005/0039172 A1 | 2/2005 | Rees et al. | |
| 2005/0039186 A1 | 2/2005 | Borkan | |
| 2005/0039187 A1 | 2/2005 | Avakian et al. | |
| 2005/0039190 A1 | 2/2005 | Rees et al. | |
| 2005/0086656 A1 | 4/2005 | Whitlock et al. | |
| 2005/0223048 A1 | 10/2005 | Smith et al. | |
| 2005/0223367 A1 | 10/2005 | Smith et al. | |
| 2005/0278706 A1 | 12/2005 | Garza et al. | |
| 2005/0283522 A1 | 12/2005 | Parkkinen et al. | |
| 2006/0015854 A1 * | 1/2006 | Muhlestein | G06F 9/46 717/130 |
| 2006/0069682 A1 | 3/2006 | Fanous et al. | |
| 2006/0075386 A1 | 4/2006 | Loh et al. | |
| 2006/0195561 A1 | 8/2006 | Keane et al. | |
| 2006/0271395 A1 | 11/2006 | Harris et al. | |
| 2006/0271542 A1 | 11/2006 | Harris et al. | |
| 2006/0271575 A1 | 11/2006 | Harris et al. | |
| 2006/0271930 A1 | 11/2006 | Letizi et al. | |
| 2006/0271931 A1 | 11/2006 | Harris et al. | |
| 2007/0011667 A1 | 1/2007 | Subbiah et al. | |
| 2007/0069005 A1 | 3/2007 | Dickerson et al. | |
| 2007/0088762 A1 | 4/2007 | Harris et al. | |
| 2007/0143323 A1 | 6/2007 | Vanrenen et al. | |
| 2007/0143743 A1 | 6/2007 | Cobb et al. | |
| 2007/0169055 A1 | 7/2007 | Greifeneder | |
| 2007/0180439 A1 | 8/2007 | Sundararajan et al. | |
| 2008/0010289 A1 * | 1/2008 | Markel | H04L 12/24 |
| 2008/0034082 A1 * | 2/2008 | McKinney | G06F 11/3466 709/224 |
| 2008/0148240 A1 | 6/2008 | Jones et al. | |
| 2008/0276227 A1 | 11/2008 | Greifeneder | |
| 2008/0288212 A1 | 11/2008 | Greifeneder | |
| 2008/0288962 A1 | 11/2008 | Greifeneder et al. | |
| 2009/0044198 A1 | 2/2009 | Kuiper et al. | |
| 2009/0049429 A1 | 2/2009 | Greifeneder et al. | |
| 2009/0089550 A1 * | 4/2009 | Cabillic | G06F 11/3636 712/208 |
| 2009/0100154 A1 * | 4/2009 | Stevenson | G06Q 30/02 709/220 |
| 2009/0112559 A1 * | 4/2009 | Christensen | G06F 11/3612 703/17 |
| 2009/0157359 A1 | 6/2009 | Chernoff | |
| 2009/0287729 A1 | 11/2009 | Chen et al. | |
| 2010/0017789 A1 * | 1/2010 | DeWitt, Jr. | G06F 11/3466 717/126 |

(56) References Cited

U.S. PATENT DOCUMENTS

| | | | |
|---|---|---|---|
| 2010/0030983 A1 | 2/2010 | Gupta et al. | |
| 2010/0318648 A1 | 12/2010 | Agrawal et al. | |
| 2011/0016460 A1* | 1/2011 | Archambault | G06F 8/4442 717/158 |
| 2012/0017165 A1 | 1/2012 | Gardner et al. | |
| 2012/0255015 A1 | 10/2012 | Sahita et al. | |
| 2012/0331135 A1* | 12/2012 | Alon | H04L 41/044 709/224 |
| 2014/0068068 A1 | 3/2014 | Bansal et al. | |

OTHER PUBLICATIONS

Walter et al, Advanced Java Bytecode Instrumentation, 2007, ACM, PPPJ 2007, pp. 135-144.*

Andrew Z. Tabona, Windows 2003 performance monitor, p. 1-8, Publish Mar. 29, 2004.

Bebenita etal., "Trace-Based Compilation in Execution Environments without Interpreters," ACM, pp. 59-68, 2010.

Kamdem et al., "Efficiently Rewriting Large Multimedia Application Execution Traces with Few Event Sequences," ACM, pp. 1348-1356, 2013.

Kuang et al.. E AHRW: An energy efficient adaptive hash scheduler for stream processing on multicore servers, IEEE, pp. 45-56, 2011.

Malnati etal., "JThreadSpy: Teaching Multithreading Programming by Analyzing Execution Traces." ACM, pp. 3-13, 2007.

Mikhail Dmitriev, "Design of JFluid: A Profiling Technology and Tool Based on Dynamic Bytecode Instrumentation," Sun Microsystems, 2003, delivery.acm.org/10.1145/1700000/1698171/smli_tr-2003-125.pdf> pp. 1-22.

Mikhail Dmitriev, "Selective Profiling of Java Applications Using Dynamic Bytecode Instrumentation," IEEE, 2004, eeexplore.ieee.org/stamp/stamp.jsp? tp=&arnumber=1291366> pp. 141-151.

Miranskyy et al., "SIFT: A Scalable Iterative-Unfolding Technique for Filtering Execution Traces." ACM, pp. 1-15, 2008.

Ntarmos et al, "Distributed hash sketches: scalable efficient and accurate cardinality estimation for distributed multisets," ACM Trans, on Comput. Sys. vol. 27, No. 1, article 2, pp. 1-52, 2009.

Olivier et al, "Scheduling task parallelism on multi socket multicore systems", ACM ROSS, pp. 49-56, 2011.

Parker Abercrombie etal., "jContractor: Bytecode Instrumentation Techniques for Implementing Design by Contract in Java," UCSB, Aug. 2004, jcontractor.sourceforge.net/doc/jContractor_RV02.pdf> pp. 1-25.

Prabhu et al, "Using thread level speculation to simplify manual parallelization," ACM PPoPP, pp. 1-12,2003.

* cited by examiner

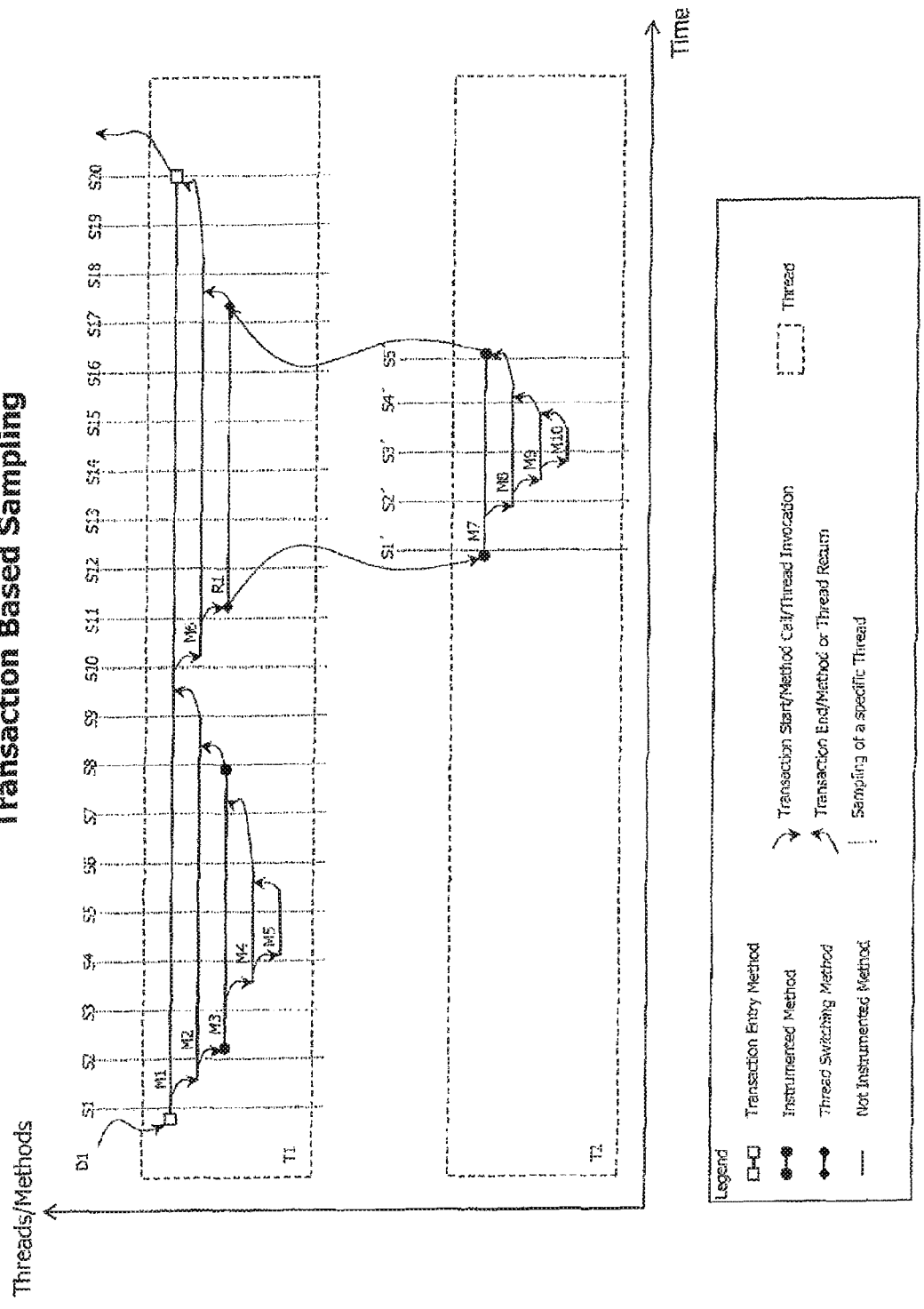

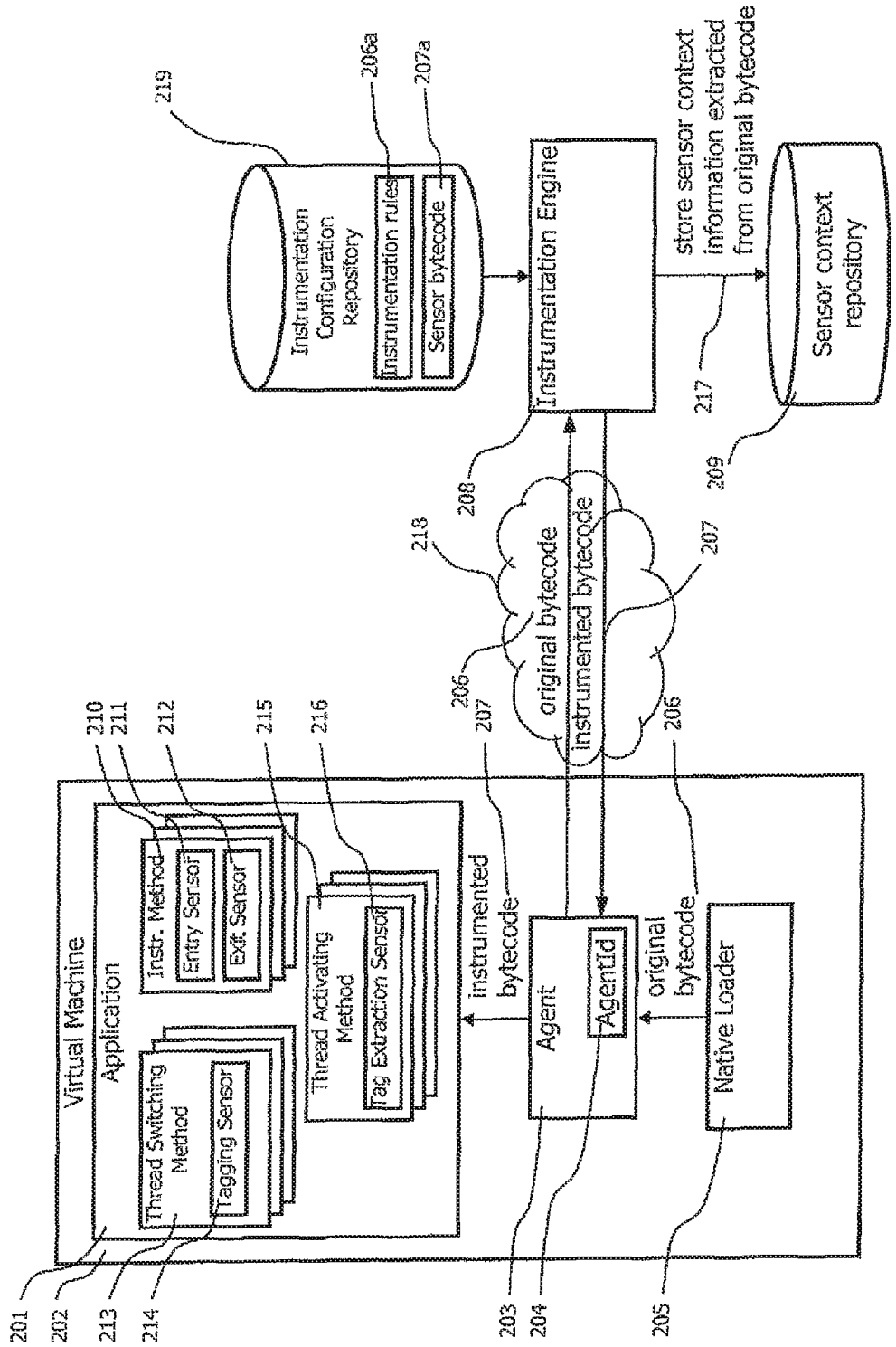

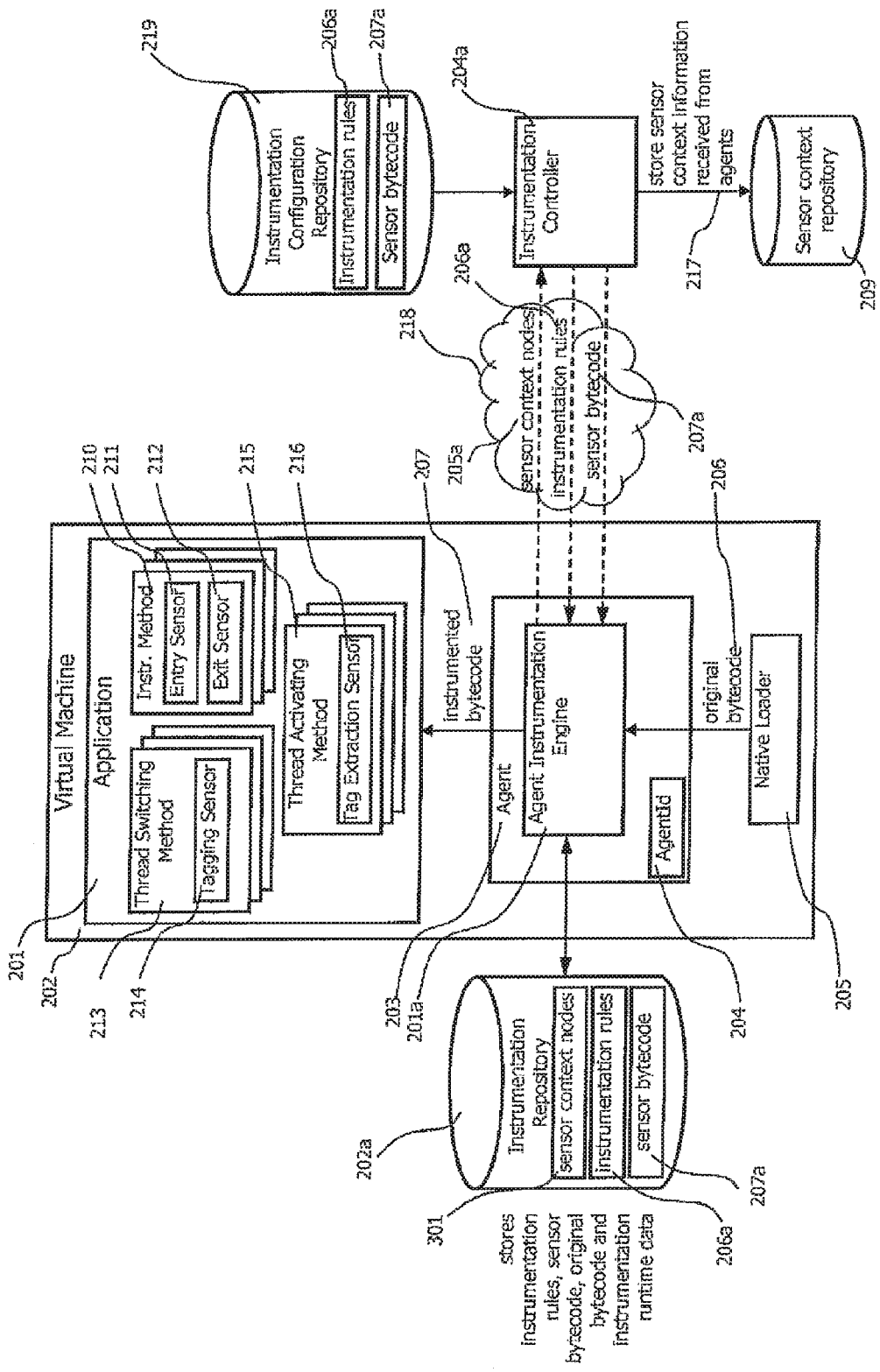

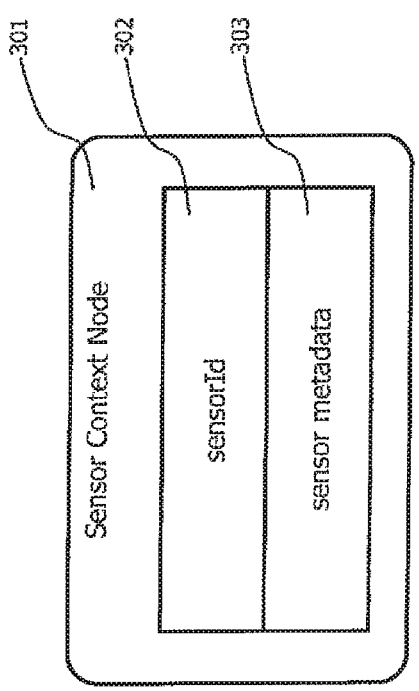
FIG 3: Sensor Context Node

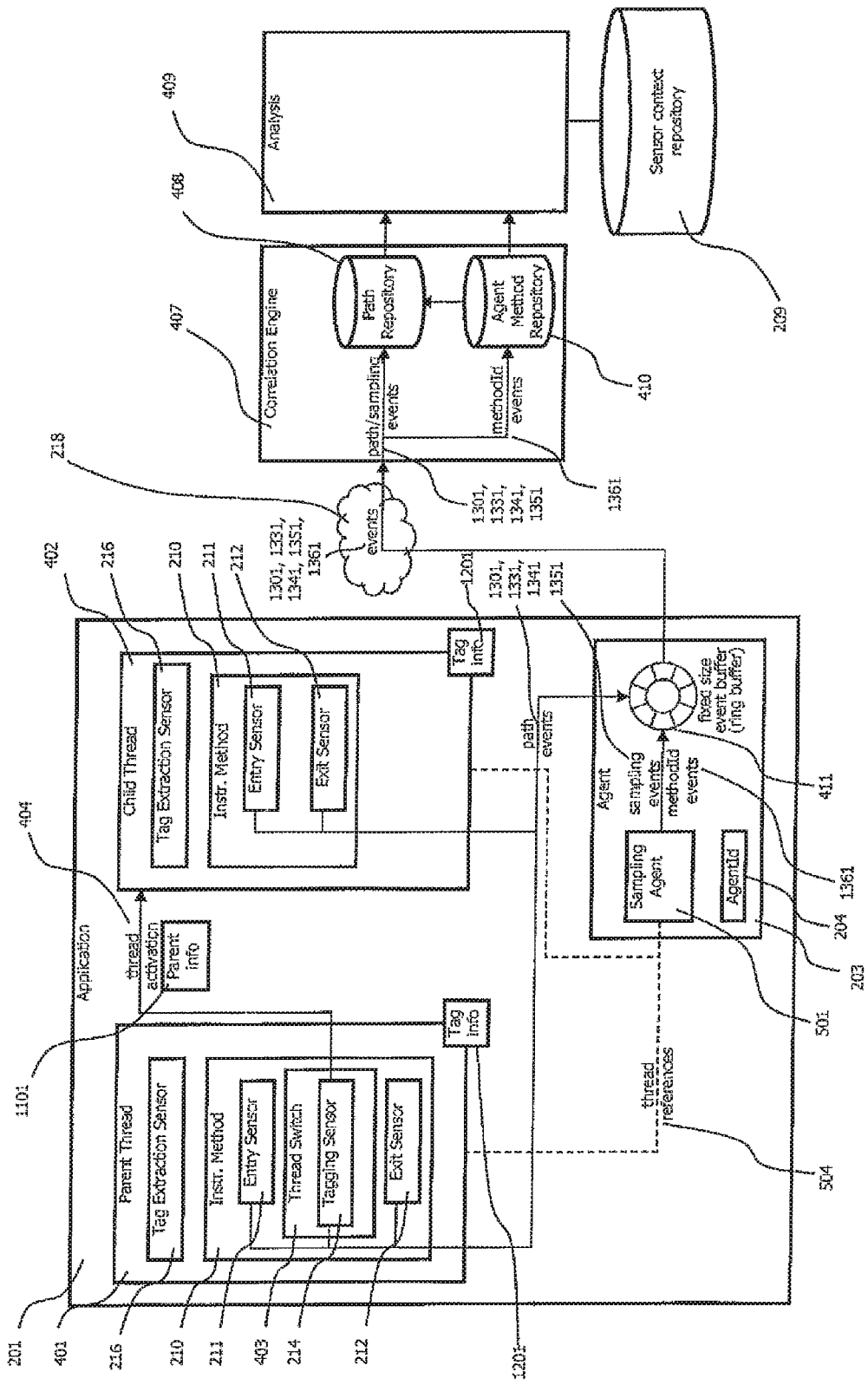
FIG 4: Tracing Transactions over Thread Boundaries

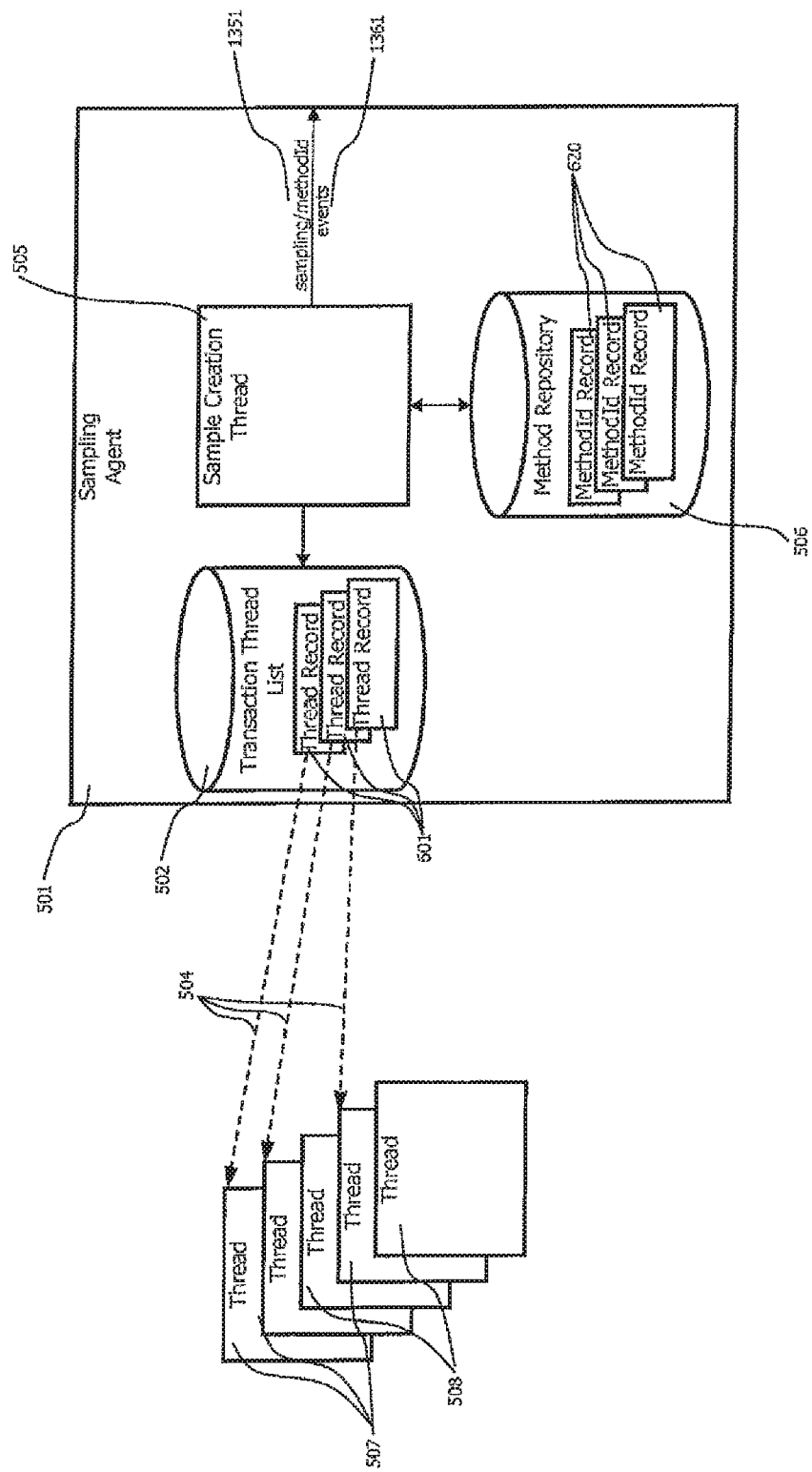

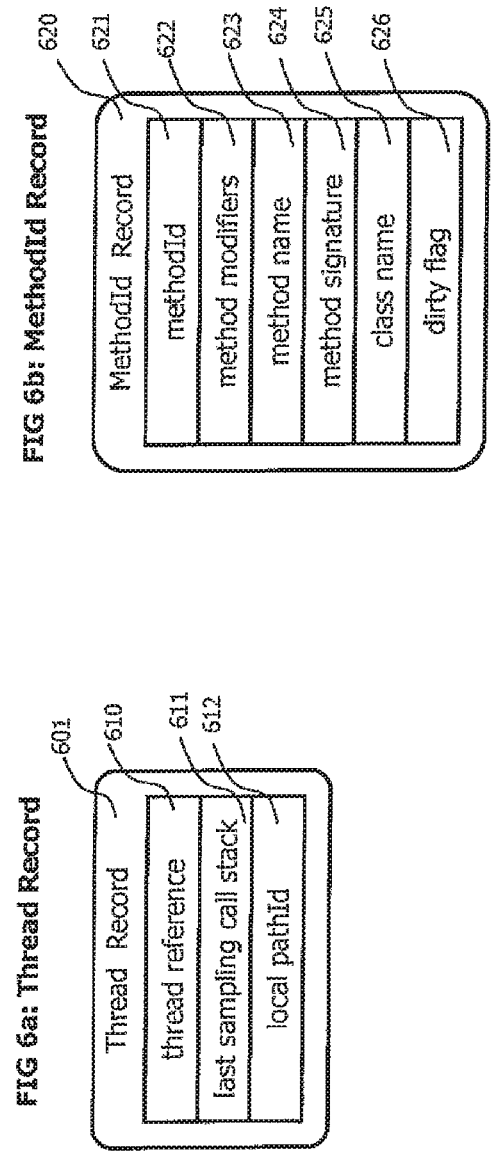

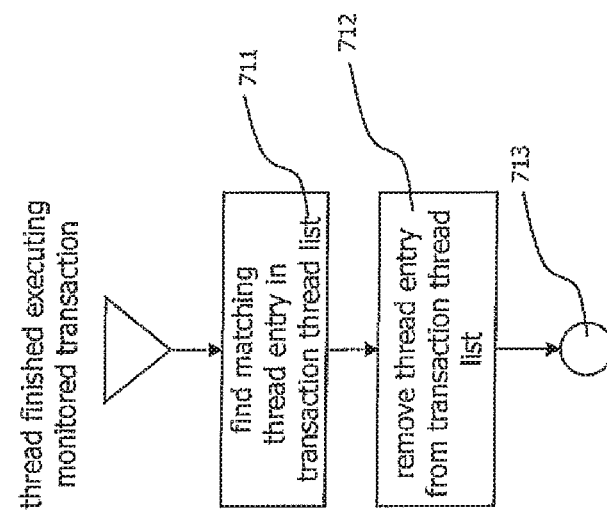
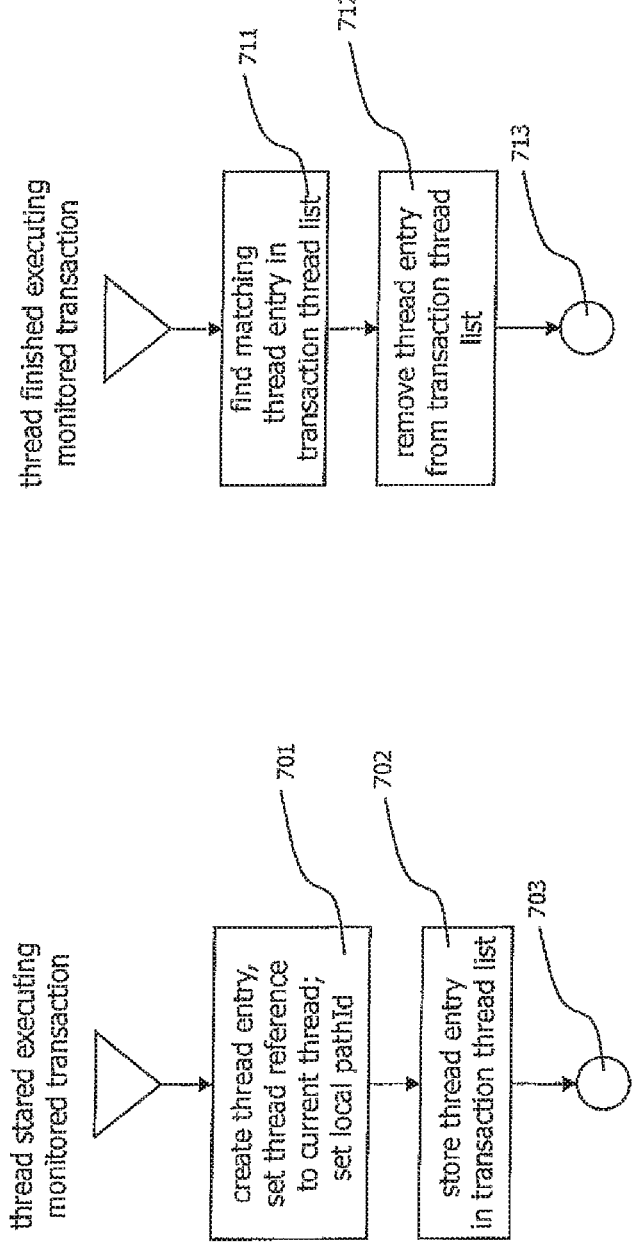
FIG. 7: Transaction Thread Registration

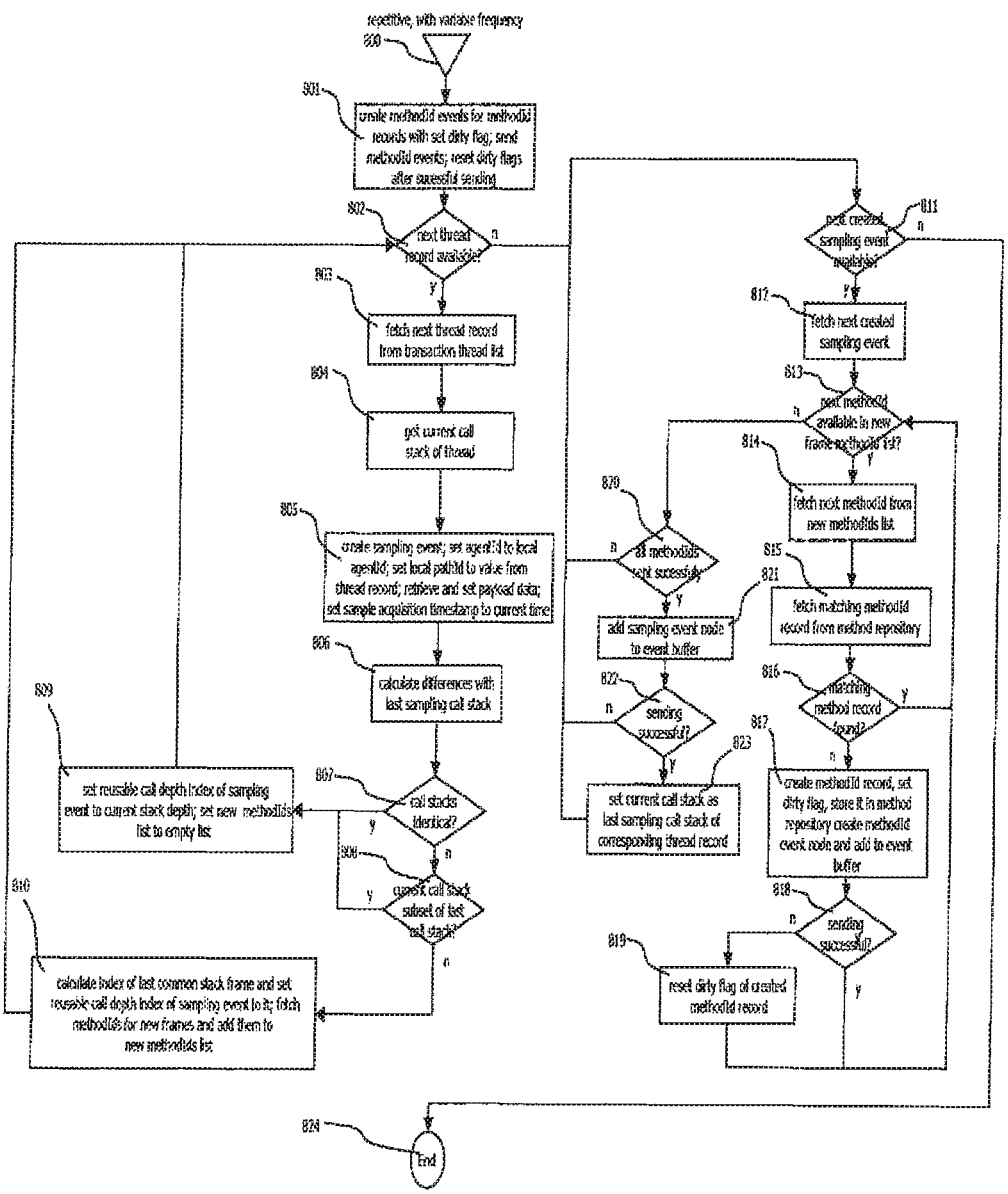
FIG 8a: Thread Sample Creation

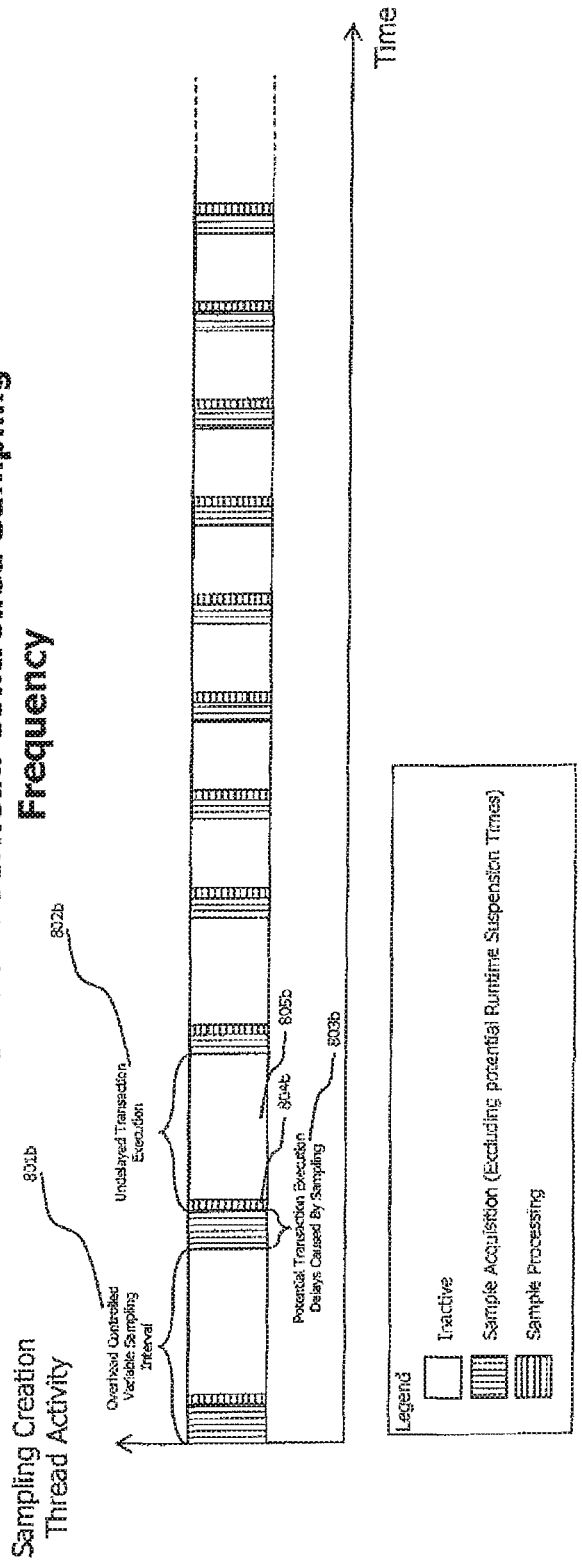

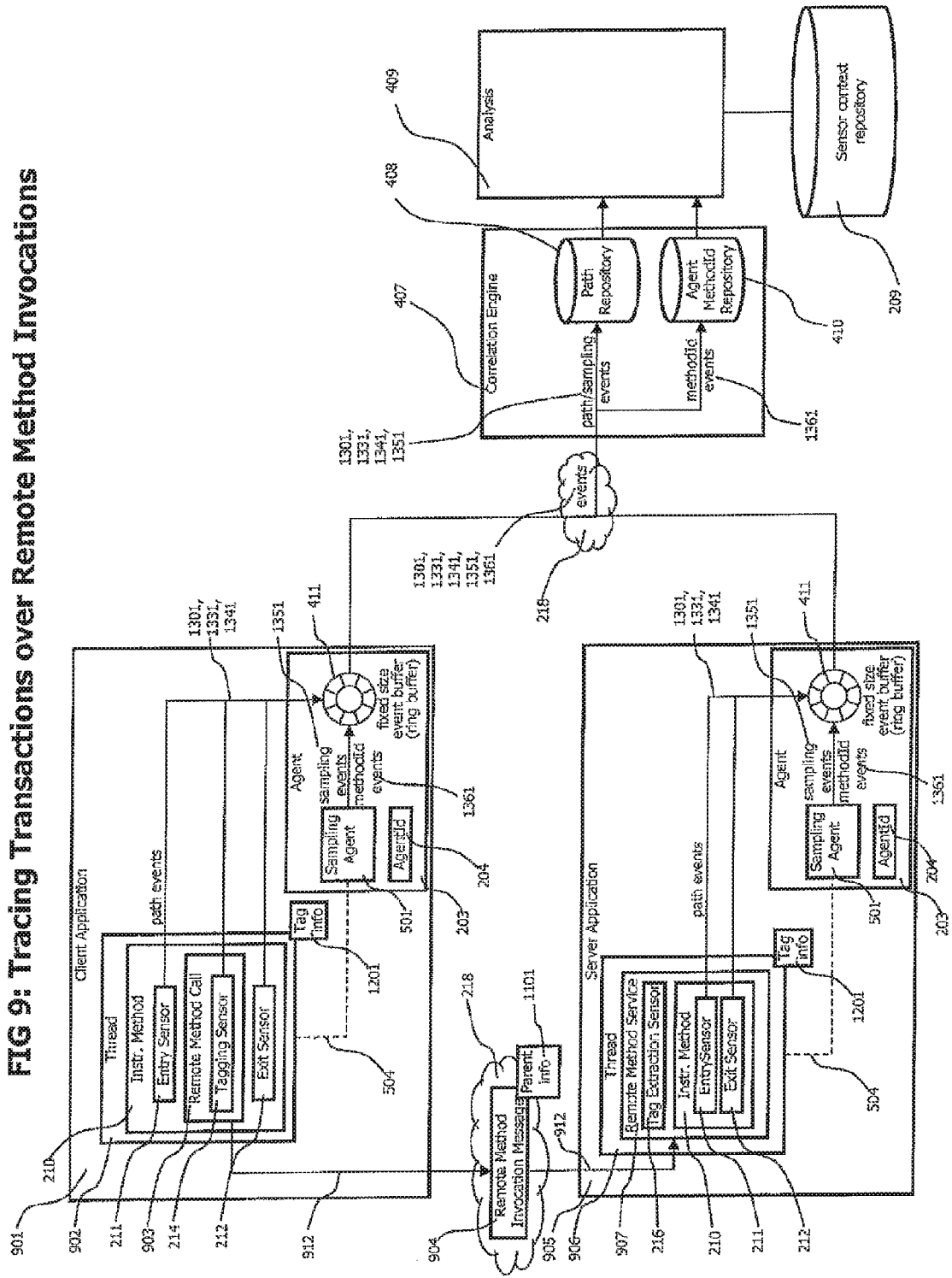

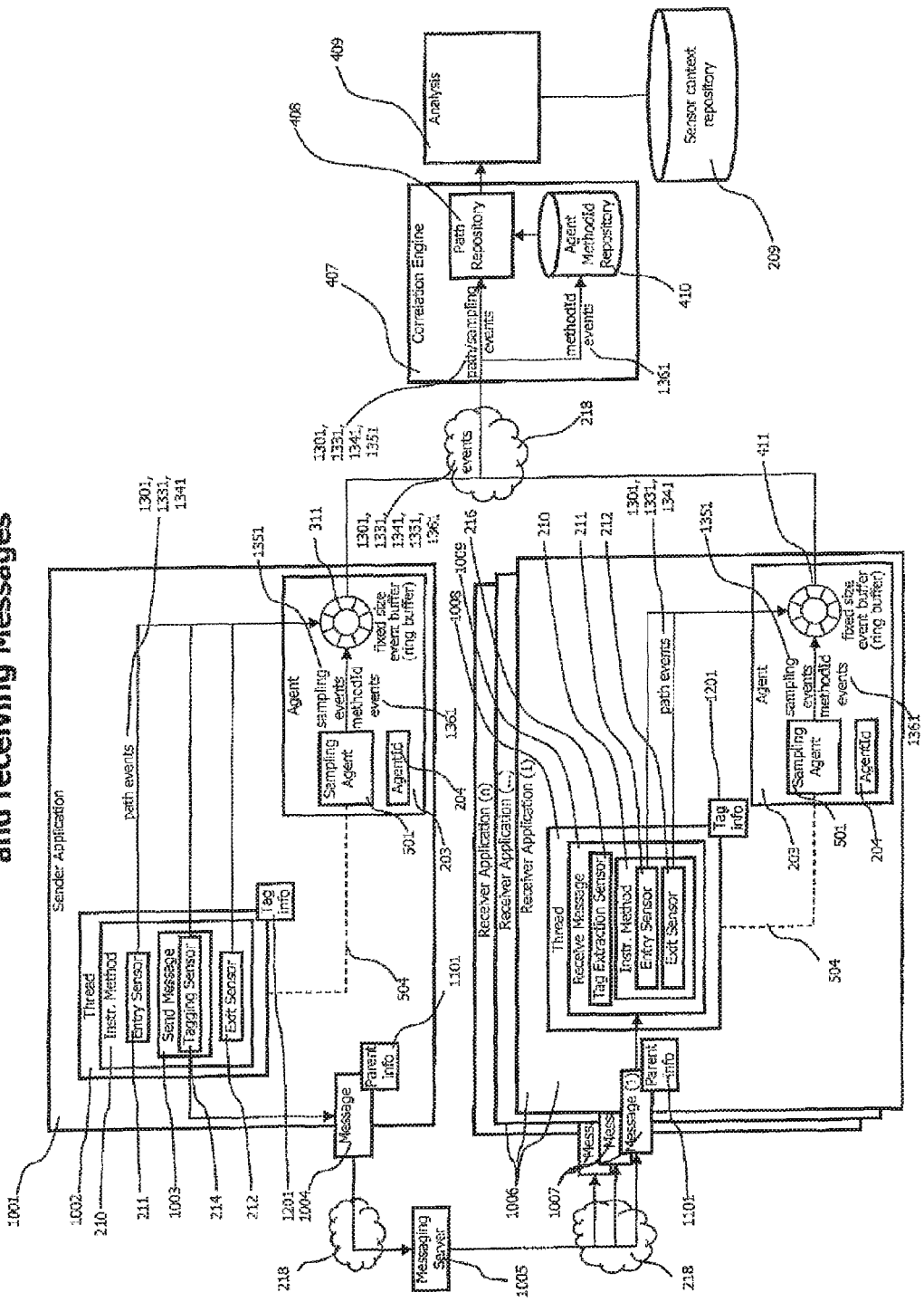

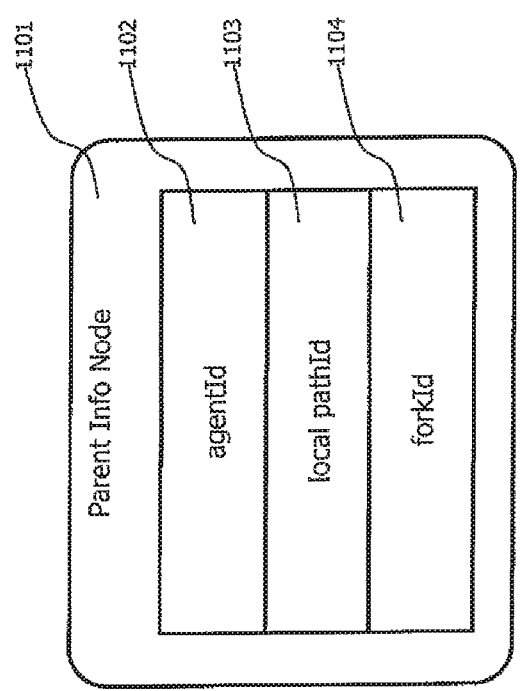
FIG 11: Parent Info Node

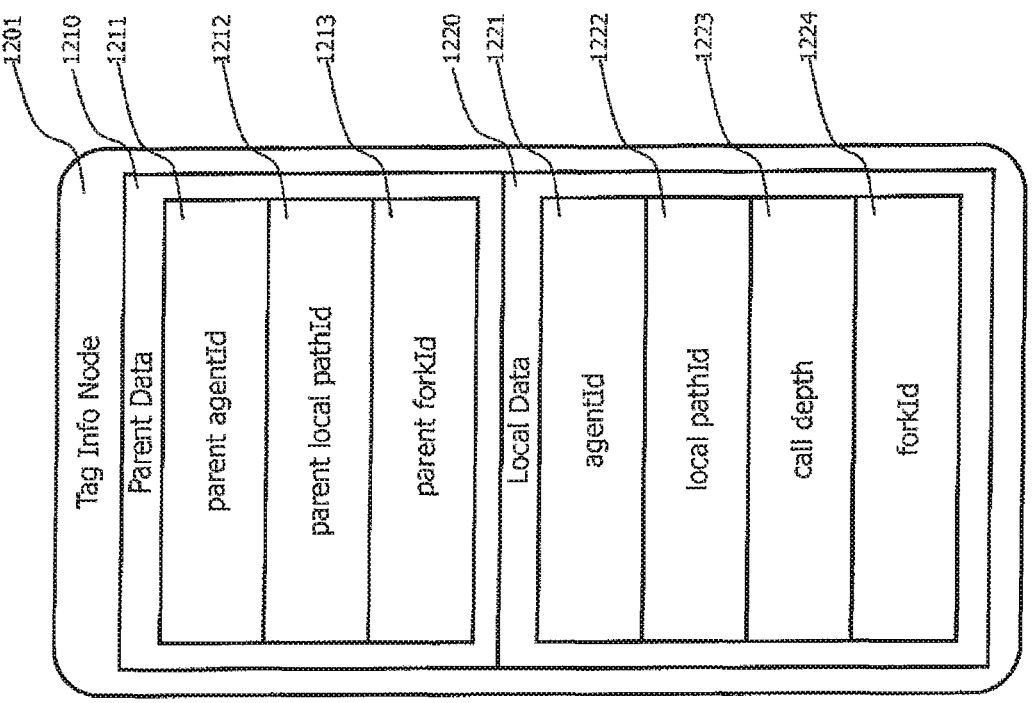
FIG 12: Tag Info Node

FIG 13: Event Nodes
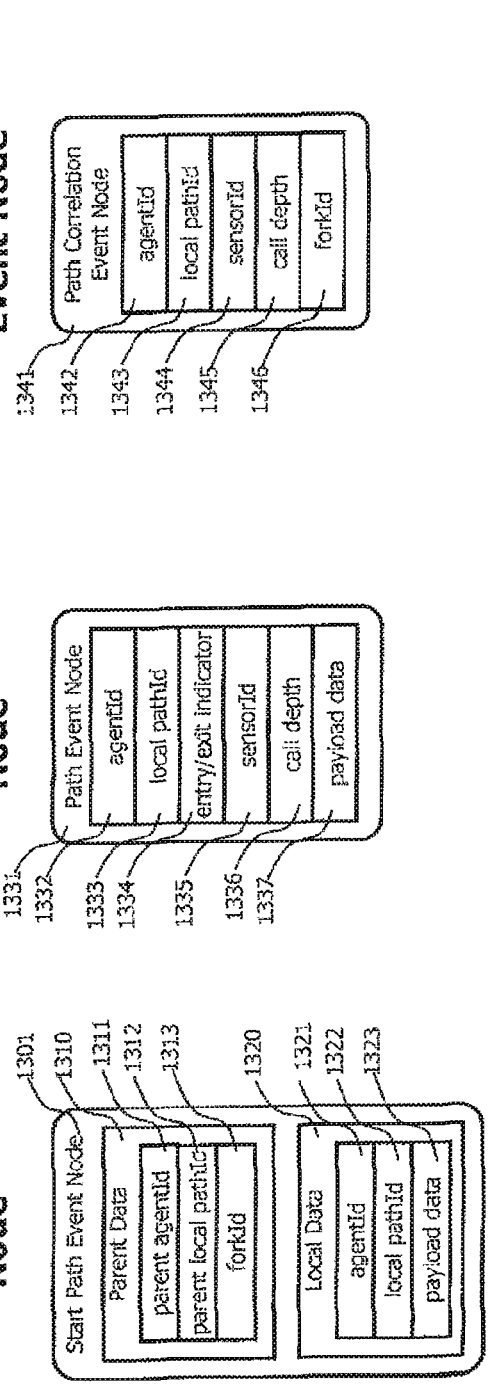
FIG 13a: Start Path Event Node
FIG 13b: Path Event Node
FIG 13c: Path Correlation Event Node
FIG 13d: Path Sampling Event Node
FIG 13e: MethodId Event Node

FIG 14: Transfer of Correlation Information between Threads Boundaries
FIG 14a: Parent Thread
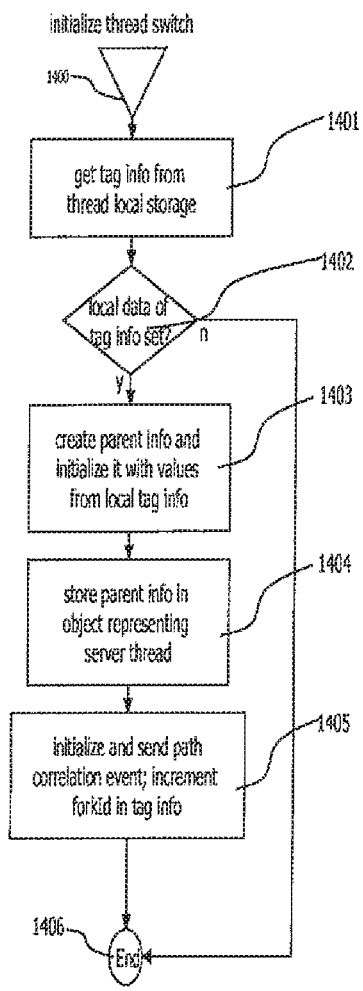
FIG 14b: Child Thread
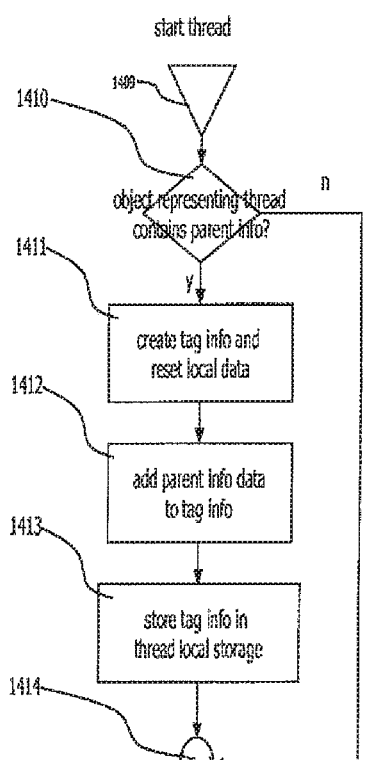

FIG 15: Transfer of Correlation Information within Remote Method Calls
FIG 15a: Remote Message Caller
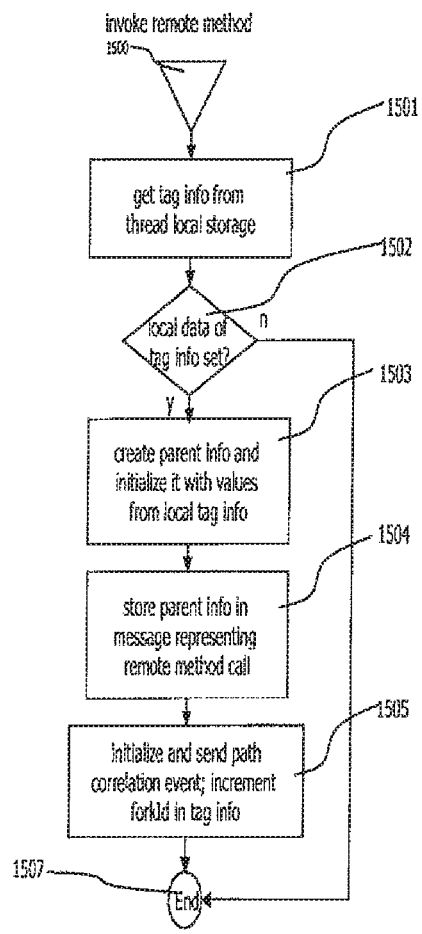
FIG 15b: Remote Message Callee
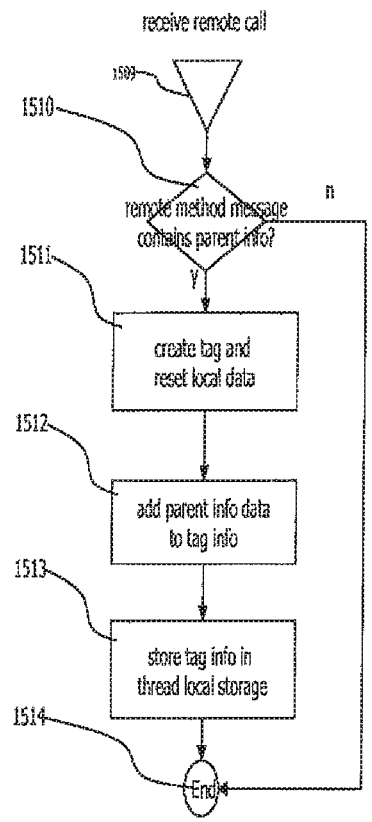

FIG 16: Transfer of Correlation Information within Messages
FIG 16a: Message Sender
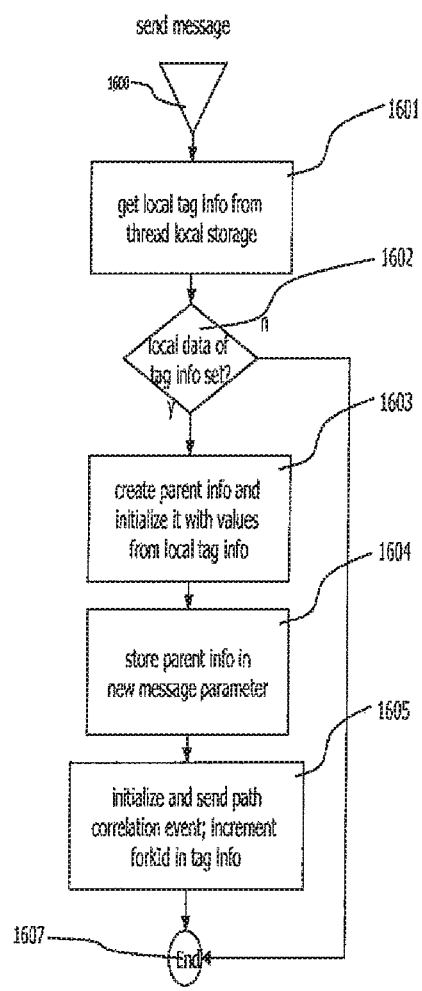
FIG 16b: Message Receiver
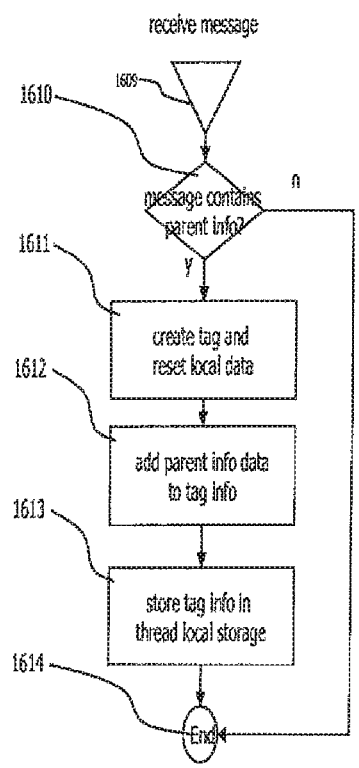

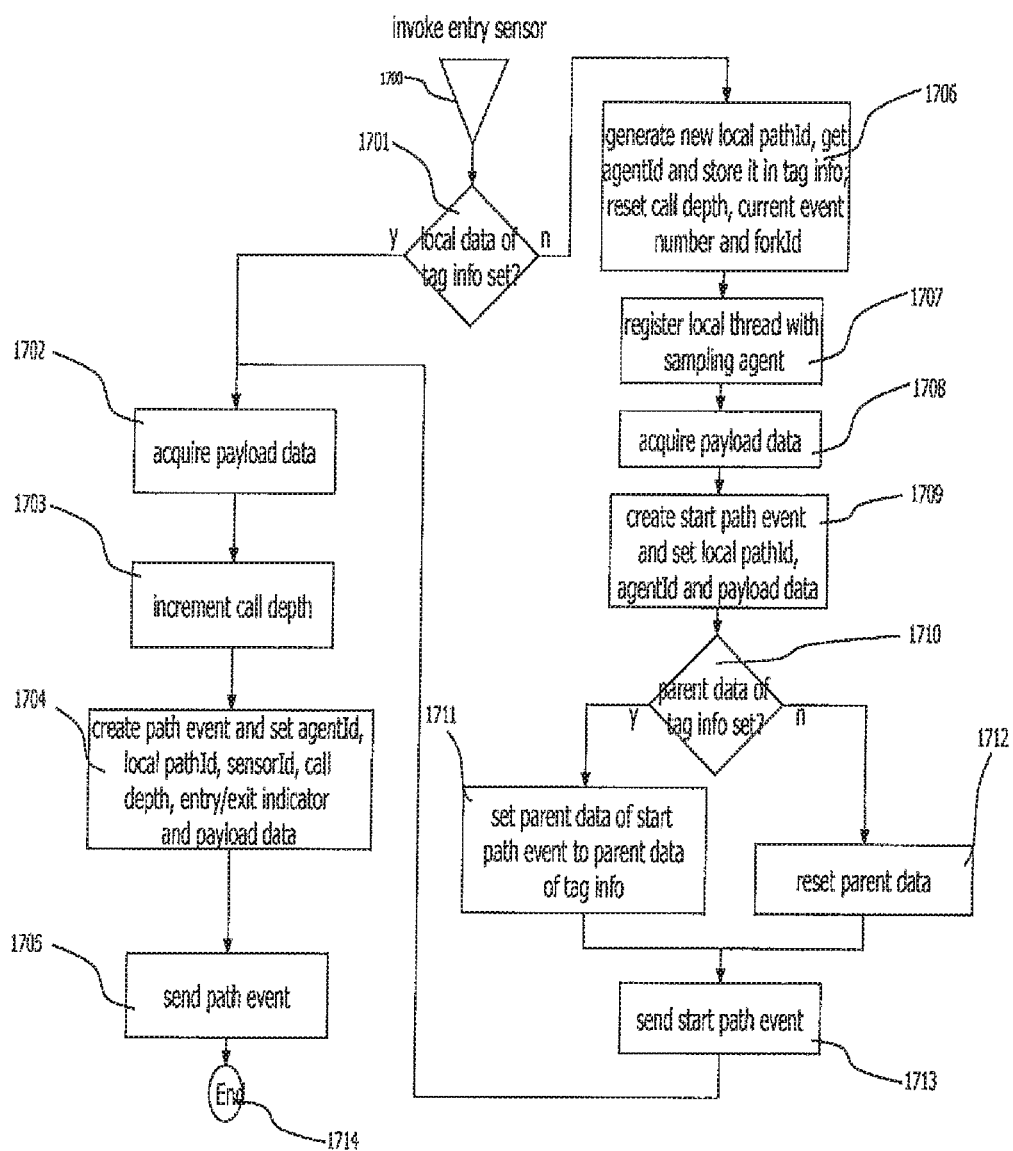

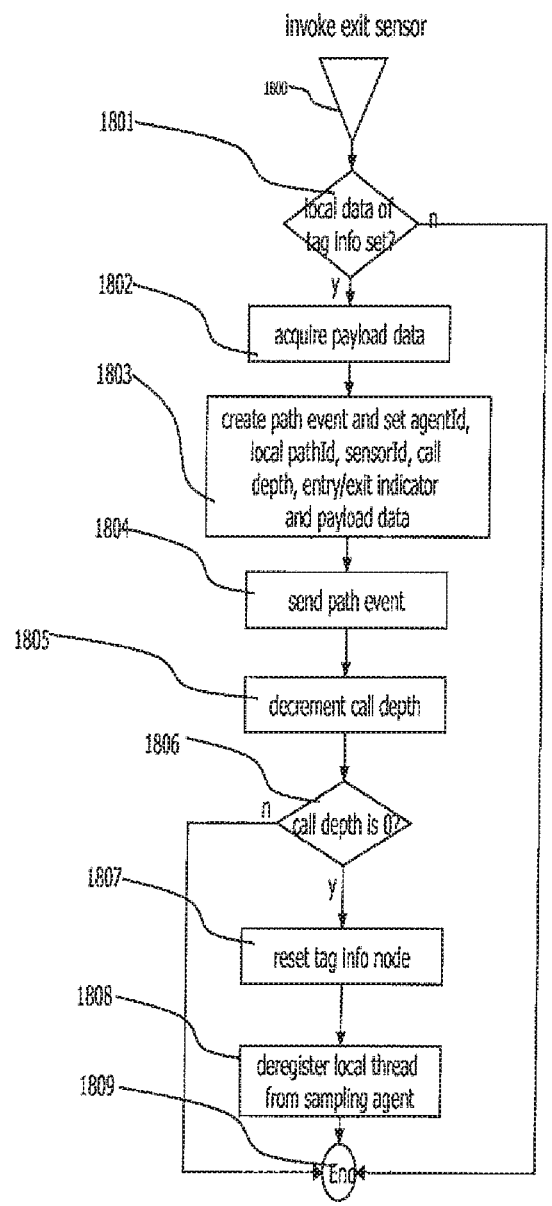

FIG 19: Path Nodes
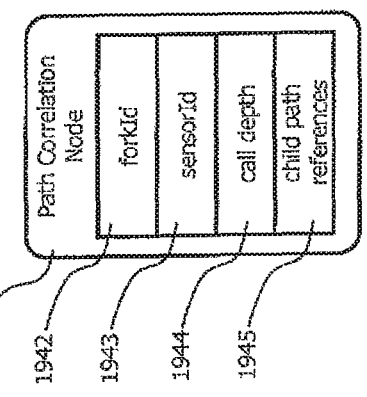
FIG 19b: Path Node
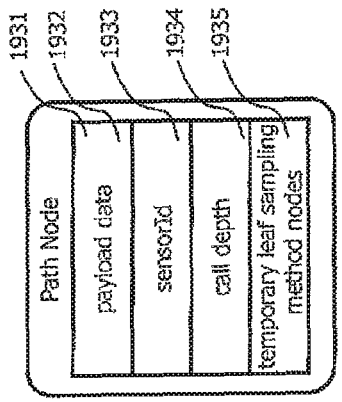
FIG 19c: Path Correlation Node
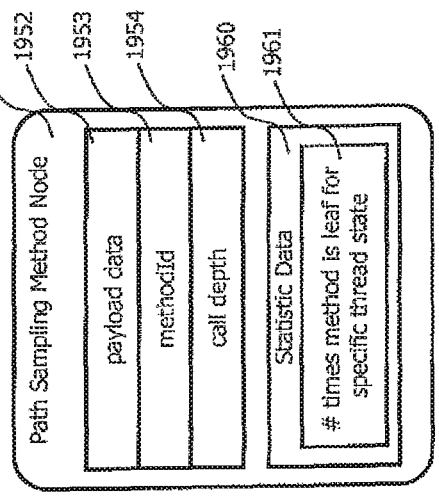
FIG 19d: Path Sampling Method Node
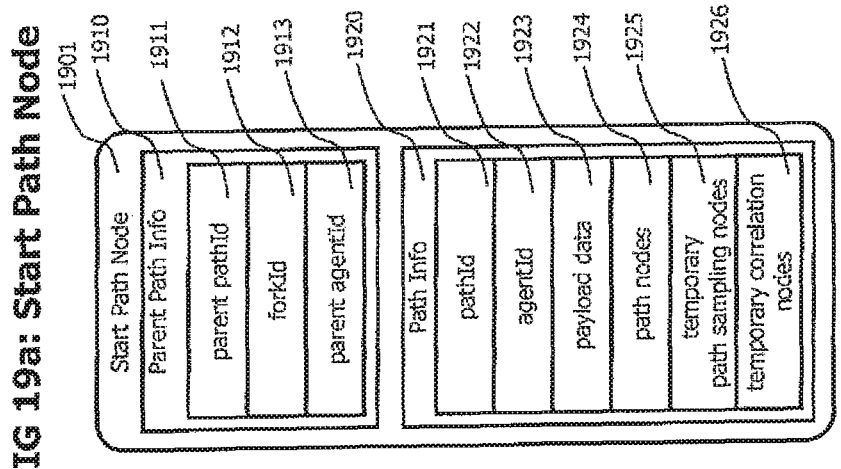
FIG 19a: Start Path Node

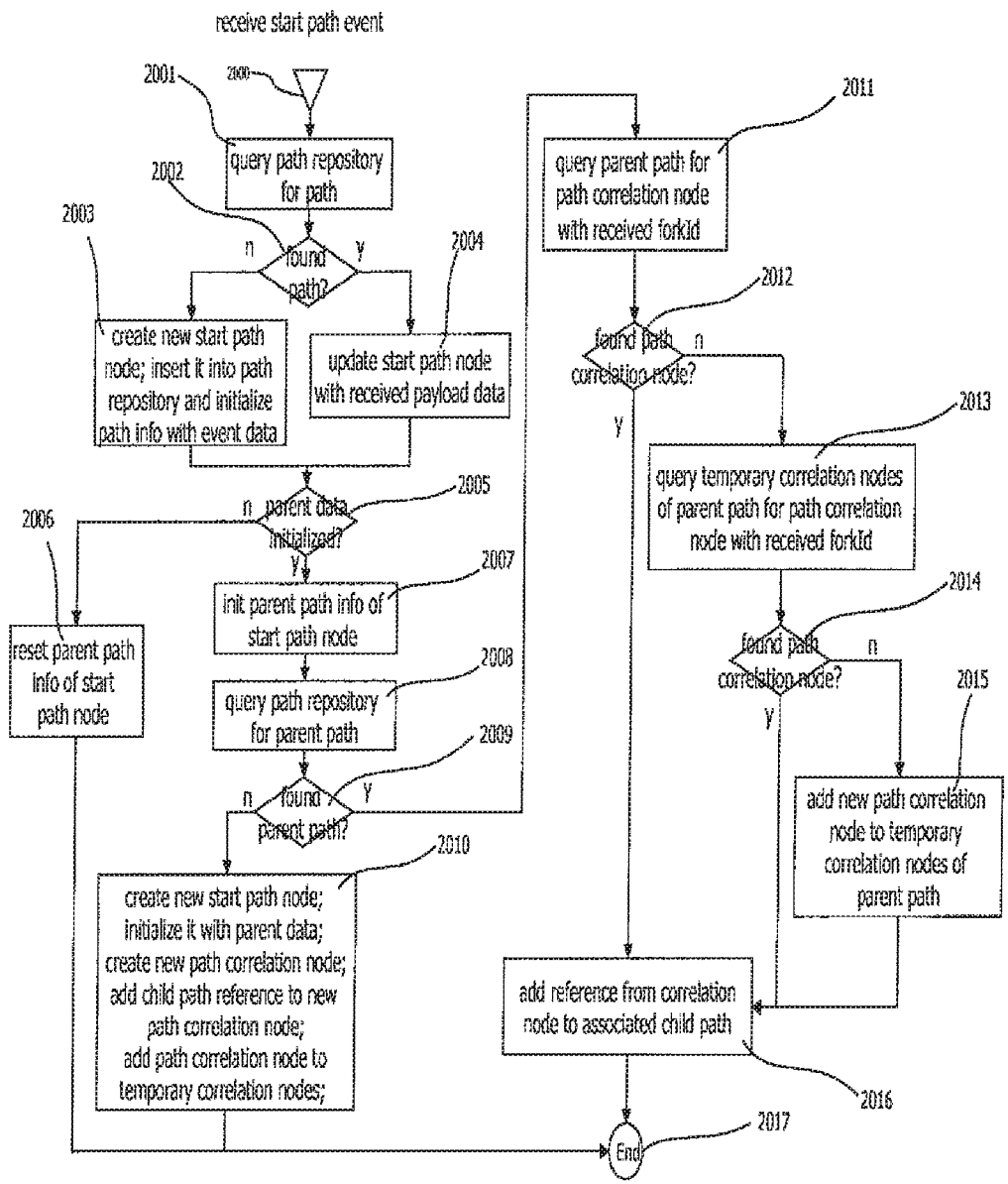
FIG 20: Correlation of Start Path Events

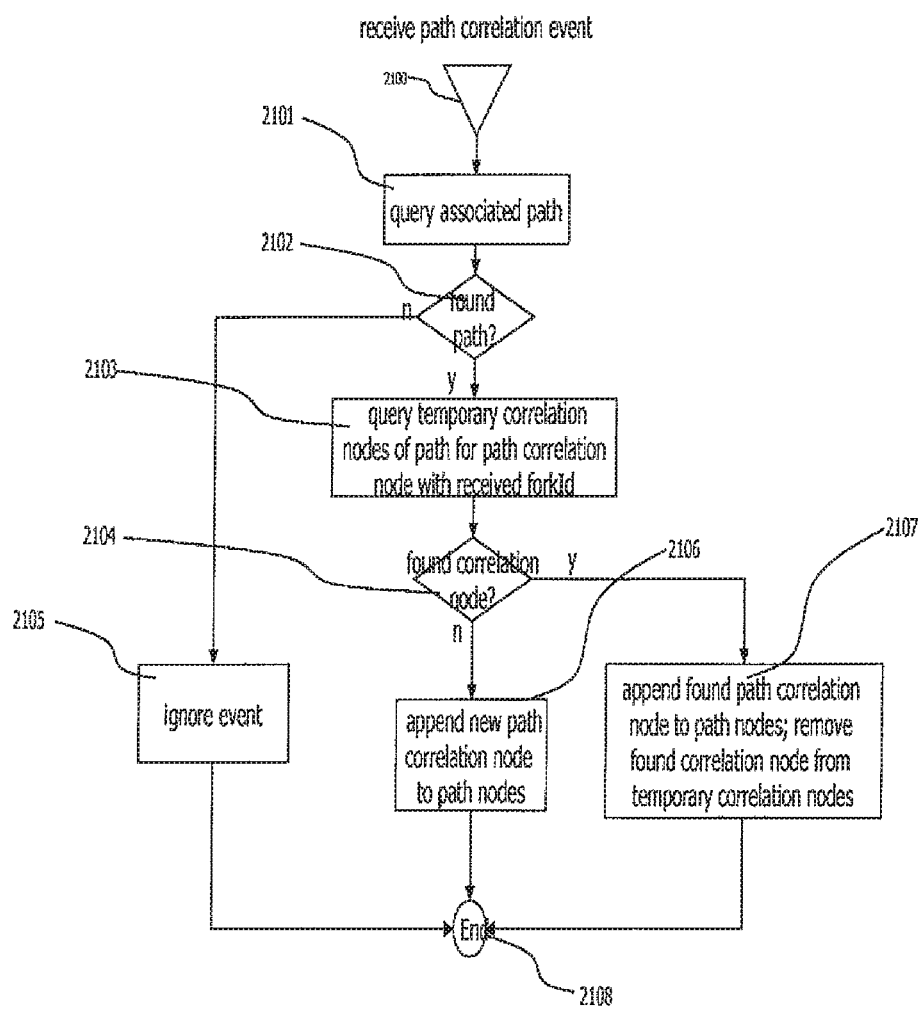
FIG 21: Correlation of Path Correlation Events

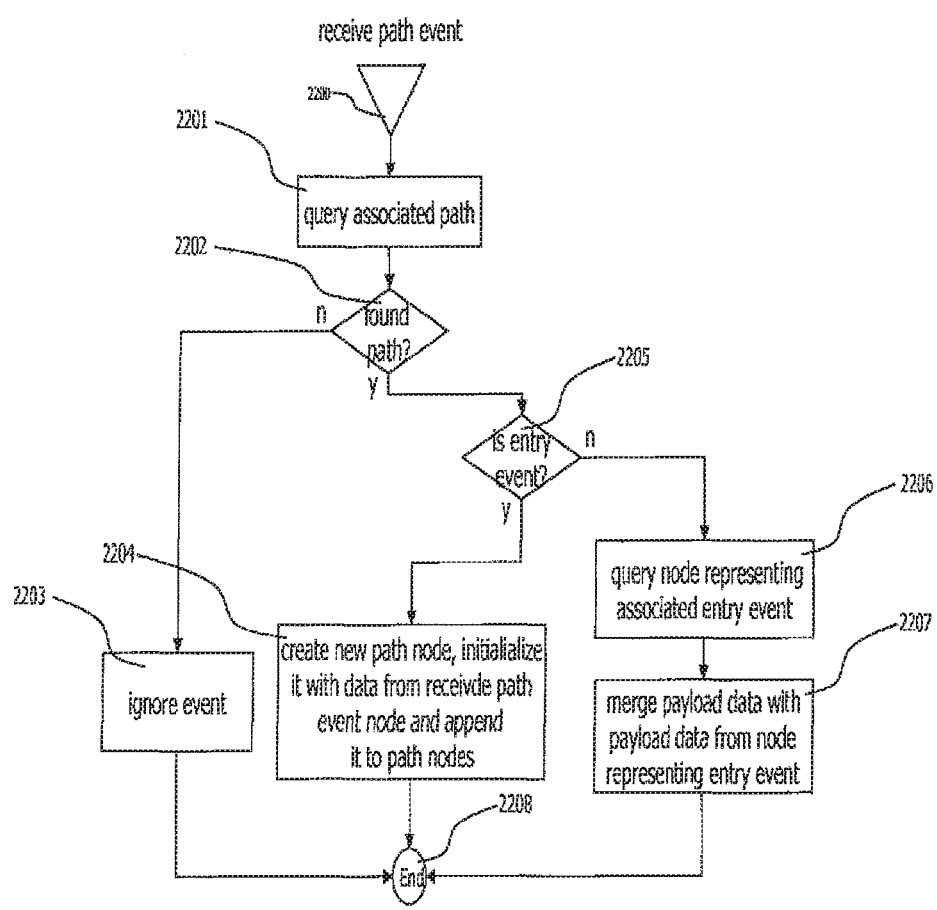

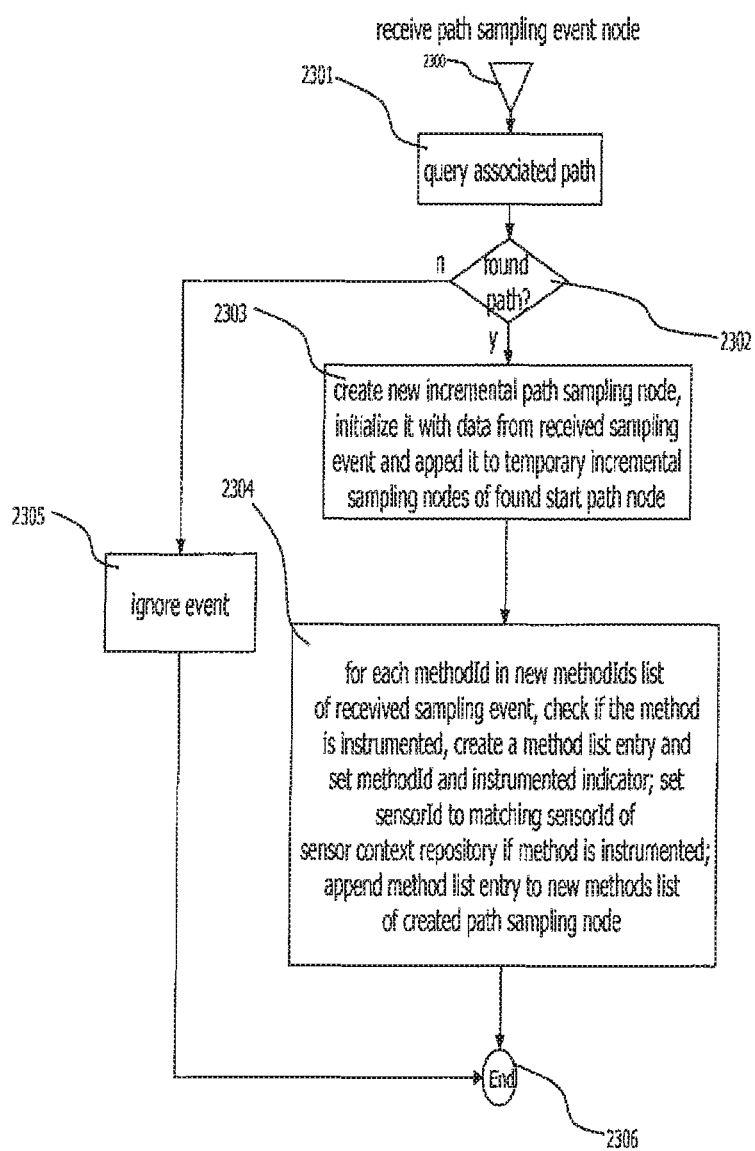

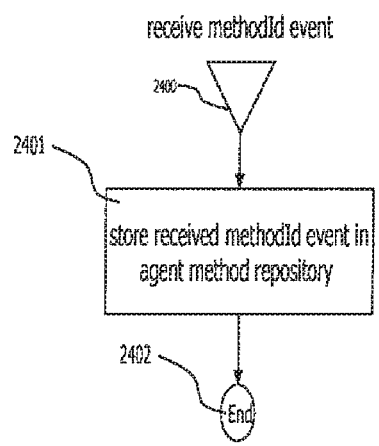

FIG 25: Path Sampling Nodes
FIG 25a: Incremental Path Sampling Node
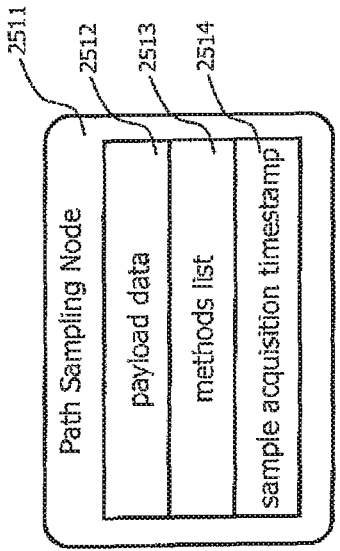
FIG 25b: Path Sampling Node
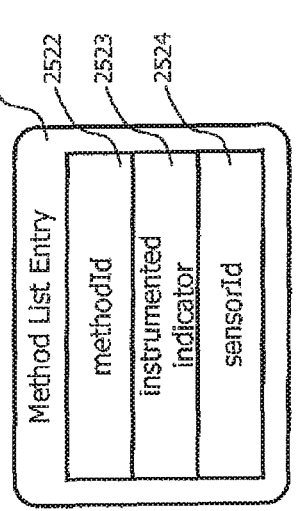
FIG 25c: Method List Entry
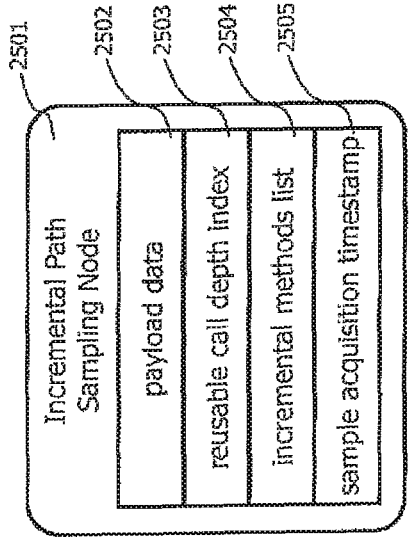

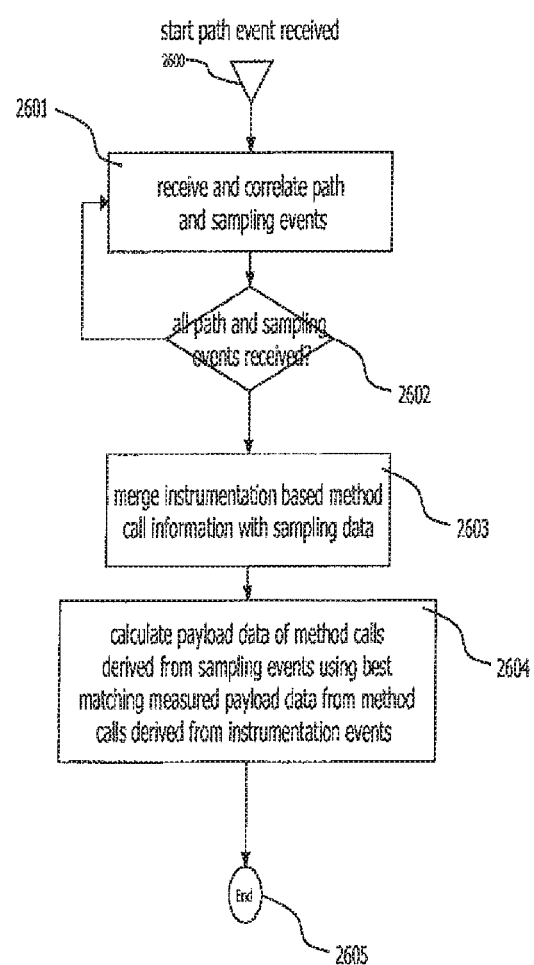

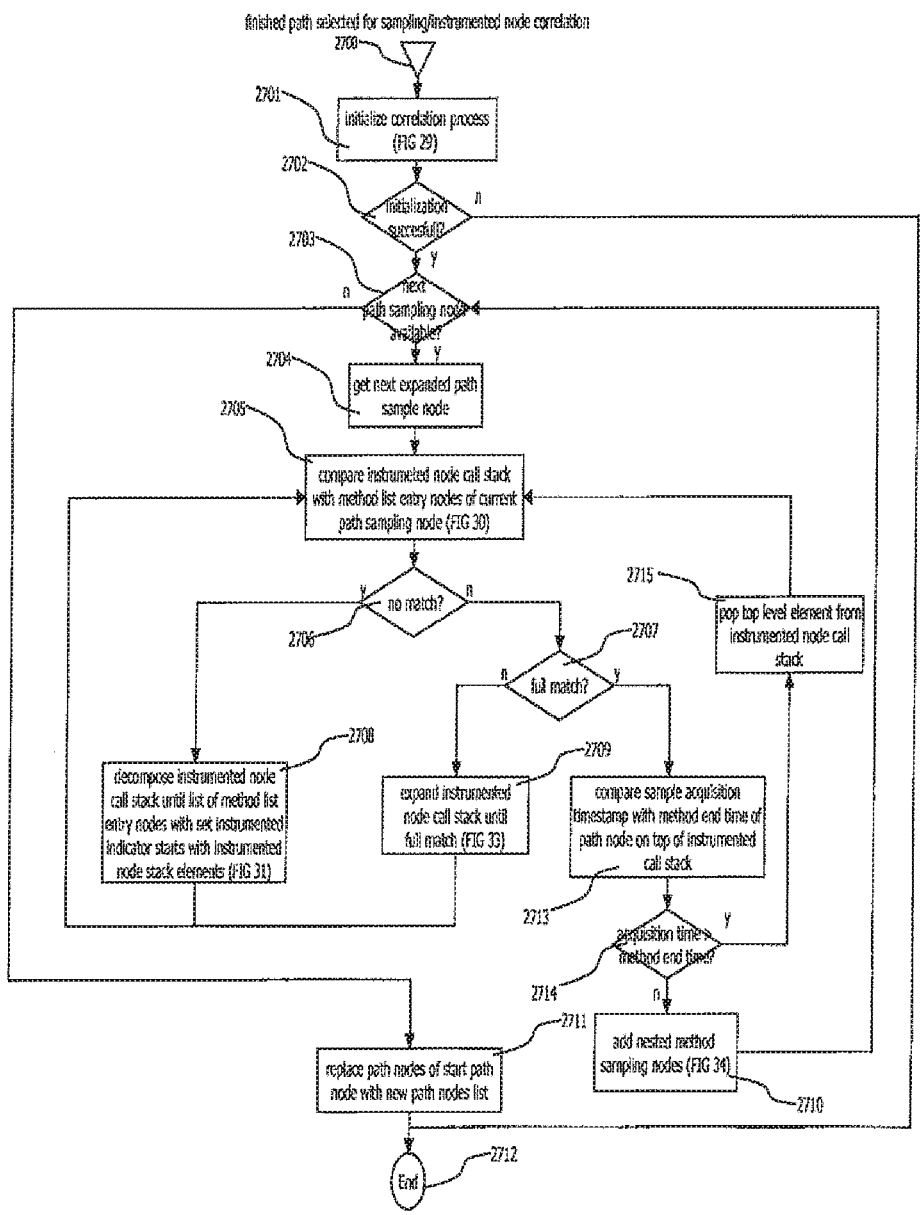
FIG 27A: Correlate Path Nodes with Path Sampling Nodes

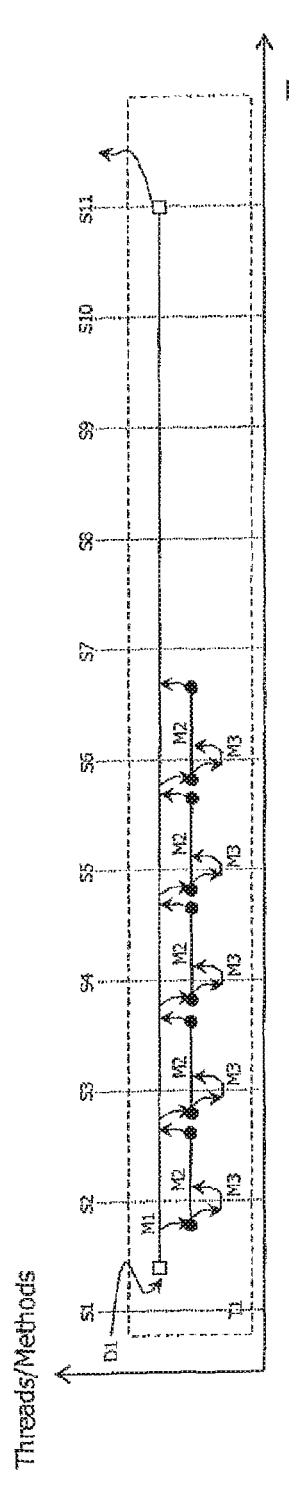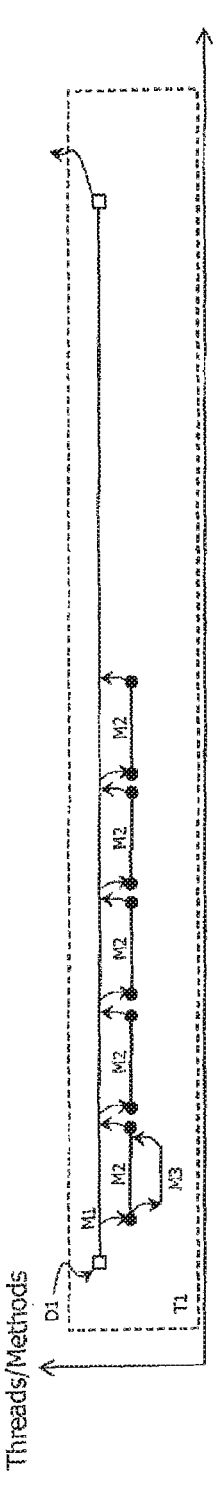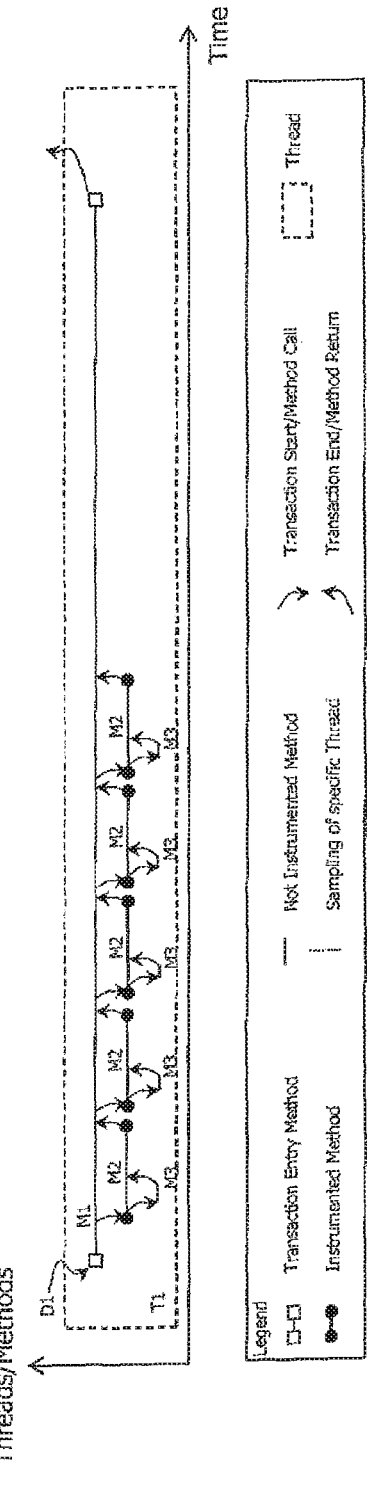

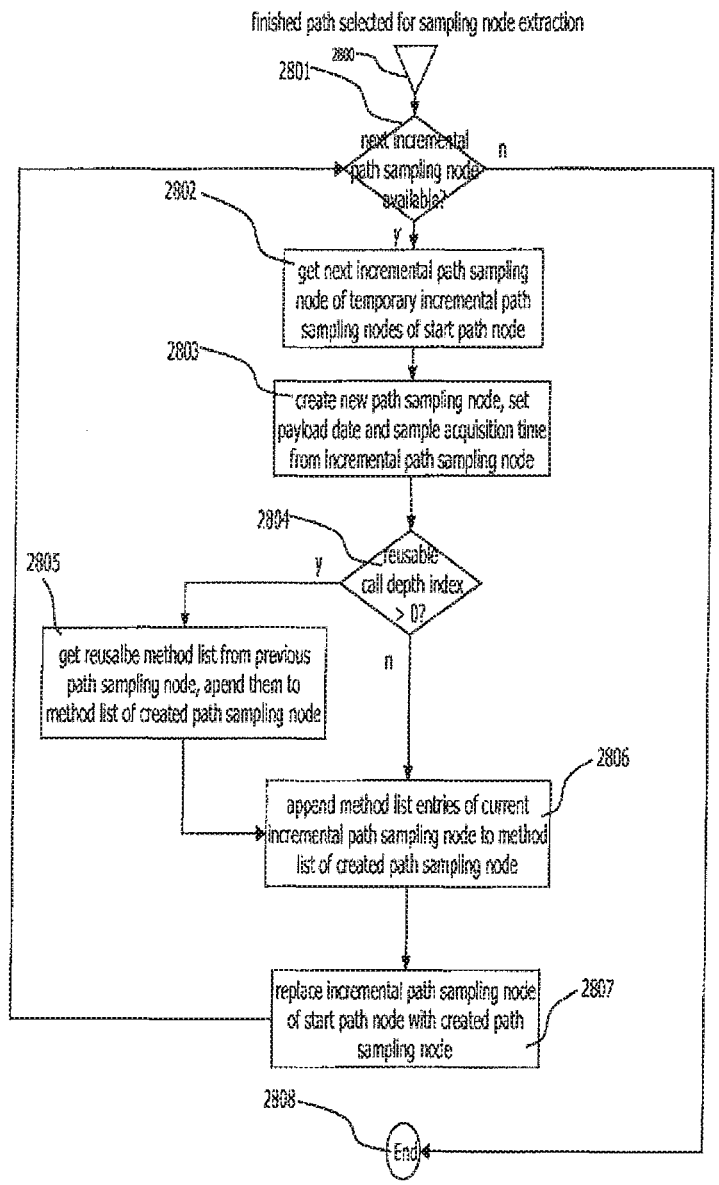

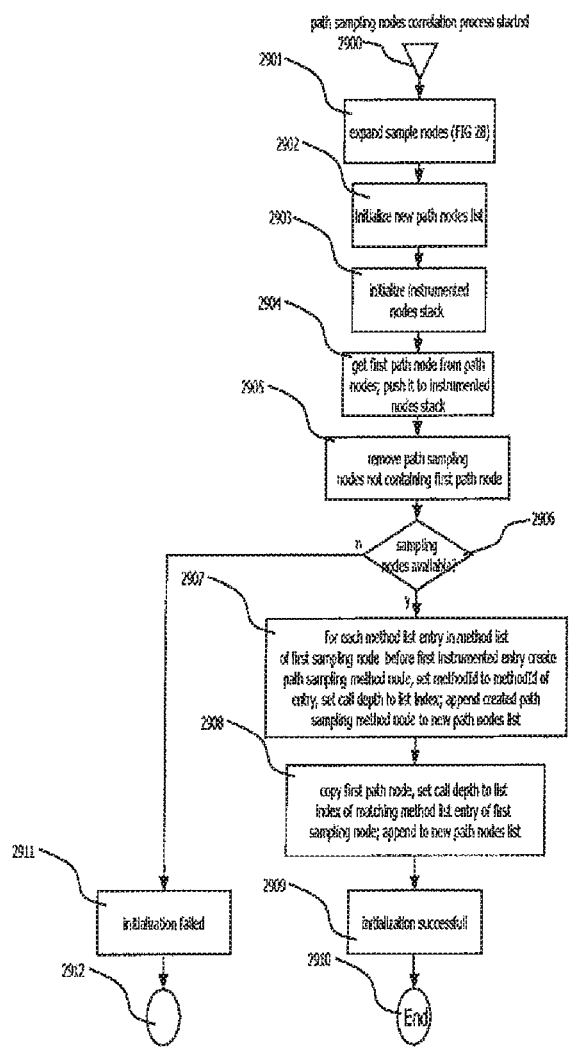

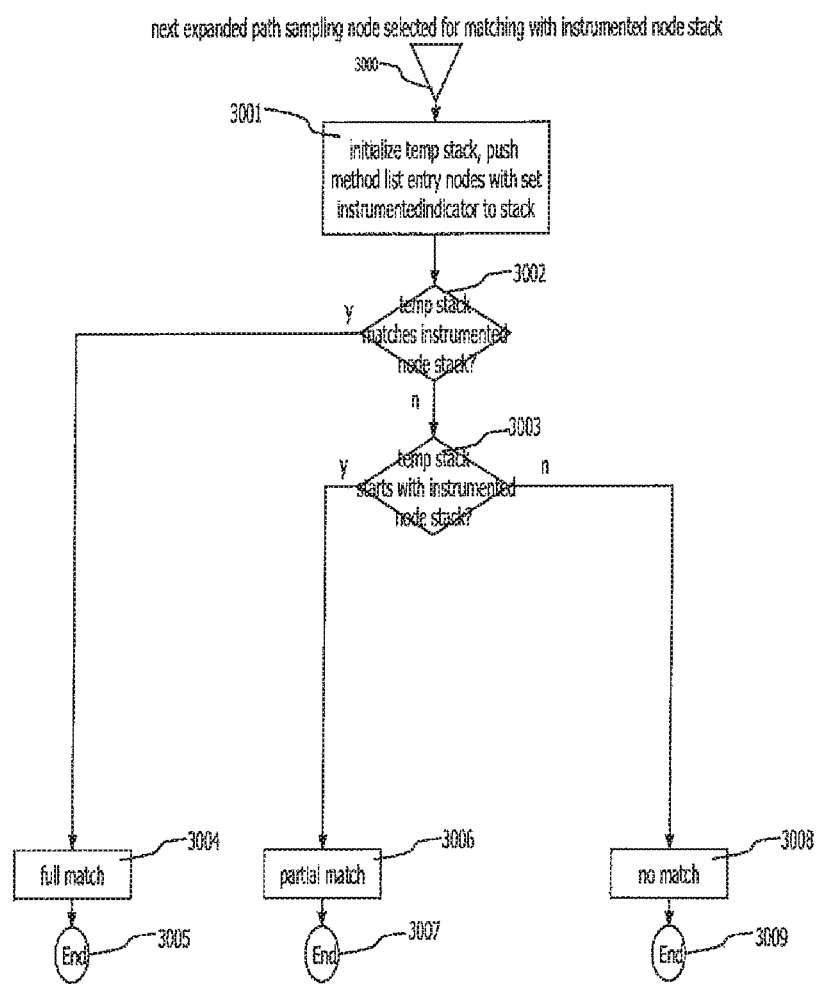

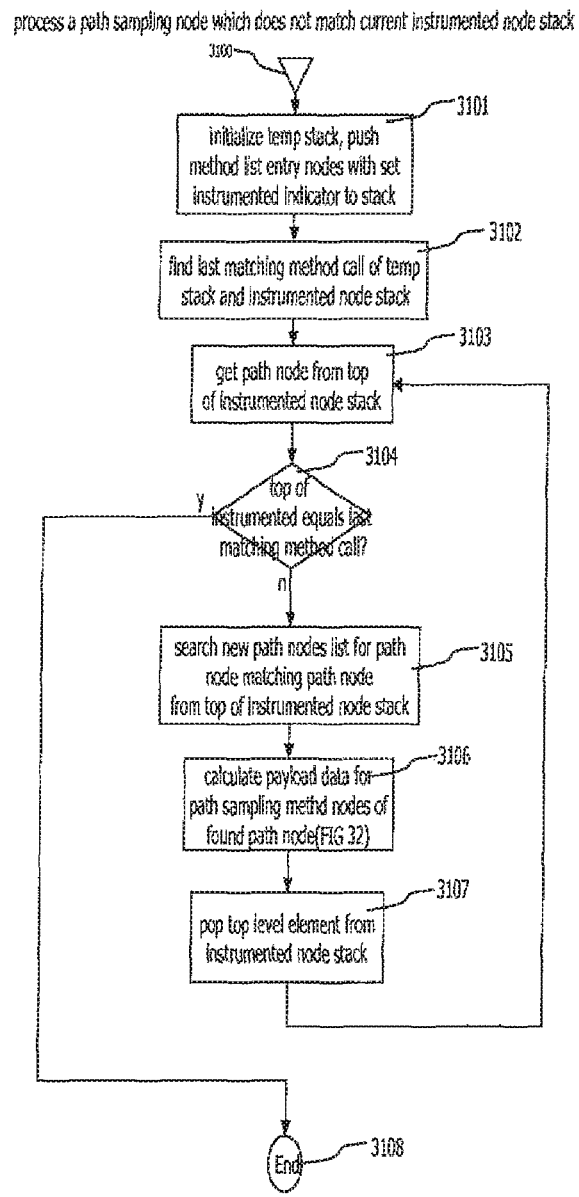

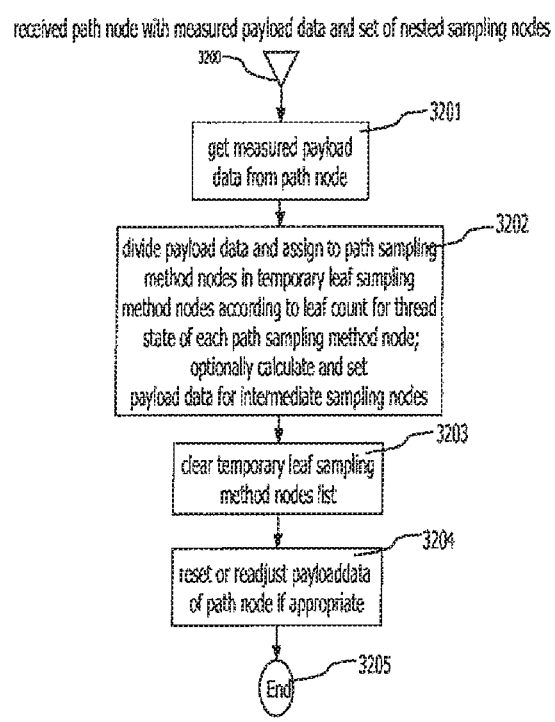
FIG 32: Calculate Payload Data for Sampling Method Nodes Nested to an Instrumented Node

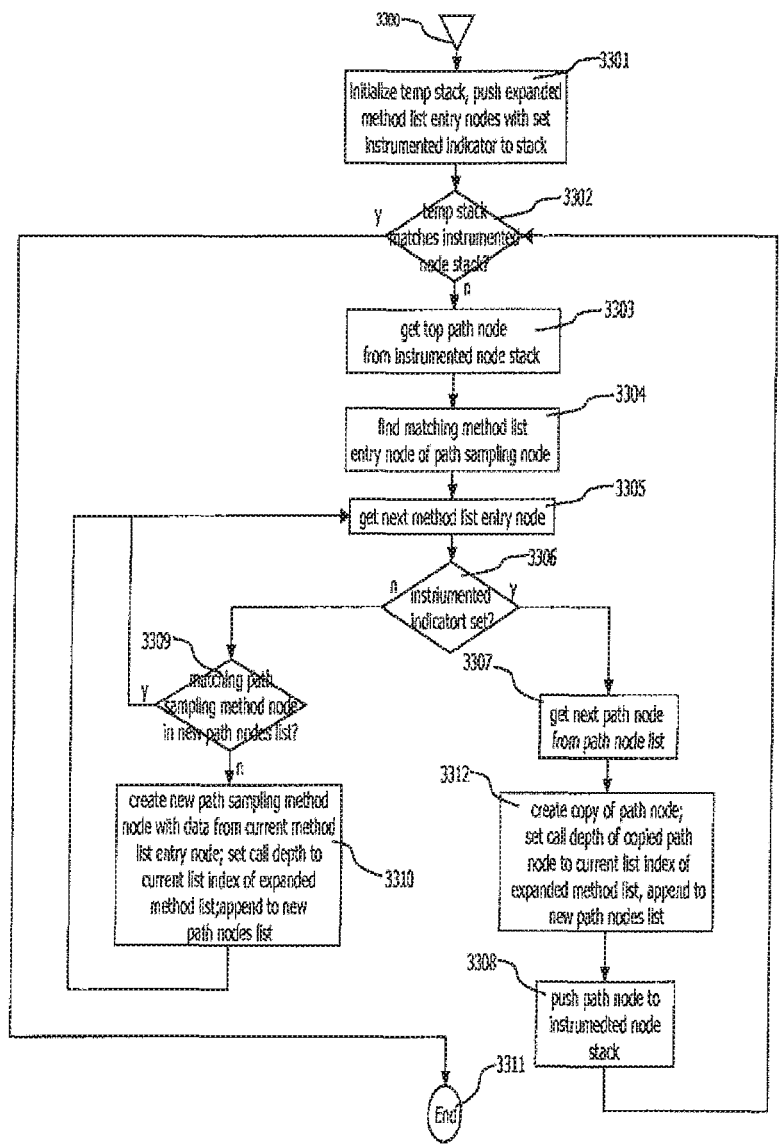

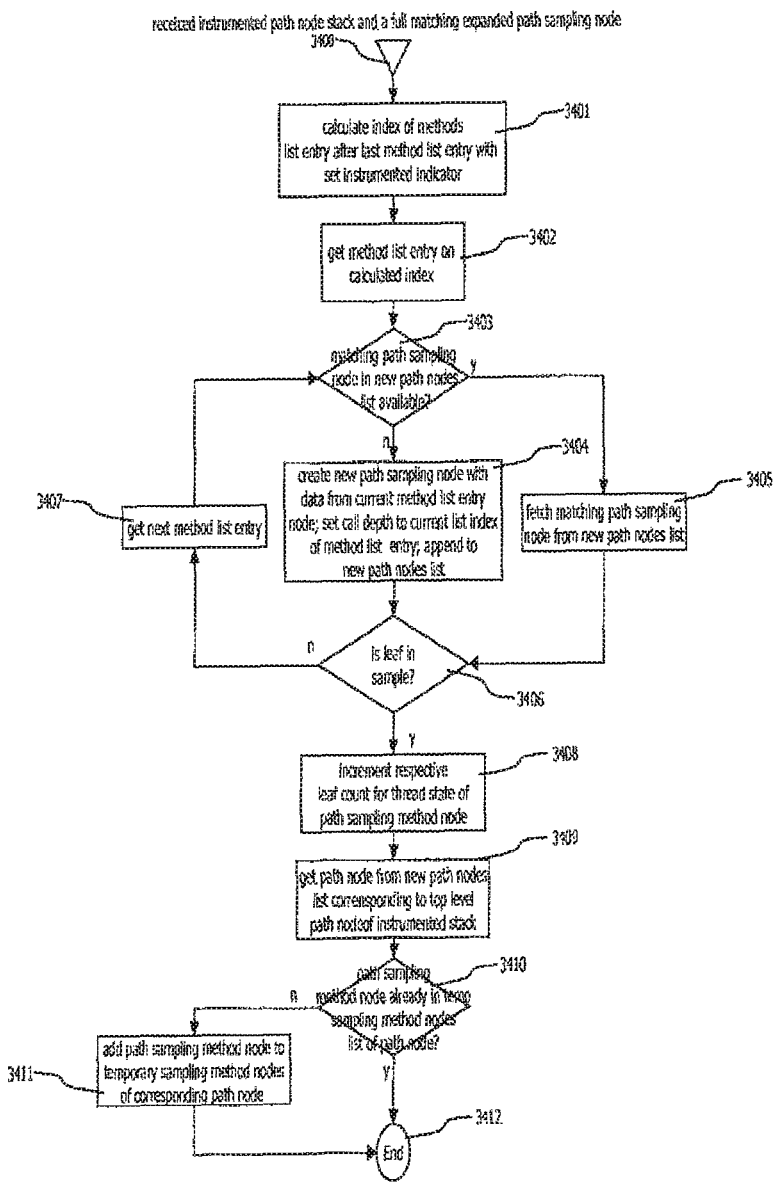
FIG 34A: Add Sampling Method Nodes On Full Match

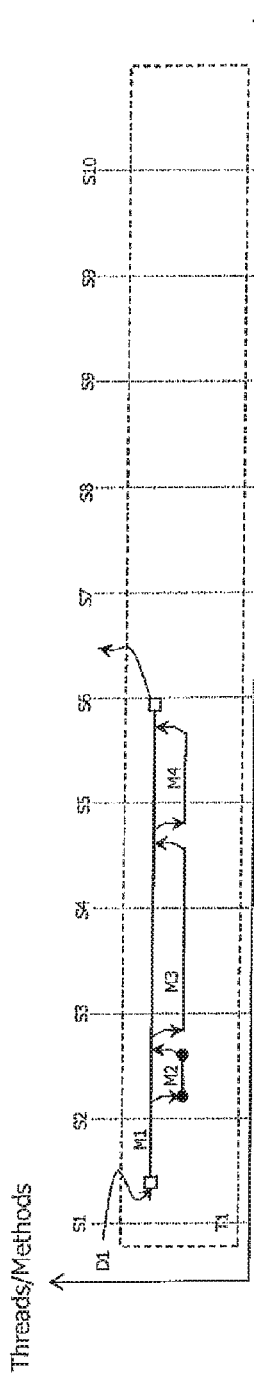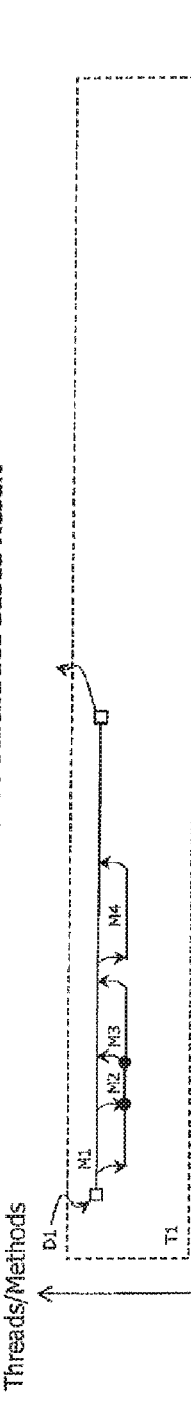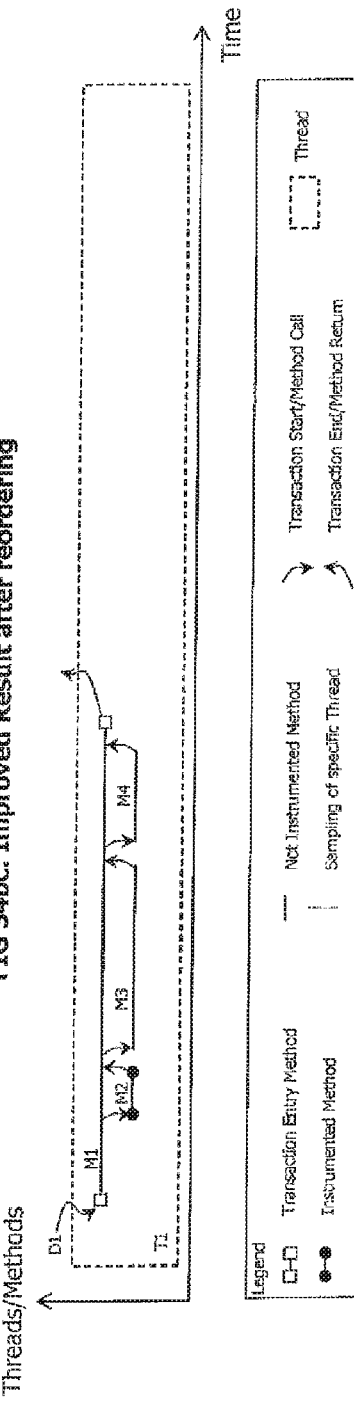

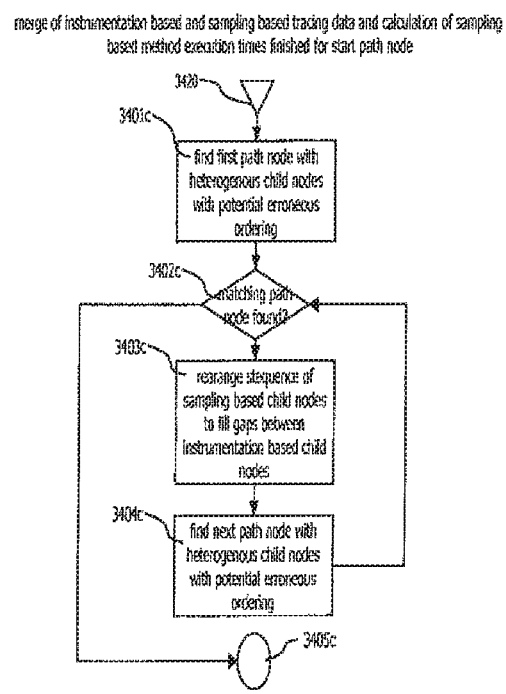
FIG 34c: Reordering of Heterogenous Instrumentation Based and Sampling based Sibling Method Calls

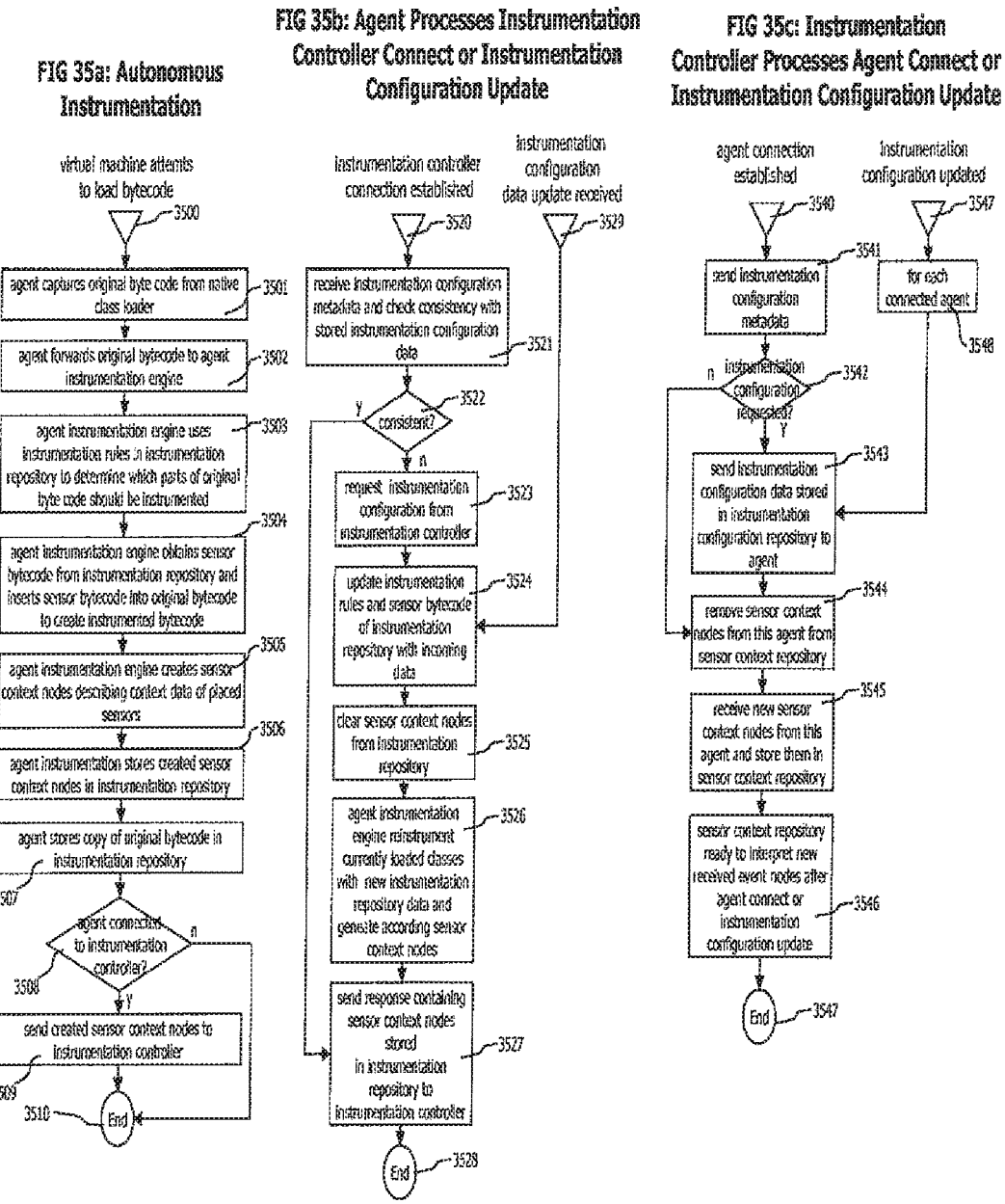

METHOD AND SYSTEM FOR TRANSACTION CONTROLLED SAMPLING OF DISTRIBUTED HETEROGENEOUS TRANSACTIONS WITHOUT SOURCE CODE MODIFICATIONS

CROSS-REFERENCE TO RELATED APPLICATIONS

This patent application is a continuation of U.S. Ser. No. 13/455,745 filed Apr. 25, 2012 which claims priority from the following patent applications, all of which are incorporated by reference herein:
  U.S. Provisional Patent Application Ser. No. 61/480,689, filed on Apr. 29, 2011, entitled, "Method and System for Transaction Controlled Sampling of Distributed Heterogeneous Transactions without Source Code Modifications";
  U.S. Provisional Patent Application Ser. No. 61/482,642, filed on May 5, 2011, entitled, "Method and System for Transaction Controlled Sampling of Distributed Heterogeneous Transactions without Source Code Modifications"; and
  U.S. Provisional Patent Application Ser. No. 61/534,490, filed on Sep. 14, 2011, entitled, "Method and System for Transaction Controlled Sampling of Distributed Heterogeneous Transactions without Source Code Modifications".

BACKGROUND

Object oriented and bytecode-based software development platforms, including Sun Microsystems' Java and Microsoft's>NET platform, have gained wide acceptance for developing Internet and Enterprise class software applications. Bytecode-based software provides cross-platform and cross-language compatibility and cases the networked integration of software application.

Remote method invocation available for said platforms, like Sun Microsystems' RMI and Microsoft's .NET Remoting, and messaging services like Sun Microsystems' Java Messaging Service (JMS) or Microsoft's Messaging Queue ease the creation of distributed and loosely coupled application architectures.

Approaches like service oriented architecture (SOA) use this feature to provide flexible application architectures which can be adapted to rapidly changing market demands.

Although this flexibility eases building and updating the functionality of applications, it constitutes a challenge for conventional performance monitoring and tracing tools which traditionally perform monitoring only within the scope of an isolated application. Most existing tools are not prepared to trace transactions over the borders of threads or different virtual machines.

Following the execution path of a transaction over the borders of different threads, processes, or host systems is essential for tracing complete end-to-end transactions, which may be processed by a chain of different application servers that may communicate in various ways.

Information that depicts the different processing stages on different application servers and provides specific performance information for the processing stages is a precondition for performance analysis of distributed applications. To provide such information, it is required to correlate isolated trace information acquired from the different servers participating in a transaction, to depict a consistent end-to-end transaction.

Increasing requirements in transaction visibility and monitoring overhead reduction create demand for more lightweight transaction tracing systems which cause less overhead in terms of processing time and memory usage.

There are some systems available that provide mechanisms for tracing distributed transactions, but those systems either depend on specific properties of the monitored system, such as synchronized clocks of servers involved in distributed transactions, or generate insufficient correlation information. The generated correlation information is sufficient to reconstruct parent-child relationships between parts of distributed transaction executed on different servers, but they fail to reconstruct the exact sequence in which child parts of the transactions were activated. Other systems only provide post-mortem analysis of transactions, or are not able to analyze blocked or stalled transactions.

Some of the existing monitoring systems have memory requirements which are dependent on the nesting depth of executed methods, which makes a prediction of the memory overhead caused by the monitoring system impossible, and which may cause a crash of the monitored system in case of deep nested method executions which may e.g. occur in recursive methods.

JaViz[1] is a monitoring system developed by IBM which allows tracing of distributed transactions running on Java platforms, using Sun Microsystems' RMI framework for communication. The system amends existing virtual machines to make them generate tracing data for each executed method, which is written to trace files. Said trace files contain statistical information about local method calls, outbound remote method calls and inbound remote method service requests. The trace files also contain correlation data which can be used to match outbound remote method calls invoked on one virtual machine with the corresponding inbound remote method service request received on another virtual machine. After a distributed transaction is terminated, a merging tool is executed, which evaluates the correlation data stored in the trace files generated by the involved virtual machines. The merging tool generates an overall trace file which describes the whole distributed transaction. The resulting trace file is interpreted by a visualization tool which provides a tree-like view of the transaction. Although JaViz provides useful information for analyzing distributed transactions, the restriction to post-mortem analysis and the relatively complex handling of the different trace files exclude this approach from usage in productive environments.

The Application Response Measurement framework (ARM) [2], a standard for monitoring application performance, created by Hewlett-Packard and Tivoli WebSites, provides infrastructure for real-time monitoring of distributed transactions. To trace transactions with ARM, calls to ARM methods are inserted at the entry points and all exit points of methods which should be monitored. This requires access to the source code of the application which should be monitored and the ability to rebuild the application after ARM monitoring is included. Accessing the application source is often difficult or even impossible. Additionally the requirement to adapt application source code and rebuild the application to apply changes of the set of monitored methods makes this approach inflexible in terms of adapting the monitoring configuration.

The systems described in [3] and [4] combine the ARM framework with bytecode instrumentation, and thus remove the requirement to adapt the application source code to install monitoring code. The described system creates a stack data structure at the thread local storage which maps the current method call stack. The stack data structure is used to correlate method calls to the method execution sequence performed in the local thread. Memory consumption of said stack data structure grows proportional to the nesting depth of the instrumented methods and can become a severe problem if the level of said nesting becomes high or unpredictable, as is, e.g., possible in recursive method calls. The system places instrumentation code at entries and exits of monitored methods. Entry instrumentations create and initialize a record for storing performance data, and exit instrumentations update said record and send it to an instance which analyzes and visualizes the record. This approach keeps network traffic low because only one data record is sent for each monitored method call, but it causes problems in handling blocked or stalled transactions. In case of a blocked or stalled transaction, in the worst case no method is exited and thus no monitoring data of said blocked transaction is generated. If a monitored method activates another thread, either via explicit thread switch, or by invoking a remote method, the system generates correlation information which identifies the activating method, the thread that executes it and the server which is hosting the virtual machine. Said correlation information is transferred to the activated thread and allows correlating the activated thread with the activating instrumented method, but in case of multiple thread activations performed by one monitored method, the provided correlation information is not sufficient to reconstruct the sequence of said multiple thread activations. Knowing the sequence of said activations would be very useful to analyze problems caused by race conditions between the activated threads.

The system described in [5] provides tracing mechanisms which can be dynamically enabled and disabled. The system uses bytecode instrumentation to place entry interceptors and internal interceptors in the monitored application. If a transaction invokes an entry interceptor, the entry interceptor first evaluates a set of rules to decide if the transaction should be traced and initiates tracing according to the result of the rule evaluation. An interceptor consists of monitoring code placed at the entry and at each exit of instrumented methods. Interceptors produce and send measurement data when executing the code placed at method exits. This leads to problems with blocked transactions, as described before. The system allows tracing transactions which span multiple servers, but it uses timestamp information for correlation, and thus requires synchronized clocks at the involved servers, which is a requirement that is often hard to fulfill.

The system described in [6] also aims to trace distributed transactions, but as the approaches discussed before, it does not address blocked transactions. Additionally, it uses timestamp data for correlation and thus requires synchronized clocks.

Consequently, there is a need for a monitoring system that allows tracing of distributed end-to-end transactions, which overcomes the shortcomings of currently existing approaches.

SUMMARY

Embodiments of the present invention are directed to a system and method for tracing distributed transactions through heterogeneous application environments, without the requirement to modify application source code. Such embodiments use correlation information which identifies an individual transaction, and the servers involved in executing the transaction. Said correlation information is transferred to spawned child transactions. Measurement data generated by those child transactions is tagged with said correlation information to enable real-time correlation of distributed transactions at the granularity level of method invocations.

Embodiments of the present invention require neither source code modifications of monitored source code nor access to the source code to instrument bytecode-based software applications. The code of monitored applications is instrumented on the fly, at application run-time, during or after loading bytecode. Neither the deployment of additional libraries to the monitored applications, nor modification or exchange of existing application libraries, is required.

Embodiments of the present invention include a system and method that enable tracing of individual distributed transactions across thread, process, or server boundaries at the granularity level of individual method invocations.

Said disclosed system and method enable tracing of individual transactions that span multiple processes or servers, using remote method invocation frameworks for communication. Additionally, the disclosed system and method enable tracing of individual transactions using messaging services for communication, also taking into account possible multiple message receivers.

The disclosed system and method store correlation information required to correlate method invocations and parts of a distributed transaction in a way that memory required for storing said correlation information is independent of the nesting level of method invocations or sub-transactions. The constant memory requirement of the correlation information makes memory consumption caused by the monitoring tool more predictable and is especially useful for tracing transactions containing recursive method calls.

In the case of blocked transactions, embodiments of the present invention enable exact real-time determination of the method that caused the blocking of the transaction and the server at which the blocking method is executed.

Embodiments of the present invention allow exact correlation of local and remote sub transactions spawned by a transaction at method invocation level, including also the sequence of multiple sub transactions spawned during the execution of one instrumented method.

Embodiments of the disclosed system and method provide correct tracing and monitoring data of distributed transactions if only a subset of the application servers involved in the execution of a transaction is instrumented. If one or more application servers within the execution chain of a transaction are not instrumented, correct tracing data is provided up to the first non-instrumented server.

Embodiments of the present invention enable the reconstruction of the temporal sequence of method invocations being part of a distributed transaction which are executed on different servers, without the requirement that the timing systems at the servers involved in executing the distributed transaction be synchronized with each other.

All calculations regarding acquired measurement data and correlation of parts of distributed transactions or method invocations are performed outside of the monitored applications to reduce monitoring caused overhead within the applications.

An agent is deployed to the monitored applications on startup, which monitors and intercepts loading of bytecode by the virtual machine.

In some embodiments, the agent captures said bytecode and sends it to a remote instrumentation server for instrumentation.

The instrumentation server extracts meta-data from the received bytecode, including, but not limited to, the name of the class represented by the bytecode and names of the methods of the class. Said instrumentation server determines, according to the extracted meta-data (which may also involve the evaluation of rule sets), which methods should be augmented with instrumentation bytecode. Instances of said instrumentation bytecode are further called sensors.

A sensor indicating the entry and a sensor indicating the exit of an instrumented method are placed, which are further called entry sensors and exit sensors. Entry sensors are placed at the beginning of an instrumented method and exit sensors are inserted at every exit point of an instrumented method.

Instrumented methods may be exited in a normal way, e.g., by the execution of a return statement, or through an exception which occurred during method execution and which is not handled within the method. Both exit types are fundamentally different, are handled differently by different instrumentation code, like an enclosing try-catch block to capture exceptions, as known in the art. For the demonstration of the functionality of embodiments of the present invention, a distinction between said method exit types is not relevant and is thus omitted. The exit sensors of the embodiments described herein handle both kinds of method exits.

Entry and exit sensors use the storage of the local thread to store and retrieve information required to correlate separate method invocations within a single thread.

Additional sensors are placed in methods starting threads, initiating remote method calls, or methods sending messages using messaging infrastructure like a messaging server. Those sensors are further called tagging sensors. Tagging sensors extract information required to identify a parent thread which, e.g., starts another thread, invokes a remote method or sends a message. Said extracted information is used to correlate measurement data from the parent thread with measurement data from dependent threads. The tagging sensors store said extracted information in a place which is accessible for both the parent thread and the thread or threads invoked by the parent thread.

In case of a thread directly invoked by the parent thread, said extracted information is stored in an object representing the invoked thread. In a Java environment, the extracted correlation information is stored in an additional field to classes implementing the "java.lang.Runnable" interface which was inserted by the instrumentation engine via bytecode manipulation.

For remote method invocations, the tagging sensor stores the extracted correlation in an additional header field of the message representing the remote method invocation.

In case of a sent message, the tagging sensor adds a new parameter to the message and stores correlation information as value of the new parameter.

Although the implementation of tagging sensors for different target technologies, like local thread switches or remote method invocation differs, their basic functionality, consisting of the extraction of correlation information from a parent thread and storing it on a location which is accessible by a thread invoked by the parent thread, remains the same. As a differentiation of tagging sensors according to their addressed target technology is not relevant for the understanding of the present invention, such a differentiation is omitted and tagging sensors are referred to as tagging sensors, regardless of the addressed target technology.

Methods that directly or indirectly activate a thread are instrumented with a tag extraction sensor. Example of those methods are methods that process an incoming remote method invocation, methods that receive a message from a messaging server or a method that is invoked to execute a thread, like the method "run" of classes derived from the class "java.lang.Thread" for Java environments. Said tag extraction sensors retrieve the correlation information stored by the associated tagging sensor and store it in the storage of the local thread to make it accessible to entry and exit sensors.

The implementation of tag extraction sensors also differs between different target technologies, but differentiation between those implementations is not relevant for the understanding of the invention. Thus, as for tagging sensors, different implementations of tag extraction sensors are not differentiated.

On the execution of an entry sensor, the sensor first determines if the current invocation is the first invocation of an entry sensor within current thread execution by using information retrieved from the local storage of current thread. If the current invocation is the first of an entry sensor within the thread, the sensor also checks if information of a parent transaction, as transferred and initialized by tagging sensors and tag extraction sensors is available in thread local storage and sends an event indicating a new started transaction. The entry sensor updates the data in the thread local storage to indicate that an invocation of an entry sensor has occurred. Indicators for call depth and the index of spawned child transactions, stored in the current thread storage are reset. Afterwards, an event node, indicating a new started transaction, is initialized and sent to a remote correlation engine. The sent event node also contains the information to identify and correlate a parent transaction if information about the parent transaction is available in the thread local storage.

Additionally, measurement data is acquired and an event node indicating a method entry is initialized with said measurement data and sent to a remote correlation engine, and the call depth indicator is incremented.

On execution of an exit sensor, measurement data is acquired and stored in an event node indicating a method exit which is sent to a remote correlation engine. Finally the call depth indicator is decremented.

A remote correlation engine receives the events generated by entry and exit sensors and uses data extracted from said events to incrementally build data structures that reflect the execution of individual, distributed transactions. Concurrently to event correlation and building the data structure representing the transactions, an analysis module accesses said data structure to enable analysis and visualization of transaction in real-time, during the execution of the transactions.

Splitting and independently sending and correlating method entry and exit events allow the analysis of transactions that block during execution and do not return. The received entry events allow the determination of the last method entered by the transaction, which is also the blocking method. This information is important to isolate and find the root cause for the block.

Embodiments of the present invention combine instrumentation-based transaction tracing with transaction-specific sampling.

Sampling is a technology used, for example, by profiling systems. Existing profiling systems based on sampling technology are e.g. xprof[7], hprof[8] and jprofile[9]. Sampling cyclically requests call stacks for all threads running in a profiled virtual machine or process. Those call stacks are analyzed using statistical methods which provide estimates of execution times, method CPU times, wait times, synchronization times, method call nesting level, method call frequency, etc. of individual method calls.

However, conventional sampling systems introduce considerable overhead because all threads of the virtual machine are analyzed every time a sample is taken. Additionally, the statistical data obtained as a result of sampling represents the performance situation of the whole virtual machine. Conventional sampling systems do not, for example, provide any data at the granularity level of individual transactions, such as the measured execution, CPU, wait or synchronization times, captured method call parameter values, memory allocations performed during method execution, etc. of individual transactions.

Embodiments of the present invention overcome these drawbacks of conventional sampling systems. In particular, embodiments of the present invention combine sampling techniques with instrumentation based transaction tracing mechanisms in a way that overcomes the aforementioned shortcomings of sampling based monitoring systems, and additionally creates benefits in terms of reduced overhead, reduced configuration efforts and increased robustness against application code changes. First, sampling is only performed for threads executing monitored transactions, while such transactions are executing in the thread(s). Second, each requested calls stack is tagged with an ID that identifies the transaction it belongs to. Additionally, using measurement data gained from instrumentation allows more accurate calculation of sampling-based performance data, because statistical timing calculation of sampling-based data uses measured timing data of the next parent instrumented method.

This reduces sampling-caused overhead because only transaction-relevant threads (not all threads executing in the virtual machine) are sampled, and it allows minimizing the number of instrumented methods to a set of skeleton instrumentations which may consist only of instrumentations for methods executed on the entry of a transaction into the monitored system, and for methods performing a thread switch within a monitored transaction.

Applications typically use specialized libraries or frameworks for communication with their environment or for handling of user interactions, such as network communication frameworks or GUI libraries. Typically, those frameworks and libraries provide methods and functions which receive input from the environment or user and perform basic, input type specific processing. Those methods and functions are referred to as "transaction entry methods." This basic input processing may, e.g., consist in parsing and interpreting an incoming HTTP request to build standardized data structures describing the HTTP request, or it may consist in interpreting data describing a mouse click (such as screen coordinates and other parameters related to the mouse click) and then provide more high level description data, describing that a specific GUI component was selected.

After this input type specific processing, the processing results are dispatched to application specific business logic methods and functionality, which processes the received input in an application specific way.

A skeleton instrumentation contains those transaction entry methods to guarantee that transactions entering the monitored system are recognized by the monitoring system. The monitoring system will start transaction based sampling of those transactions after entry of those transactions into the system and will provide sampling based tracing data without the need for application specific instrumentation.

Those skilled in the art will understand that the set of skeleton instrumentations may be tailored to the type of monitored system or application. For example, if the monitored system does not provide a graphical user interface, the skeleton instrumentation directed to GUI frameworks and libraries may be omitted.

Examples of transaction entry methods contained within a skeleton instrumentation are methods for handling HTTP requests, methods for handling Web Service requests, generic GUI framework methods for detecting user interactions, remote method service handling methods, and message handling methods. Examples of thread switching methods that may be instrumented by a skeleton instrumentation are methods that create and start a new thread within the virtual machine or process, methods that handle remote method calls on the client side and which receive remote method calls on the server side, and methods for sending and receiving HTTP requests or Web Service requests.

It is noteworthy that those transaction entry methods in most cases also serve as entry point methods of new threads spawned by distributed transactions. If a transaction execution in a monitored thread sends e.g. an HTTP request or a Web Service request, which is received by another monitored virtual machine or process which is instrumented with aforementioned skeleton instrumentation, then handling of the HTTP or Web Service request by the receiving virtual machine or process would invoke a method instrumented by this skeleton instrumentation. As a consequence, the skeleton instrumentation is sufficient to detect different thread executions involved in the execution of individual monitored distributed transactions, and to also detect parent/child relationships between those involved threads.

This basic instrumentation can be expanded on demand, if sampling data indicates performance problems, but does not allow identification of the root cause of the problem. Additionally, reducing the number of instrumented methods makes the tracing mechanism less vulnerable to application software architecture changes which could cause instrumented methods not to be used any more for transaction execution. Skeleton instrumentation includes, e.g., transaction entry points and thread switching methods, which in most cases are not affected by architectural changes because they typically are independent of application logic. The application specific handling of those requests is performed by nested method calls, dependent on the application business logic. This application specific handling may change and perform different method calls, after, e.g., an update of the application version or business logic.

In contrast, a pure instrumentation-based tracing system may fail in such situations because, e.g., instrumented methods may no longer be called due to changes in the implementation of business logic, or because methods may no longer be instrumented due, for example, to a changed method name. A combined sampling/instrumentation based tracing approach, such as that disclosed herein, still obtains information about called methods and statistical performance metrics of those methods, because sampling in a combined sampling/instrumentation system is independent of instrumented methods.

Another benefit of the techniques disclosed herein for combining instrumentation-based tracing with sampling-based tracing is that such an approach allows sampling-based tracing data to be arbitrarily enriched with instrumentation-based tracing data. In particular, the combined tracing system disclosed herein allows transactions to be traced with minimal overhead with the transaction sampling mechanism. This provides statistical performance information about all method executions involved in the execution of a monitored transaction, causing minimal overhead. Additionally, this statistical performance information can be arbitrarily enriched with measured performance information by adding instrumentation to methods involved in the transaction execution. This enables, for example, performance measurements to be concentrated on methods that are particularly important or relevant to performance, by placing instrumentations only in those methods and relying on statistical performance data provided by thread sampling for the other methods.

Some embodiments of the present invention provide an agent with the ability to instrument the bytecode of monitored applications autonomously. Autonomous instrumentation is instrumentation in which the agent can perform instrumentation without cooperation from an external entity, such as an external instrumentation engine. For example, the agent may perform autonomous bytecode instrumentation using a local instrumentation engine and local instrumentation configuration data. One example of local instrumentation configuration data may contain a set of instrumentation rules defining which portions of bytecode should be instrumented, and which portions of bytecode should be injected into original bytecode to create instrumented bytecode (sensor bytecode). Examples of such instrumentation rules may be found in commonly owned U.S. patent application Ser. No. 11/744,876, entitled, "Method And System For Adaptive, Generic Code Instrumentation Using Run-Time Or Load-Time Generated Inheritance Information For Diagnosis And Monitoring Application Performance And Failure." The local instrumentation configuration data may also contain the bytecode of the sensors which are referred by the instrumentation rules contained in the instrumentation configuration data.

Some embodiments of the present invention may monitor the delay caused by the sampling of monitored transactions and adapt the sampling frequency according to the monitored delay to guarantee a maximum average sampling caused delay of monitored transactions.

Other embodiments may provide a combined sampling and instrumentation based transaction tracing system which performs merging of instrumentation based tracing data and sampling based tracing data based only on call stack data, making the merging process nearly independent of timestamp information retrieved from the monitored application. Especially on modern hardware systems with multiple CPU cores, clock time for different cores may deviate which may makes it inadequate to determine the temporal order of sampling based and instrumentation based events which may are generated in different threads which may be executed on different CPU cores. The complete correlation and merge process, which first creates instrumentation based transaction tracing data, describing call sequence and nesting level of monitored executions of instrumented methods, which is then enriched with sampling date derived method calls, is performed outside of the monitored application. The communication between threads executing the monitored transactions, and the thread performing the transaction specific sampling is reduced to a minimum (registration of thread for sampling on first entry of instrumented method, deregistration on last exit of instrumented method). This also minimizes the synchronization points between the sampling thread and the threads executing monitored transactions to a minimum and reduces the monitoring overhead created by the combined sampling and instrumentation based monitoring system.

Yet other embodiments may in some specific situations, where call stack data alone would provide an incorrect or ambiguous result, use timing information of instrumentation detected method invocations and a sample creation timestamp to refine and adjust the resulting merged transaction tracing information.

An autonomous instrumentation agent may use its local instrumentation engine and local instrumentation configuration data to autonomously transform received original bytecode into instrumented bytecode.

An autonomous instrumentation agent may receive updated instrumentation configuration data at any time after startup of the monitored application, such as by connecting to an external instrumentation controller to receive such updated instrumentation configuration data. The agent may then update the instrumentation of the monitored application according to the updated instrumentation configuration data. The effect of such updating may be the same as if the autonomous instrumentation agent had initially instrumented the monitored application using the new instrumentation configuration data.

On some virtual machine versions and types, some types of bytecode modifications are limited to the load time of the modified original byte code. Examples for such limitations are changes to the structure of a class defined by the loaded original bytecode, like e.g. adding new member variables or methods to the class. On receiving an instrumentation configuration data update, the autonomous instrumentation agent may only apply instrumentation rules not containing load time limited bytecode modifications for immediate instrumentation update of the monitored application. Instrumentation rules containing load time limited bytecode modifications may be persisted by the agent instrumentation engine and be applied on the next start of the monitored application.

The autonomous instrumentation agent may also, at any time after application startup, gather measurement data from the monitored application, connect to an external correlation engine, and start to provide performance measurement data to the external correlation engine.

The described features of an autonomous instrumentation agent may also be used to implement a failover system for the centralized instrumentation controller/correlation engine, because the local instrumentation repository maintained by the agent instrumentation engine also contains context information of all placed sensors in form of sensor context nodes. Those sensor context nodes contain all data required to interpret measurements provided by executed sensors.

If a running instrumentation controller/correlation engine becomes unexpectedly unavailable after an autonomous instrumentation agent has connected and the instrumentation of the monitored application has been performed according to the instrumentation configuration repository of the instrumentation controller, the autonomous instrumentation agent may establish connections to failover instances of instrumentation controller/correlation engine, synchronize its sensor context nodes with the failover instrumentation controller and send further measurements to the failover correlation engine.

Autonomous instrumentation may speed startup of the monitored application, because the monitored application may be started up without needing to connect to an external instrumentation engine and without needing to transfer any original or instrumented bytecode over the network as part of the instrumentation process. In contrast, when using non-autonomous instrumentation, instrumented bytecode typically must be transmitted over the network to the monitored application before the monitored application may start up, thereby delaying the startup of the monitored application.

Furthermore, in a setup where a large set of applications needs to be instrumented and such applications start simultaneously or nearly simultaneously (e.g., in a cluster architectures), autonomous instrumentation may speed up startup of the monitored applications because instrumentation is performed independently and in parallel by multiple agents deployed locally to the multiple monitored applications. In contrast, when using non-autonomous instrumentation, a single external instrumentation engine typically is responsible for instrumenting all bytecode received from all agents sequentially. Such a process can be significantly slower than using multiple agents to perform instrumentation in parallel.

Non-autonomous instrumentation typically requires a stable network connection between the agent and an external entity (e.g., an external instrumentation engine) throughout the instrumentation process because of the need to transmit original (uninstrumented) and instrumented bytecode over the network. In contrast, autonomous instrumentation does not require such a stable network connection, because the use of an agent located locally to each instrumented application eliminates the need to transmit original or instrumented bytecode over the network. Although updated instrumentation configuration data may be transferred from an external instrumentation controller to the agent over the network, a stable network connection is only required during transfer of the instrumentation configuration data, rather than at all times during application startup and instrumentation. The updated instrumentation configuration may be persisted by the receiving agent to be available on subsequent starts of the monitored application. For those subsequent application starts, the agent may use the updated instrumentation configuration to perform instrumentation.

Furthermore, even if the network connection between the agent and the external instrumentation controller becomes unavailable when needed to provide instrumentation configuration data to the agent, this need not prevent the agent from performing instrumentation immediately. Instead, the agent may perform instrumentation using, for example, default instrumentation configuration data which may be installed at the computer system running the monitored application when the agent is installed.

The default instrumentation configuration data may, for example, contain instrumentation configurations for the aforementioned skeleton instrumentation. The skeleton instrumentation may be application independent, and is required to enable sampling based transaction tracing and performance measurement. This instrumentation configuration may in most cases be sufficient to provide the required transaction performance monitoring data, and in other cases at least provides a good starting point for application specific instrumentation.

BRIEF DESCRIPTION OF THE DRAWINGS

FIG. 1: shows a distributed transaction which is traced by a tracing system using a combined instrumentation and transaction specific sampling tracing approach.

FIG. 2a: conceptually depicts the process of instrumenting selected methods of monitored applications with sensors, and shows extraction and storage of sensor context information.

FIG. 2b: shows the process of autonomous instrumentation of a monitored application.

FIG. 3: shows a sensor context node which may be used to store contextual information concerning a specific instrumented sensor.

FIG. 4: illustrates a part of a monitored transaction where one thread activates another thread running within the same virtual machine. The transfer of correlation information between threads and sending of path events is shown.

FIG. 5: shows a block diagram of the part of the agent responsible for creating thread method call stacks for transaction executing threads, called sampling agent.

FIG. 6a-b: show data records for managing transaction executing threads and information about methods called by those threads.

FIG. 7a-b: depict the process of registering and deregistering transaction executing threads with the sampling agent.

FIG. 8a-b: shows the process of retrieving call stacks from transaction executing threads, creating sampling event records containing incremental call stack data out of them and sending the created sampling event records to the server.

FIG. 8c: shows a time sequence of samples with overhead controlled sampling frequency.

FIG. 9: depicts a part of a monitored transaction where one thread invokes a remote method, which may be executed by a different virtual machine, running on different host systems, connected by a computer network. It also shows the transfer of correlation information within the network message representing the remote method invocation.

FIG. 10: depicts a monitored transaction that sends a message using a dedicated messaging infrastructure like a messaging server to one or more recipients, including the transfer of correlation information within the sent message. If the message is multiplied and sent to multiple recipients, also the attached correlation information is multiplied.

FIG. 11: conceptually shows a parent info data structure which may be used to transfer correlation information between different threads. The threads may run in different virtual machines, which may in turn run on different hosts, which are connected by a computer network.

FIG. 12: depicts a tag info data structure which may be used to store information to correlate a chain of distinct method calls within one thread.

FIG. 13a-e: show different types of event nodes which are used to notify the correlation engine about events that occurred within monitored applications. More specific, it conceptually depicts a start path event node, which may be used to indicate the start of a transaction, a path event node which may indicate the entry or exit of a monitored method, a path correlation node, which may be used to indicate a thread switch within a monitored transaction, a path sampling event node which may be used to transfer incremental call stack data, and thread state of a transaction executing thread, and a methodId event which may be used to transfer information about a method called by a transaction executing thread.

FIG. 14a-b: describes the process of transferring correlation information between two different threads, being part of a monitored transaction. FIG. 14a conceptually shows the actions performed within the thread that initiates the thread switch. The process of extracting the transferred correlation information in the activated thread is shown in FIG. 14b.

FIG. 15a-b: shows the transfer of correlation information between a client thread that invokes a remote method and a server thread that executes the invoked method. Both threads may be executed on different host systems which are connected by a computer network. FIG. 15a shows the transfer of correlation information to the network message representing the remote method invocation, and FIG. 15b depicts how said correlation information is transferred to the local storage of the thread serving the remote method call.

FIG. 16a-b: depicts the process of transferring correlation information within messages sent via dedicated messaging services, like messaging server. FIG. 16a shows how the sending thread adds correlation information to a message before it is sent, and FIG. 16b depicts the extraction of the correlation information by the thread that receives the message.

FIG. 17: conceptually depicts the execution of a method entry sensor. The entry sensor first checks if the tag info node stored in the thread local storage indicates if a parent thread is assigned to the current thread and if the current entry sensor invocation is the first within the current thread and sends path events nodes accordingly.

FIG. 18: shows the execution of a method exit sensor. The exit sensor first checks if the tag info node stored in the thread local storage indicates that at least one entry sensor was executed within the current thread. In this case, an event indicating a method exit is sent.

FIG. 19a-d: depict data structures of path nodes correlation nodes which may be used to represent parts of individual transaction. More specific, it depicts a start path node, which represents a part of a transaction executed within one thread. A path node represents an individual execution of a method, a path correlation node is used to link the parts of one transaction executed within different threads into a complete end-to-end transaction, spanning multiple threads, virtual machines or host machines, and a path sampling method node representing an individual method execution detected by transaction specific thread call stack sampling.

FIG. 20: shows the processing of a received start path event by the correlation engine.

FIG. 21: shows the processing of a received path correlation event by the correlation engine.

FIG. 22: shows the processing of a received path event by the correlation engine.

FIG. 23: shows the processing of a received sampling event by the correlation engine.

FIG. 24: shows processing of a received methodId event by the correlation engine.

FIG. 25a-c: shownodes to store method call stacks of transaction executing threads in incremental and expanded form.

FIG. 26: shows an outline of the process of receiving both instrumentation and sampling based tracing data of a transaction, merging instrumentation based and sampling based tracing data, and using measurement data from instrumentation based tracing data to calculate payload data of method calls derived from sampling data.

FIG. 27a: shows an outline of the process of merging instrumentation based tracing data with sampling based tracing data and calculation of payload data of sampling data derived method calls.

FIG. 27b: depicts situation where call stack only based merge of instrumentation based data and sampling based data may produce incorrect results.

FIG. 28: depicts the process of expanding incremental path sampling nodes to full path sampling node which contain full method call stacks instead of call stack differences.

FIG. 29: shows the initialization of the process which merges instrumentation based tracing data with sampling based tracing data.

FIG. 30: shows the process of determining how a call stack received with sampling data matches a call stack derived from instrumentation based data.

FIG. 31: depicts the process of decomposing the method call stack derived from instrumentation based method calls until it matches the method call stack of a path sampling node.

FIG. 32: shows the process of calculating payload data of sampling derived method calls which are nested to an instrumented method call.

FIG. 33: shows the process of expanding the method call stack derived from instrumentation based method calls until it fully matches the method call stack of a path sampling node.

FIG. 34a: depicts the process of adding sampling method nodes of a path sampling node fully matching an instrumentation derived method call as nested method calls of the instrumented method call to the transaction tracing data.

FIG. 34b: shows a situation where sibling method calls detected by instrumentation and sampling are ordered incorrect.

FIG. 34c: shows the process of correctly reordering incorrectly ordered sibling method calls detected by instrumentation and sampling.

FIG. 35: shows a flowchart of a method that is performed by the system of FIG. 2b according to one embodiment of the present invention.

DETAILED DESCRIPTION

Embodiments of the present invention include a system that allows tracing individual distributed end-to-end transactions. The execution of said traced transactions may involve multiple threads, virtual machines, and host systems. The system allows tracing communication performed by said distributed transactions over multiple channels. The tracing mechanisms described herein cover communication via sending of messages using messaging services like Sun Microsystems' JMS or Microsoft's Messaging Queue, invoking remote messages, or explicitly activating threads, but embodiments of the present invention are independent of the underlying communication mechanism and may also be applied to other mechanisms, like Web Service calls. The only prerequisite for a successful application of embodiments of the present invention is that the communication mechanism allows adding correlation information to sent messages as out-of-band information.

Embodiments of the present invention generate correlation information which allows reconstructing the chronological execution sequence of parts of distributed transactions executed on different hosts, even if the clocks of said hosts are not synchronized.

FIG. 1 shows a particular example of the monitoring of a distributed transaction according to one embodiment of the present invention. The particular details of the transaction, threads, methods, and other elements shown in FIG. 1 are merely examples and do not constitute limitations of the present invention. In FIG. 1, distributed transaction D1 is executed by the two threads T1 and T2. T1 and T2 may be run by two different virtual machines which may, for example, run on the same host as each other or on different hosts connected by a computer network. Agents are injected into both virtual machines and the agents are connected to the same correlation/analysis module.

In FIG. 1, transaction D1 is an example of a "monitored transaction" as that term is used herein. As used herein, the term "monitored transaction" refers to a transaction that is executed by one or multiple threads (where such threads may be executed sequentially or in parallel), on one or multiple virtual machines, and where at least one thread execution entered at least one instrumented method. If a monitored transaction enters an instrumented method and spawns child threads during execution of the instrumented method, execution of those child threads is recognized as part of the monitored transaction with the first entry of an instrumented method.

D1 enters the monitored system by calling the transaction entry method M1, which is executed by thread T1. This causes the start of method call stack sampling of T1. Such sampling may, for example, be cyclic. During execution of D1, methods M1 through M5 are called, whereof only M3 is instrumented. An approach which only relies on instrumentation would not detect the calls of M2, M4 and M5, because those methods are not instrumented. However, samplings S2 to S8 detect the call of M2, samplings S4 to S7 detect M4 as a nested call of M3, and sampling S5 detects M5 as nested call of M4.

After M2 returns, M6 is called, which in turn executes the instrumented remote method call R1. Executing R1 causes execution of M7 by the remote method execution thread T2 by the second virtual machine. Entry of M7 causes the start of cyclic call stack sampling of T2, which generates samples S1' to S5'. M7 calls M8 to M10, all of which are detected by method call samples of T2. After M7 returns, which terminates the execution of D1 in T2, sampling of T2 is stopped.

M6 processes the results of R1 and returns to M1, which then also returns and terminates the processing of D1 in T1, which also stops sampling of T2.

This example shows the efficient usage of method call sampling, because only threads that are involved in execution of the transaction D1 are sampled, and because such sampling only occurs while transaction D1 is being executed. For example, only methods in threads T1 and T2 are sampled in the example described above because threads T1 and T2 participate in a transaction that is being monitored by the system of FIG. 1. If other threads (not shown in FIG. 1) were executing on the same virtual machine(s) as threads T1 and/or T2 at the same time as threads T1 and/or T2, and such other threads were not involved in a transaction being monitored by the system of FIG. 1, then the system of FIG. 1 would not sample such other threads because they are not part of a monitored transaction. This contrasts with existing sampling systems, which sample all methods executing in all threads being monitored in a virtual machine, regardless of whether such methods/threads are involved in a monitored transaction. Additionally, threads T1 and T2 are only sampled while they participate in the execution of the transaction D1. If T1 and T2 would execute other methods before or after execution of method belonging to D1, those methods would not be sampled (unless those methods belonged to another monitored transaction).

The example of FIG. 1 also shows how method call information gathered from thread sampling can enrich transaction tracing data generated by instrumented methods. Referring to FIG. 1, a pure instrumentation based monitoring system would e.g. not detect that M1 calls M2 before it calls the instrumented method M3. Additionally, the calls M4 and M5 would not be detected. A pure instrumentation bases system would detect a call stack like M1→M3, whereas a monitoring system using a combined sampling/instrumentation based approach would detect a call stack like M1→M2→M3-M4→M5. The example of FIG. 1 additionally shows how measurement data obtained from instrumented methods may be used to improve the accuracy of calculated method call performance parameters of method calls detected by sampling, compared to a pure sampling-based system. For example, the instrumented method M3 provides performance parameters of method M3, which may be used to calculate performance parameters of the nested calls M4 and M5, instead of using the measurement data of M1 and allocating it to M2 and M6 and M3 according to retrieved sampling data. A pure sampling-based system would start sampling at an arbitrary point of time, and end sampling at an arbitrary point of time. Then, after sampling is stopped, parameters such as the elapsed time and CPU time of all sampled threads would be fetched from the system. These grand total performance parameters for each thread would then be allotted to method calls, according to their frequency of occurrence in the gathered samples. This grand total statistical calculation may level out some outlier transaction, hiding, for example, individual transactions showing performance problems.

A combined method implemented according to the present invention may use the performance measurements from instrumented methods to calculate performance data of nested method calls which were detected by samples. This per transaction/per instrumented method calculation of statistical performance eliminates the problem of leveling out individual slow/performance problematic transactions or method calls.

Referring now to FIG. 2a, therein a monitored application 201 is shown which is running within a virtual machine 202. An agent 203 is injected into said virtual machine 202, which intercepts the loading of original bytecode 206, performed by the native loader 205, and captures said original bytecode 206. Each agent 203 is provided with a unique agentId 204, which is added to messages sent by the agent 203 and thus allows distinguishing messages received from different agents 203.

The captured bytecode 206 is sent to an instrumentation engine 208. The captured bytecode may be sent via a computer network 218. The instrumentation engine 208 extracts meta-data from the received original bytecode 206. The meta-data is used to identify and select the parts of the original bytecode which are augmented with sensor code. Said bytecode parts consist of but are not limited to class definitions, method definitions, and constant pools. The selection of said bytecode parts may be based on explicitly specified method and class names, identifying single methods or classes, or it may use a rule-based system where one rule may match multiple classes or methods. Sensor code is placed in the selected parts of the original bytecode 206 and the instrumented bytecode 207 is sent back to the agent 203 which forwards said instrumented bytecode 207 to the bytecode loading process of the virtual machine 202 which loads the instrumented bytecode 207 instead of the original bytecode 206. Sending the instrumented bytecode 207 may be performed via a computer network 218.

The instrumentation engine instruments 208 methods which should be monitored 210 with entry sensors 211 to detect invocations of monitored methods and exit sensors 212, which detect when execution of monitored methods is finished. Exit sensors detect both normal method exits and exits caused by an unhandled exception. It should be noted that a distinction between both exit types is useful for a monitoring system to provide correct monitoring information. But this distinction does not foster the understanding of the present information and is thus omitted here.

The instrumentation engine 208 may use a) instrumentation rules 206a and b) sensor bytecode 207a, both stored in an instrumentation configuration repository 219 to a) identify portions of original byte code which should be instrumented, and to b) retrieve the sensor byte code which is about to be injected into original bytecode to create instrumented bytecode.

The instrumentation engine 208 also places tagging sensors 214 in methods that initiate an interaction with other threads or virtual machines, like methods sending synchronous or asynchronous messages using messaging oriented middleware, methods preparing network messages representing remote message invocations, or methods initiating an interaction with another thread within the same virtual machine. Those tagging sensors 214 extract correlation information from the thread local storage, which is created by entry sensors 211, and store it in a place where it is accessible for the target threads. Placement of tagging sensors 214 may also include insertion of additional member variables via bytecode manipulation, to store said extracted correlation information.

Additionally, tag extraction sensors 216 are placed in methods that receive interactions from other threads, like methods receiving synchronous or asynchronous messages, methods receiving messages representing remote method invocations, or methods starting a new thread. Those methods are subsumed here as thread activation methods 215. Tag extraction sensors 216 build the counterpart to tagging sensors 214. The tag extraction sensors store received correlation information within the thread local storage, where it is accessible for other sensors 211, 212 or 214.

The instrumentation engine incrementally builds a sensor context repository 209, which contains context data related to the placed sensors. Said context data is retrieved from meta-data extracted from the received original bytecode 206 and may contain but is not limited to the name of the class and method where the sensor is placed. Each sensor context data entry is tagged with a unique sensorId. Placed sensors send this sensorId with every message, which allows correlating measurement data received with said messages with the context of the related sensor, without including context information in each sent message.

FIG. 2b shows an alternative instrumentation process, which allows independent and autonomous instrumentation of a monitored application, without the requirement to connect to an external instrumentation engine. FIGS. 35a to 35c show flowcharts describing a method that is performed by the system of FIG. 2b according to one embodiment of the present invention.

This alternative instrumentation process allows autonomous instrumentation of the monitored application, without the requirement to communicate with an external instrumentation controller 204a during instrumentation, to obtain instrumentation rules 206a or sensor byte code 207a, because this data is fetched from a local instrumentation repository 202a.

The process also allows a centralized control of the instrumentation process by an instrumentation controller 204a, which maintains an instrumentation configuration repository, containing a "master copy" of the instrumentation rules 206a and sensor bytecode 207a. In case a new agent connects to the instrumentation controller, the instrumentation controller 204a sends messages to the new agent containing the data stored in the instrumentation configuration repository. The agent stores the received data in its instrumentation repository, adapts existing instrumentations to be conform with the new instrumentation rules and sensor bytecode, and also uses the new instrumentation rules and sensor bytecode for instrumentation of new loaded bytecode. The connection between instrumentation controller 204a and agent 203 may then be closed.

In case of an update of the data stored in the instrumentation configuration repository, which may, e.g., be caused by a user interaction that changes some instrumentation rules, the instrumentation controller 204a may send messages containing the updated instrumentation rules and sensor bytecode to all connected agents, which may use the new rules and sensors to adapt existing instrumented bytecode and to create new instrumented bytecode.

An agent 203 is injected into the virtual machine 201 that executes the monitored application 202 The agent 203 also intercepts bytecode loading requests and captures original bytecode 206 received from the native loader 205 (step 3501 of method 3500). But instead of sending the original byte code 206 to an external instrumentation engine 208, the agent 203 forwards the original bytecode to an agent instrumentation engine 201a for instrumentation (step 3502). The agent instrumentation engine 201a may, for example, run as part of the virtual machine 202 that hosts the monitored application 202 and the agent 203. As a result, the agent instrumentation agent 201a is located on the same network node as the corresponding agent 203. One consequence of co-locating the agent 203 and the corresponding agent instrumentation engine 201a is that the agent 203 and the agent instrumentation engine 201a are coupled tightly with each other and may therefore share the same memory (address) space and communicate using tightly coupled mechanisms such as direct method calls (rather than remote method calls).

One distinction, therefore, between the system of FIG. 2a and the system of FIG. 2b is that in FIG. 2a the instrumentation engine 208 is a global resource that is shared among all connected agents (such as agent 203 and other agents connected to the instrumentation engine 208), while in FIG. 2b the role played by the instrumentation engine 208 of FIG. 2a is divided between the instrumentation controller 204a, which is a global shared resource shared among all connected agents (such as agent 203), and the autonomous agent instrumentation engines (such as agent instrumentation engine 201a) of each of the connected agents. One consequence of the difference between the systems of FIGS. 2a and 2b is that in the system of FIG. 2b it is no longer necessary to transfer original bytecode or instrumented bytecode over the network 218.

Another embodiment may, to conserve resources of the monitored application, provide an agent that runs the agent instrumentation engine in a separate process on the computer system running the monitored application and employ inter process communication between the agent and the out of process instrumentation engine to perform instrumentation.

In yet another embodiment, the agent instrumentation engine 201a executes on a different computer and/or network node than the corresponding agent 203. One benefit of such an embodiment is that it would shift the processing load caused by instrumentation to a separate computer and thereby decrease the load on the computer that hosts the virtual machine 202. Furthermore, this embodiment would still retain the benefit of distributing responsibility for instrumentation among many autonomous instrumentation engines, each of which is associated with a corresponding agent, rather than consolidating all instrumentation responsibility in a single global instrumentation engine. The performance of such an embodiment could suffer, however, from increased network latency and might not be useful if the network connection between the agent and corresponding agent instrumentation engine is not sufficiently fast and/or stable.

The agent instrumentation engine 201a accesses an instrumentation repository 202a to get instrumentation rules 206a, to determine which parts of original bytecode 206 should be instrumented (step 3503), and to get sensor bytecode 207a which the agent 203 may insert into the original bytecode 206 according to the instrumentation rules 206a to create instrumented bytecode 207 (step 3504). The agent instrumentation engine 201a may create sensor context nodes 301 (step 3505), describing the context of sensors inserted into original bytecode 206 and may store those sensor context nodes 301 in the instrumentation repository 202a (step 3506).

Additionally, the agent instrumentation engine 201a may store a copy of the original bytecode 206 in the instrumentation repository 202a if, for example, the virtual machine 201 provides no mechanism to request original bytecode 206 (step 3507). The stored original bytecode 206 may be required to, e.g., change instrumentation of the monitored application 201 by replacing instrumented bytecode 207 with a new version of instrumented bytecode 207, or to remove instrumentation by replacing instrumented bytecode 207 with original bytecode 206.

The agent 203 may afterwards check if a connection to an external instrumentation controller 204a is established (step 3508), and in this cases send the previously created sensor context nodes to this external instrumentation controller (step 3509). The method 3500 then ends 3510.

An initial instrumentation repository 202a, containing instrumentation rules and sensor bytecode to perform instrumentation of entry methods 210, thread switch methods 213 and thread activation methods 215 (the aforementioned skeleton instrumentation) is deployed with the agent 203. Technically, entry methods are not different from other methods, but those methods represent or are parts of interfaces through which transactions enter an application. Typically, those methods are parts of common, interface technology specific libraries and do not contain application specific code. An example for such entry methods would be HTTP request handler methods, which receive HTTP requests, process the requests in a generic way, and forward the processed request data to application specific methods which handle the incoming requests.

The instrumentation repository 202a may be implemented, for example, as a file system based repository, where all data is stored in files residing on file storage of the computer system running the virtual machine 202 hosting the monitored application 201. Alternatively, for example, the instrumentation repository 202a may be implemented as an in process repository, where all data is stored in the memory of the process running the monitored application 201. As yet another example, the instrumentation repository 202a may be implemented as a combination of both a file system and a process repository, such as by storing sensor bytecode in the file system and storing elements requiring quick access, such as instrumentation rules, in the process memory to maintain both fast instrumentation speed and low memory overhead.

An external instrumentation controller 204a runs in a separate process from the agent instrumentation engine 201a. The instrumentation controller 204a may, for example, run on the same network node as the monitored application 201 or on a separate network node as the monitored application 201 but be connected to the network node that runs the monitored application 201. If there are multiple monitored applications, the agents deployed to those multiple applications may all connect to the same instrumentation controller 204a.

The instrumentation controller 204a may connect to the agent 203 at any time, at or after start of the monitored application 201 (FIG. 35b, initial step 3520). Additionally the instrumentation controller may send messages with updated instrumentation rules and updated sensor bytecode to connected agents 203 at any time. At the time of connection between instrumentation controller 204a and agent 203, the agent 203 and instrumentation controller 204a may check if sensor bytecode 207a and instrumentation rules 206a stored in the instrumentation repository 202a are consistent with the instrumentation rules 206a and sensor bytecode 207a stored in the instrumentation configuration repository 219 of the instrumentation controller. This may be performed by the agent 203 receiving a message containing meta-data describing the current content of the instrumentation configuration repository 219 (step 3521). This message may contain but is not limited to an update revision number of the instrumentation configuration repository. The agent may compare this meta-data to check if the instrumentation configuration data stored in the instrumentation repository 202a is consistent with the instrumentation configuration repository 219 of the connecting instrumentation controller 204a (step 3522).

If they are consistent, the agent 203 may send 205a the sensor context nodes 301 stored in the instrumentation repository 202a to the instrumentation controller 204a (step 3527), which may store the received sensor context nodes 301 in the sensor context repository 209 (step 354). The instrumentation controller may, before storing the received sensor context nodes, delete all previously received sensor context nodes from the currently connecting agent from the sensor context repository (step 3544). The sensor context repository 209 may also include sensor context nodes (not shown) describing the context of sensors not placed by the specific agent. Those sensor context nodes may describe the context of sensors placed by other agents in other applications connected to the instrumentation controller. FIG. 9 and FIG. 10 describe scenarios where multiple distributed agents in multiple distributed applications are connected to one correlation engine, which uses one sensor context repository. This sensor context repository may contain sensor context nodes describing the context of all sensors injected to all connected applications. Those scenarios also show the benefit of parallel instrumentation provided by embodiments providing autonomous instrumentation as described in FIG. 2b. The agent instrumentation engines 201a of the agents deployed to the multiple monitored applications 901 and 906 in FIGS. 9 and 1001 and 1006 in FIG. 10 may independently and concurrently instrument bytecode. This approach provides an instrumentation process with a performance characteristic which is independent of the number of connected agents, because each new connected agent also provides its local instrumentation engine.

If the sensor bytecode 207a and instrumentation rules 206a stored in the instrumentation repository are not consistent with the sensor bytecode 207a and instrumentation rules 206a stored in the instrumentation configuration repository 219 of the instrumentation controller 204a, then the instrumentation controller 204a may send its instrumentation rules 206a and/or its sensor bytecode 207a to the agent 203 (step 3543) on a corresponding request from the agent (step 3523). The agent 203 may store the received data in its instrumentation repository 202a (step 3524). Afterwards, the agent 203 first remove all sensor context nodes stored in its instrumentation repository (step 3525) and may then update the instrumentation of the monitored application 201 by creating new instrumented bytecode 207 in accordance with the new instrumentation rules 206a and injecting it into the monitored application (step 3526). After the instrumentation of the monitored application 201 is adapted to the new instrumentation rules 206a and sensor bytecode 207a, the agent 203 may send 205a the sensor context nodes 301 stored in its instrumentation repository 202a to the instrumentation controller 204a (step 3527), the instrumentation controller may store the received sensor context nodes in the sensor context repository (step 3545).

The data stored in the sensor context repository 209 may later be used by a correlation engine 407 to interpret measurements received with event nodes (1301, 1331, 1341 and 1351) (step 3546).

If the agent 203 intercepts loading of original bytecode 206 while the agent 203 is connected to the instrumentation controller 204a, new created sensor context nodes 301, representing new placed sensors, are sent to the instrumentation controller 204a (step 3509), after which they are stored in the instrumentation repository 202a of the agent 203 (3506). The instrumentation controller 204a may receive these sensor context nodes and store them in its sensor context repository 209.

If configuration data (i.e., instrumentation rules 206a and/or sensor bytecode 207a) stored in the instrumentation configuration repository 219 of the instrumentation controller 204a are updated (step 3547), the instrumentation controller 204a may forward these changes to all currently connected agents 203 (step 3548). In response, those agents may, in parallel with each other, store the updated instrumentation configuration data in their respective instrumentation repositories (step 3524), update the instrumentation of the monitored applications to which they are deployed (3526), and send sensor context nodes representing the updated instrumentations to the instrumentation controller 204a (step 3527). The method 3520 may then end 3528. As this example illustrates, making a modification to the configuration data (i.e., instrumentation rules 206a and/or sensor bytecode 207a) at the instrumentation configuration repository 219 may cause the modification to be propagated to all agents and applications that are connected to the instrumentation configuration repository 219. In this way, the instrumentation configuration repository 219 may be used as a central repository that remotely controls instrumentation performed locally at one or more connected agents/applications, without the need to manually update instrumentation configuration data at each such agent/application either locally at each agent/application or separately for each agent/application. If instrumented is performed locally at multiple connected agents/applications, such instrumentations may be performed in parallel with each other.

Updates of instrumentation rules 206a and/or sensor bytecode 207a may be enriched with additional information indicating that the updates should be applied on the next restart of the monitored application. Additionally, some brands and versions of virtual machines may only support load time manipulation of bytecode, but not manipulation of already loaded bytecode.

In such cases, the agent may only store the updates in the instrumentation repository and mark them to be applied on next restart. On the next restart of the monitored application, the agent may use marked instrumentation rules 206a and/or sensor bytecode 207a to perform instrumentation.

Some brands or versions of virtual machines may not support the application of some types of instrumentation during runtime. This may include instrumentations which perform structural changes of original bytecode, like adding variables or methods to classes, as such modifications are restricted to load time of the specific original bytecode on specific virtual machines. The agent instrumentation engine may, on an update of its instrumentation rules 206a or its sensor bytecode 207a, evaluate received instrumentation rules and sensor bytecode together with information about the brand and version of the virtual machine it is deployed to, to determine if instrumentations are applicable during runtime. In case runtime instrumentation is not applicable during runtime for specific instrumentations, corresponding instrumentation rules and sensor bytecode are only stored in the instrumentation repository, and no runtime instrumentation is performed for those specific instrumentation rule/sensor bytecode combinations. Those specific instrumentations are then performed on the next restart of the monitored application.

FIG. 3 shows a sensor context node 301, which is used to store context information related to a placed sensor. The sensorId 302 uniquely identifies the sensor that is related to the context information stored in a sensor context node 301.

Additionally a sensor metadata node provides sensor metadata 303 which contains but is not limited to a sensor type, identifying the type of the sensor which may, e.g., be a timing sensor type, measuring execution times or a counting sensor type, counting the executions of a method or suchlike; the name of the class which contains the sensor; the name of the method the sensor is injected to; the signature of said method; and the line number of the source code where the sensor is placed.

Referring to FIG. 4, showing a parent thread 401 which is interacting with a child thread 402. The information required to correlate individual method invocations within one thread to a call stack, is stored in the local storage of said threads, within a tag info node 1201.

The parent thread 401 enters an instrumented method 210, and the entry sensor 211 of said instrumented method 210 is executed. A start path event node 1301 is sent to the agent 203 if the execution of said instrumented method starts a new execution path and a path event node 1331 is sent afterwards, regardless if a new execution path is started or not. In case of a new execution path, the entry sensor 211 also registers the parent thread 401 with the sampling agent 501. The sampling agent establishes a thread reference 504 to the parent thread and starts generating path sampling event nodes 1351 and methodId event nodes 1361 for the parent thread 401. The created event nodes 1301, 1331, 1341, 1351 and 1361 are stored in a fixed size event buffer 411 of the agent 203. The agent 203 in turn sends the event node to a correlation engine 407, which may be performed using a computer network 218. If execution of the instrumented method 210 invokes a method that performs a thread switch 403, the tagging sensor 214 of the method is executed. Said tagging sensor 214 extracts correlation information required to identify the parent thread 401 and stores it in a parent info node 1101 which is attached to the object representing the child thread 402 within the parent thread 401. The object representing the child thread, which may be a "java.lang.Thread" object in Java environments, is also accessible at the child thread 402. Additionally, the tagging sensor sends a path correlation event node 1341, which allows the correlation engine 407 to correlate the execution of the child thread 402 with the execution of the instruction within the parent thread 401 that started said child thread 402. On exiting an instrumented method 210, the exit sensor 212 of said method is invoked which sends a path event node 1331 indicating a method exit to the agent 103. If executing the exit sensor 212 indicates that execution of the top level instrumented method 210 of the parent thread 401 has finished, the exit sensor 212 may also deregister the parent thread 401 from the sampling agent 501, which in turn stops creating and sending path sampling event nodes 1351 and methodId event nodes 1361 for the parent node, and removes the respective thread reference 504 to the parent thread 401.

On activating the child thread 402, the tag extraction sensor 416 is executed. The tag extraction sensor 216 reads the parent info node 1101 stored in the object representing the child thread, creates a tag info node 1201 and stores data extracted from the parent info node in the created tag info node 1201. The tag info node is stored in the thread local storage of the child thread 402.

During the first execution of an instrumented method 210 in the context of the child thread 402, the entry sensor 211 of said instrumented method stores information required to identify the child thread 402 to the tag info node 1201 stored in the local storage of the child thread 402 and registers the child thread 402 with the sampling agent 501, which establishes a thread reference 504 to the child thread and starts sampling of the child thread and starts generating and sending sampling data of the child thread 402. Afterwards the entry sensor 211 reads the information identifying the parent thread 401 from the tag info node 1201 and sends a start path event node 1201 which contains information to identify both the parent thread 401 and the child thread 402. Subsequent executions of entry sensors 211 and exit sensors 212 only send information to identify the child thread 402. If the execution of an exit sensor 212 indicates that the top level instrumented method of the child thread 402 has ended, the child thread 402 is deregistered from the sampling agent 501, the respective thread reference 504 is removed, and the sampling agent 501 stops sampling the child thread 402.

The start path event nodes 1201, path event 1231 nodes and path correlation nodes 1241 are received by a remote correlation engine 407 which transforms the received event nodes into path nodes and incrementally builds representations of the execution paths described by the received event nodes. Additionally, the correlation engine 407 receives path sampling event nodes 1351 and methodId event nodes 1361 which are used to augment the execution path representation with sampling generated data. The received methodId event nodes 1361 are stored in the agent method repository 410 of the correlation engine 407. Transfer of said event nodes may be performed via a computer network 218. Said execution path representations are stored in a path repository 408, which may concurrently be accessed by an analysis module 409 to evaluate the available execution path representations and which may also present the analyzed execution paths to the user. The analysis module also accesses the sensor context repository 209 for context information of the sensors that created the event nodes which where used to build the execution paths.

FIG. 5 shows a detailed block diagram of the sampling agent 501 which holds thread records 601 representing threads executing a monitored transaction 507 in a transaction thread list 502. The sampling agent also maintains a method repository 506, which contains methodId records 620. Those methodId records 620 contain information about all methods detected during sampling of transaction executing threads 508. It is noteworthy that currently executing threads in the same virtual machine that are not executing monitored transactions 508 are not represented in the transaction thread list 502. The sampling agent runs a sample creation thread 505, which cyclically fetches method call stacks for all threads represented in the transaction thread list and creates path sampling event nodes 1351 for each sampled thread, and methodId event nodes 1361 for each new detected method in a fetched call stack. The created event nodes 1351 and 1361 are placed in the fixed size event buffer 411 of the agent 203.

FIG. 6 shows a thread record 601 (FIG. 6*a*) and a methodId record 620 (FIG. 6*b*), used to store thread references and data about methods detected by sampling. A thread record 601 may contain a thread reference 610, which allows accessing the corresponding thread to, e.g., request a current method call stack, or to read data from its local thread storage. The thread record 601 may also contain a last sampling call stack 611, which may be used to store the method call stack of the most recently-performed sampling to calculate a differential call stack between the previous call stack and the current call stack. The thread record may also contain a local pathId 612 which may be used to tag path sampling event nodes 1351 with the local pathId of the sampled thread.

A methodId record 620 contains a methodId which uniquely identifies a method within a virtual machine, together with meta-data describing the method, containing but not limited to method modifiers 622, a method name 623, a method signature 625 and a class name. Additionally it may contain a dirty flag which may be used to indicate if the respective methodId record 620 needs to be transferred to the agent method repository 410 of the correlation engine 407.

For a thread to be sampled, it must first be registered with the sampling agent. FIG. 7*a* shows the process of registering for sampling a thread which starts executing a monitored transaction. FIG. 7*b* shows the process of deregistering a previously-registered thread upon ending of the execution of a monitored transaction by the thread (FIG. 7*b*).

If transaction execution start is detected for a specific thread (e.g. first execution of an entry sensor by the thread), a thread record 601 is created in step 701 and its thread reference 610 is set to refer to the detected thread. The local pathId assigned to the thread is read from the tag info node 1201 stored in the thread local storage of the thread, and set to the local path id 612, and the last sampling call stack 611 is set to an invalid value. In step 702, the created thread entry 601 is stored in the transaction thread list 502 of the sampling agent 501. Thread registration ends with step 703.

If execution of a monitored transaction ended in a specific thread (e.g. call depth 1223 of tag info node 1201 is 0 after execution of an exit sensor), the thread entry 601 representing the specific thread is selected from the transaction thread list 502 in step 711, and removed from the list in step 712. Deregistration ends with step 713.

FIG. 8 describes the process 800 of creating path sampling event nodes 1351 and methodId event nodes 1361 for threads registered in the transaction thread list 502, as performed by the sample creation thread 505. As indicated in FIG. 8, the process 800 may be performed repeatedly and with variable frequency.

The process creates and sends path sampling event nodes and methodId event nodes in a way to minimize the required network bandwidth required to send those events. First, it exploits the fact that most times, an acquired call stack has only small differences to the previously acquired call stack from the same thread, and sends only differential call stacks, which allow to reconstruct full call stacks out of one full call stack followed by an arbitrary number of differential call stacks. Additionally, it maintains a list of methods for which a corresponding method event nodes was already successfully sent to the correlation engine, and only sends methodId event nodes for unknown methods.

The process is performed repetitively with varying frequency. In an initial step (801), all methodId records 620 in the method repository 506 whose dirty flag 627 is set are fetched; corresponding methodId event nodes 1361 are created and sent to the correlation engine. The dirty flags of all fetched methodId records are cleared afterwards.

Step 802 checks if the transaction thread list 502 contains a (next) thread record 601. If one is available, it is fetched in step 803, and in step 804 the current call stack is obtained from the thread referred by the thread record 601. It is noteworthy that step 804 may be performed for all threads referred in the transaction thread list simultaneously or in parallel with each other, if the virtual machine provides mechanisms to obtain call stacks for multiple threads simultaneously or in parallel with each other and if performance of this mechanism is better than fetching each call stack separately.

Next, a new path sampling event node 1351 is created in step 805, the agentId 1352 is set to the local agentId 204, local pathId 1353 is set to the local pathId of the thread record 601. Additionally, a current timestamp is fetched and set to the sample acquisition timestamp 1357 of the created path sampling event node. Payload data from the thread, which may contain but is not limited to thread execution state or accumulated thread CPU time is fetched and set to the payload 1357 of the path sampling event node.

In step 806, the currently fetched call stack is compared with the last sampling call stack 611 of the thread record. If both call stacks are identical (step 807) or the current call stack starts with the same methods as the last one, but contains less nested method calls (step 808), the reusable call depth index 1354 of the path sampling event node 1351 is set to the call depth of the current call stack and the new methodIds list is set empty in step 809. This indicates that the call stack of the previous event can be reused up to the reusable call depth index 1354.

Otherwise, in step 810 the index of the last common method call between current and last call stack is calculated and set to the reusable call depth index of the path sampling event node. The methodIds of all method calls nested to the last common method call are fetched and added to the new methodIds list 1355 of the path sampling event node.

In summary, step 809 or 810 generate and store differential call stack data and store the differential call stack data in the path sampling node. The differential call stack data represents the difference between the current call stack and the previous call stack.

After step 809 or 810, the process returns to step 802. If no next thread record is available, the process continues with 811 and starts sending the created path sampling event nodes. Otherwise, the process continues with step 803.

Step 811 checks if a created path sampling event node 1351 is available which has not been sent to the correlation engine 407. If such a created path sampling even node 1351 is available, it is fetched in step 812. Step 813 checks if a (next) methodId is available in the new methodIds list 1355 of the path sampling event node. If such a methodId is available, a corresponding methodId record 620 is fetched from the method repository 506 of the sampling agent in step 815. If such a methodId record 620 is available (step 816), the process continues with step 813. Otherwise, a new methodId record 620 and a new methodId event node 1361 are created and initialized with data from the respective method in step 817. The agentId 1362 of the event node 1361 is set to the agentId 204 of the agent 203, the dirty flag 626 of the methodId record 620 is set to indicate that this methodId record was not synched with the correlation engine 407. The methodId record is inserted into the method repository 506 and the methodId event node 1361 is added to the event buffer 411 to send it to the correlation engine 407. If adding the event node to the buffer was not successful (step 818), the process continues with step 813. Otherwise, the dirty flag of the created methodId record 620 is reset to indicate that the record was synched with the correlation engine. The process continues with step 813. Generally speaking, the sub process described in steps 813 to 819 assures that all methodIds for all methods referred in a sampling event are sent to the correlation engine before the sampling event is sent. This assures that all methods referred in a sampling event are known on by the correlation engine before the sampling event arrives. If all methodIds in the new methodIds list 1355 are processed, the process continues with step 820 and checks if all new methodId event nodes 1361 were successfully synched with the correlation engine 407. If sending one or more event records failed, the process continues with step 811. Otherwise, the path sampling event node 1351 fetched in step 811 is added to the event buffer 411 for sending it to the correlation engine 407 in step 821. If adding to the buffer failed, the process continues with step 811. Otherwise, the last sampling call stack 611 of the corresponding thread record 601 is set to the current call stack fetched in step 804. The process then continues with step 811.

If step 811 detects that all created path sampling event records were processed, the process ends with step 824.

FIG. 8*b* illustrates how the sampling frequency (i.e. the frequency with which the thread sample creation process as described in FIG. 8 is started) may be varied to achieve a target transaction sampling-generated overhead. Generally, a higher sampling frequency provides more data and more visibility of the monitored transaction executions, but an increased sampling frequency also increases the sampling-generated overhead and the sampling-caused delay of transaction execution. The reason for this behavior is that to obtain a stack trace from a thread, it has to be suspended for a short period of time. The higher the sampling frequency is, the more often threads are suspended and the more transaction execution is delayed.

The described embodiment uses a "target sampling overhead rate" (see FIG. 8*b*), which describes the maximum allowed transaction execution delay introduced by transaction-based sampling. The "target sampling overhead rate" may define the maximum allowed sampling-caused delay, compared to the amount of time required to execute transactions without sampling those transactions. A target sampling overhead rate of e.g. 0.01 would specify that transaction delay should not exceed 1% compared to execution of transactions that are not monitored by sampling.

The activities sampling creation thread, which cyclically executes the process described in FIG. 8 can be subdivided in sample acquisition activity, which potentially causes transaction execution delays 803*b*, sample processing time 804*b* and time periods of inactivity 805*b*, which both do not cause transaction execution delays.

The goal of the overhead based control of the sampling frequency is to adjust the inactivity time of the sample creation thread in a way that the proportion of activities not causing transaction execution delays to the activities causing transaction execution delays in average approaches the target sampling overhead rate.

The described mechanism may permanently calculate and store a moving average time required for sample acquisition.

After a finished sample acquisition, the mechanism may calculate the earliest next time of sample acquisition by determining the start time of the current sample acquisition ($T_{current\ sample}$ acquisition end "Current Sample Acquisition Time) and adding the average sampling acquisition time divided by the target sampling overhead rate to the sample acquisition start time. This mechanism controls the sample frequency in a way that in average the target sampling overhead rate is not exceeded, and that as much as samples as possible are obtained without exceeding the target overhead rate.

It is noteworthy, that runtime suspension times, caused e.g. by a garbage collector run, which also delay transaction executions, but are not related or caused by transaction sampling, may be detected and considered in the calculation of the current and average sample acquisition time. In case such a runtime suspension occurs during sample acquisition, then the time delay caused by the runtime suspension is subtracted from the measured sample acquisition time.

FIG. 9 shows a fragment of a transaction that employs remote method invocations. A thread 902 of a client application 901 is executing an instrumented method 210, which invokes a remote method. The remote method is executed at a server application 906, which may run on a different host connected by a computer network 218. Calling the remote method on the client side 903 invokes a tagging sensor 214 which extracts information required to identify the client application 901 and the current thread 902. Said extracted information contains but is not limited to a local pathId 1103, identifying the current path and an agentId 203, identifying the agent 204 deployed to the application. As there is only one agent deployed to each application and each application has its own deployed agent, the agentId 203 also identifies the client application 901. The tagging sensor stores said information in a parent info node 1101 which is attached to the message representing the remote method invocation 904. The tagging sensor additionally sends a path correlation event node 1341 to the agent which allows determining the sequence of multiple remote method invocations within the body of one instrumented method 210. The message representing the remote method invocation 904 is sent to the server application 905, which may be performed using a computer network 218.

The server application 905 receives the remote method invocation message 904 and executes a remote method service routine 907 to handle the remote method invocation request. A tag extraction sensor 216, instrumented into said service routine, extracts the parent info node 1101 from the received message and stores the contained information in the tag info node 1201 of the current thread 907.

The execution of entry sensors 211 and exit sensors 212 and the handling of different path events are performed as explained in the description of FIG. 4. It should be noted that path events sent from the client application 901 are tagged with the agentId 203 of the client application's agent 204 and path event sent from the server application 905 contain the agentId 203 of the server application's agent 204. Furthermore, registration and deregistration of transaction-executing threads for sampling during execution of entry and exit sensors is performed as explained in the description of FIG. 7 and in FIGS. 17 and 18 describing the execution of entry and exit sensors.

The transfer of parent info nodes 1101 along with remote method invocation messages 904 must take the implementation-specific characteristics of the underlying remote method invocation protocols into account, but the principle of adding parent info nodes to remote method invocations as out-of-band information remains the same for all protocols.

FIG. 10 shows an embodiment of the current invention that uses dedicated messaging service infrastructure to trace distributed transactions which involve sending and receiving of messages. Current messaging servers provide various methods to transfer messages, including direct sending from one sender to one receiver, or publish-subscribe mechanisms where a publisher adds a message to a topic and multiple subscribers of the topic receive the published message. All those transfer methods are based on sending message objects from one message sender to one or multiple message receivers. Thus it is sufficient to insert correlation information as out-of-band information into said message objects to allow correlation of distributed transactions involving message based communication.

If an instrumented method 210 that sends a message 1003 via a dedicated messaging server 1005 is called, the tagging sensor 214 which is instrumented into said method is executed. The tagging sensor stores correlation information in a parent info node 1101 which was extracted from the local tag info 1201. The parent info node 1101 is attached to the message object 1004 before it is sent to the messaging server 1005. The message may be sent via a computer network 218. Messaging systems like Sun Microsystems' JMS provide interfaces to add user specific parameters to message objects, which can be used to attach said parent info node 1101 to the message object 1004.

The messaging server 1005 clones the original message 1004 and sends those cloned messages 1007 to all registered receivers 1006, which may be performed using a computer network 218. The receiving applications 1006 are notified about the incoming message and methods to receive the message 1009 are called. A tag extraction sensor 216, which is instrumented to those methods, reads the correlation information of the parent info node 1101 from the received message 1007 and stores it in the tag info node 1201 of the current thread.

The execution of entry sensors 211 and exit sensors 212 and the handling of different path events are performed as explained in the description of FIG. 4. It should be noted that path events sent from the sender application 1001 are tagged with the agentId 203 of the sender application's agent 204 and path event sent from the receiver applications 1006 contain the agentId 203 of the agents 204 deployed to the receiver applications 1006. Furthermore, registration and deregistration of transaction-executing threads for sampling is performed as explained in the description of FIG. 7.

FIG. 11 shows a parent info node 1101 which is used to transfer correlation information between connected parts of a transaction running in different threads, which may be executed on different hosts, connected by a computer network 218. Information stored in a parent info node contains, but is not limited to, an agentId 1102, a local pathId 1103 and a forkId 1104. The agentId 1102 of a path info node is initialized with the agentId 204 of the agent 203 which is deployed to the application that generated the parent info node, and uniquely identifies the application that generated the parent info node. The local pathId 1103 uniquely identifies the execution of a thread that involved the execution of another thread. The forkId 1104 identifies each individual interaction initiated by the thread with other threads, which may be performed by explicitly activating other threads, via remote method invocations, sending of messages or other inter-thread communication mechanisms. The forkId is incremented each time a thread interacts with another thread.

FIG. 12 depicts a tag info node 1201, which is stored in the local storage of a thread. A tag info node 1201 stores information required to correlate method calls executed within the local thread in the local data section 1220 and information to correlate the local thread with its parent thread in the parent data section 1210. The local data 1220 section contains but is not limited to an agentId 1221, a local pathId, the current call depth 1223 and the current forkId 1224. The agentId 1221 is set to the agentId 204 of the agent 203 deployed to the local application. The local pathId 1222 uniquely identifies an execution path of the current thread, the call depth 1223 indicates the current depth of nested calls of instrumented methods and the forkId 1224 indicates the current number of activations of other threads performed by the current thread.

The parent data section 1210 identifies the execution path of the thread that invoked the current thread. It contains but is not limited to a parent agentId 1211, a parent local pathId 1212 and a forkId 1213. The parent agentId 1211 identifies the agent deployed to the application that activated the current thread; the parent local pathId 1212 identifies the execution of the thread that activated the current thread and the parent forkId 1213 identifies the activation of the current thread within all thread activations performed by the parent thread of the current thread.

The different types of event nodes are depicted in FIG. 13. Event nodes are sent from deployed entry sensors 211, exit sensors 212 and tagging sensors 214 to the agent 203 of the local application, which in turn forwards the event sensors to the correlation engine 407. Additionally the sampling agent 501 creates and sends path sampling event nodes 1351 and methodId event nodes 1361 to the correlation engine 407 via the agent 203.

Sending event nodes may be performed using a computer network 218.

FIG. 13a shows a start path event 1301, which is sent to indicate the start of a new transaction or the start of the execution of a part of a transaction in a new thread. The parent data section 1310 contains data that identifies the thread that started the current thread, whereas the data of the local data section 1320 identifies the current thread. The parent data 810 contains but is not limited to a parent agentId 1311, a parent local pathId and a forkId 1313. The parent agentId 1311, parent local pathId 1312 and forkId 1313 identify application, thread execution and the activation of the current thread within all thread activations performed by the parent thread of the current thread. The local data 1320 contains but is not limited to an agentId 1321, a local pathId 1322 and payload data 1323. AgentId 1321 and local pathId 1322 identify the local application and the execution of the current thread. The payload data 1323 contains but is not limited to data describing the current thread, like its name or id.

Path event nodes, as depicted in FIG. 13b, are used to indicate entry or exit of instrumented methods 210. A path event node contains an agentId 1332 and a local pathId 1333 which identify the application and the thread execution that originated the path event node. The entry/exit indicator 1334 allows distinguishing between event nodes created by entry sensors 211 and exit sensors 212. The sensorId 1335 is a key to the sensor context repository 209, and allows the reconstruction of the context of the sensor that created the path event node 1331. The call depth 1336 indicates the nesting depth of the instrumented method that created the path event node. The payload data 1337 contains information about the current execution of an instrumented method 210. Payload data 1337 may contain but is not limited to method execution time, synchronization time or wait time of the instrumented method.

Path correlation event nodes 1341, which are shown in FIG. 13c, are used to indicate that a thread activated another thread, either explicitly, by, e.g., calling a remote method, or implicitly, by sending a message. Path correlation event nodes allow reconstructing the sequence of thread activations performed by a thread. A path correlation node contains an agentId 1342 and a local pathId 1343, which identify the application and the thread execution that originated the path correlation event node. The sensorId 1344 allows the reconstruction of the context of the sensor that created the path correlation event node 1341 and the call depth 1345 indicates the nesting depth. The forkId 1346 indicates the sequence number of the thread activation described by the path correlation event.

Path sampling event nodes 1351, as shown in FIG. 13d, are used to transfer incremental method call stack data together with correlation information to find matching instrumentation-based transaction tracing data. A path sampling event node 1351 contains an agentId 1352 and a local pathId 1353 which respectively identify the application and the thread execution that originated the path sampling event node. The reusable call depth index 1354 indicates up to which level the method call stack provided with the previous path sampling event node can be reused by the current path sampling event node. Method call stacks can be reused from the top level method until the first deviating method call on the stack (i.e., the first method call that differs from the previous call stack). The new methodIds list 1344 contains a list of method identifiers of method calls which deviate from the previous path sampling event node. Those method identifiers, together with the agentId, may be used to query the agent method repository 410, for a methodId event node 1361 with matching agentId and methodId to get information about the method, like its name, signature, modifiers, name of the class defining the method, name of the file containing the method, line number of method start within the file, etc. The payload data 1356 may contain static information about the sampled thread, like its name, together with dynamic information about the thread, e.g., its run state at the point of time the sample was created. The run state may be, e.g., "runnable", "blocked", "waiting" etc. The sample acquisition timestamp 1357 describes the point in time when the call stack described by this path sampling event node was obtained by the sampling agent.

MethodId event nodes 1361, as shown in FIG. 13e, are used to transfer information about methods detected in method call stacks of thread samples. A methodId event contains an agentId 1362 which identifies the application which is the origin of the method, and a methodId 1363 which uniquely identifies the method within the scope of its application. Additionally, a methodId event node may contain but is not limited to method modifiers 1364, a method name 1365, a method signature 1366, and the name of the class containing the method 1367.

The data records and methods of FIGS. 13a-13e described above may be used to assign thread samples to monitored transactions. In particular, as described above, both instrumentation-generated events (such as the start path event node (FIG. 13a, element 1301), path event node (FIG. 13b, element 1331), path correlation event node (FIG. 13c, element 1341), and sampling-generated event nodes (FIG. 13d, element 1351)) contain an agent ID and a local path ID. The agent ID and local path ID identify the agent/virtual machine that sent the event and the thread execution during which the instrumentation-generated or sampling-generated event was created.

In the case of FIG. 13*e*, element 1361 only contains an agent ID to identify an agent/virtual machine and a method ID to identify a specific method. In the case of FIG. 13*e*, a local path ID is not required, because such event nodes only identify methods and not their execution by threads. In the case of FIG. 13*e* it is only required that the agent/virtual machine be identified, because method IDs may not be unique among different virtual machines.

FIG. 14 shows the process of transferring correlation information between threads in case of explicit thread activation. Such transferring includes, for example, transferring of parent/child correlation information from parent threads to child threads in various situations, such as when a thread is spawned within a virtual machine, when a thread is spawned on a remote virtual machine via an RMI call, and when multiple threads are spawned on multiple virtual machines via message sending/receiving.

FIG. 14*a* displays a method 1400 by a tagging sensor 214, which is invoked at the time of the initialization of a thread switch by the parent thread that is going to create and start a child thread. First the tagging sensor 214 fetches the tag info node 1201 from the thread local storage in step 1401. Then, it queries if the local data 1220 of the tag info node 1201 is set in step 1402. This may include checking if the thread local storage contains a tag info node, and if such a tag info node is present, checking if the local pathId contain values indicating a indicating a monitored transaction. A value of −1 for the local pathId may indicate a not set local pathId. If the local data is not set, execution of the tagging sensor is terminated 1406, because the lack of data indicates that this thread switch is not performed by a traced transaction. Otherwise, the tagging sensor 214 creates a parent info node 1101 which is initialized with the local data 1220 of the tag info node 1201 in step 1403. In step 1404, the parent info node 1101 is stored in the object representing the thread which will be activated. An additional field to store the parent info node 1101 was added to this object by the instrumentation engine via bytecode manipulation during instrumentation. In a final step 1405, a path correlation event node 1341 is initialized with the data from the tag info node 1201 and afterwards sent to the correlation engine 407. Additionally, the forkId 1224 of the tag info node 1201 is incremented. The method 1400 then ends 1406.

FIG. 14*b* shows a method 1409 executed by a tag extraction sensor 216 which is executed on the start of a thread. In an initial step 1410 it is checked if the object representing the current thread contains a valid parent info node 1101. In case of no existing parent info node, the execution of the tag extraction sensor 216 is terminated in step 214. Otherwise execution continues with step 1211 which creates a new tag info node 1201 and resets its local data section 1220. In the subsequent step 1412, the information extracted from the parent info node 1101 is stored in the parent data section 1210 of the tag info node 1201, and in a final step 1413 the tag info node is stored in the local storage of the current thread. The method 1409 then ends 1414.

FIG. 15 shows a method 1500 which performs the transfer of correlation information within a remote method call, whereas FIG. 15*a* shows a method 1509 performed by a tagging sensor attaches correlation information in the form of a parent info node 1101 to a message representing a remote method invocation 904 at the caller side of the remote method. In step 1501, the tag info node 1201 is retrieved from the thread local storage and step 1502 checks if the local data 1220 is initialized. If the local data is initialized, execution continues with step 1503 by creating and initializing a parent info node 1101 with data from the tag info node 1201 retrieved in step 1501. In step 1504, said parent info node 1101 is attached to the message representing the remote method call 904. In a final step 1505, a path correlation event 1341 is initialized and sent to the correlation engine 407 and the forkId 1224 of the tag info node 1201 is incremented. The method 1500 then ends 1507.

FIG. 15*b* displays a method 1509 performed by a tag extraction sensor 216 to extract the parent info received with a remote method message 904 on execution of the remote method service routine 907. In a first step 1510 the sensor checks if the remote method message 904 contains a parent info node 1101. If a parent info node is found, it creates a tag info node 1201 and resets its local data section 1220 in step 1511, initializes the parent data section 1210 with data from the received parent info node 1101 in step 1512 and stores said tag info node in the thread local storage in step 1513. The method 1509 then ends.

The transfer of correlation information within messages is depicted in FIG. 16. FIG. 16*a* shows a method 1600 performed by a tagging sensor to store correlation information in a message parameter. In an initial step 1601, the tag info node 1201 is retrieved from the thread local storage, and in a subsequent step 1602 the tagging sensor 214 checks if the local data 1220 of said tag info node 1201 is set. If the local data is set, a parent info node 1101 is created and initialized in step 1603, and in step 1604 the parent info node is stored in the message which is going to be sent 1004 as an additional message parameter. Finally, in step 1605, the tagging sensor 214 initializes and sends a path correlation event node 1341 and increments the forkId 1224 of the tag info node 1201. The method 1600 then ends 1607.

FIG. 16*b* shows a method 1609 performed by a tag extraction sensor 216, which is invoked in the course of receiving a message, to extract correlation information from the received message 1007 and stores it in the thread local storage. In a first step 1610, the sensor checks if the received message contains a parameter with a parent info node 1101. If a parent info node is available, a tag info node 1201 is created, its local data is reset in step 1611, and parent data of the tag info node 1201 is initialized with data from the received parent info node in step 1612. Finally, the tag info node 1201 is stored in the thread local storage in step 1613. The method 1609 then ends 1614.

Transfer of correlation information between communicating threads as described herein is not restricted to explicit thread switch, remote method invocation, and messaging. Any communication channel between threads that allows adding user defined data can be used to transfer correlation information. As an example, correlation information could be transferred between the client and the server of a web service request by adding an additional header field to the request representing the web service call. Said additional header field may be used to transfer correlation information.

The execution of a method 1700 by an entry sensor 211 is depicted in FIG. 17. Calls to entry sensors are inserted at the start of each instrumented method 210 by the instrumentation engine 208 or the agent instrumentation engine 201*a*. In an initial step 1701, the entry sensor checks if the local data 1220 of the tag info node 1201 in the thread local storage is initialized. If no tag info node is found in the thread local storage, a new tag info node is created, local and parent data are reset and the new tag info node is added to the thread local storage. If the local data of the tag info node is set, payload data is acquired in step 1702. Payload data may contain, but is not restricted to execution time, synchronization time or argument values of the current method. In step 1703, the call depth 1223 of the tag info node 1201 is incremented and in a subsequent step 1704, a path event node 1331 is created and initialized with an agentId 1221, local pathId 1222, and call depth 1223 from the tag info node 1201. Additionally the sensorId 1335, which identifies the context of the entry sensor 211, is set. The entry/exit indicator 1334 is set to "entry" and the acquired payload data is stored in the path event node. In step 1705 the path event node is sent to the correlation engine 407. The method 1700 then ends.

In case of not set (no tag info node present or local pathId uninitialized) local data 1220, the entry sensor 211 executes step 1706 and generates a new local pathId 1222, which uniquely identifies a thread execution within the scope of a virtual machine. Additionally, it retrieves the agentId 204 from the agent 203 deployed to the application. Both local pathId 1222 and agentId 204 are stored in the tag info node 1201 of the local thread storage, and call depth 1223 and forkId 1224 of the tag info node 1201 are reset.

The current thread, which is executing the entry sensor 211, is registered with the sampling agent 501 for sampling in step 1707. Such registration may be performed using the registration process of FIG. 7a.

In a subsequent step 1708, payload data specific for a started local execution path is acquired, which may contain the start time of the path, or an indicator about the event causing the start of the execution, like handling a message or executing a remote method.

In step 1709 the entry sensor creates a start path event 1301, sets local pathId 1321 and agentId 1322 with data from the tag info node 1201, stores the acquired payload data in the payload data 1323 of the created start path event. Afterwards the entry sensor 211 checks in step 1710 if the parent data 1210 of the tag info node 1201 is set (tag info node present, parent agentId 1211 and parent local pathId 1212 initialized, not −1). If the parent data 1210 is set, the entry sensor initializes the parent data 1310 of the start path event node 1301 with the parent data 1210 of the tag info node 1201 in step 1711. Otherwise, parent data 1310 of the start path event node 1301 is reset in step 1712. Afterwards, the start path event 1301 is sent in step 1713 and execution of the entry sensor continues with step 1702 and subsequent steps.

The execution of a method 1800 by an exit sensor 212 is depicted in FIG. 18. Each time an instrumented method 210 is exited, an exit sensor 212 is invoked. The exit sensor checks in an initial step 1801 if the local data 1220 of the tag info node 1201 in the local thread storage is set. If no local data is set, the current execution of the method belongs to no monitored execution path. In this case, the execution of the exit sensor 212 is terminated in step 1809. Otherwise, execution continues with step 1802 which acquires pay load data of the exit sensor 212. Said payload data may contain, but is not restricted to execution time, synchronization time or CPU time of the current method. Afterwards, a path event node 1331 is created in step 1803 and its agentId 1332, local pathId 1333 and call depth 1336 are initialized with the corresponding values from the tag info node 1201 of the thread local storage. The sensorId 1335 is initialized with a value identifying the current method, the entry/exit indicator 1334 is set to "exit" and the payload data 1337 is initialized with the previously acquired values. In step 1804 the initialized path event node is sent to the correlation engine 407 and the call depth 1223 of the tag info node in the thread local storage is decremented in step 1805. If it is detected in step 1806 that the call depth has now a value of 0, then the tag info node 1201 in the local thread storage is reset in step 1807. A call depth of 0 indicates that execution of the outermost instrumented method within the current execution of the current thread is finished and thus the values of the tag info node 1201 are no longer valid. In this case, the current thread is also deregistered from the sampling the sampling agent 501 in step 1808, see also FIG. 7b. The method 1800 then ends 1809.

The methods of FIGS. 7, 17, and 18 may be used to perform transaction time-specific sampling and transaction thread-specific sampling. For example, as described above, a thread which is executing a monitored transaction is registered for sampling with the first execution of an entry sensor (FIG. 17, element 1707, and FIG. 7a). Upon registration of the thread, cyclic sampling of this specific thread is started (FIG. 8). Then, when execution of an exit sensor sets the call depth to zero, thereby indicating that the top level instrumented method has ended, and that monitoring of thread execution has ended, the thread is de-registered from sampling (FIG. 18, element 1808, and FIG. 7b). As a consequence, threads are only sampled while they execute a monitored transaction. As another consequence, only threads that executed a monitored transaction are monitored.

FIG. 19 depicts different types of path nodes, which are used by the correlation engine to represent monitored execution paths. A start path node 1901 which is shown in FIG. 19a contains a parent path section 1910, which is used to store information to correlate the current execution path with a potential parent execution path which triggered the current execution path. The parent path info section 1910 contains a parent pathId 1911 and a parent agentId 1912, which are used to identify the parent execution path, and a forkId 1913 which is used to identify the position within the parent execution path where the current execution path was activated. The path info section 1920 contains a pathId 1921 to identify the execution path within the virtual machine, an agentId 1922 to identify the virtual machine that executed the path, payload data 1923 which may contain information about the execution path, like the name or ID of the thread that performed the execution, a field path nodes 1924, which contains a list of path nodes 1931 and path correlation nodes 1941 belonging to the path. The entries of the path nodes list 1924 of a start path node 1901 are sorted according to the arrival time of the corresponding method entry path event nodes 1331 and path correlation event nodes 1341 at the correlation engine 407. Path event nodes 1331 and path correlation nodes 1341 are sent to the correlation engine 208 via one network communication channel and arrive at the correlation engine in the same sequence as they were sent by the agent 203. Thus, the sequence of the path nodes in a path node list 1924 is equivalent to the execution order of the methods represented by said path nodes. After finishing correlation and merging with sampling based tracing data, the path node list 1924 contains a sequence of path nodes, which may contain path nodes 1931, path correlation nodes 1941 and path sampling nodes 1951 which represent the method executions detected by events sent by sensors, and by thread samples sent by the sampling. The sequence of the path nodes, together with the respective call depth of the path nodes (1934, 1944 and 1954) allow the reconstruction of method execution sequence and nesting level.

The temporary path sampling nodes list 1925 contains the path sampling nodes 2501 or 2511 of the thread execution described by the start path node 1901. Incremental path sampling nodes 2501 are created on received path sampling event nodes 1351 and appended to temporary path sampling nodes list in the same order as the corresponding path sampling event nodes 1351 arrive at the correlation engine 407. During the process of merging instrumentation based tracing data with sampling based tracing data, the incremental path sampling nodes 2501 are replaced by corresponding path sampling nodes, for details see FIG. 28.

The field temporary correlation nodes 1926 contains path correlation nodes 1941 which link the current execution path with associated child execution paths, where data describing the child paths arrived at the correlation engine 407 before the corresponding path correlation event node arrived. This situation may occur, e.g., if in case of a remote method invocation, the network latency between the calling application and the correlation engine is higher than the network latency between the callee application and the correlation engine.

FIG. 19*b* describes a path node 1931 which represents one execution of an instrumented 210 method within an execution path. A path node contains payload data 1932, sensorId 1933, and call depth 1934. Payload data contains data describing one execution of an instrumented method, which may contain but is not limited to execution time, synchronization time, CPU time, or argument values. The sensorId 1933 allows the reconstructing of the context of the sensor that caused the created of the path node 1931. The field call depth 1934 stores the nesting level of the current instrumented method.

FIG. 19*c* shows a path correlation node 1941 which is used to map interdependencies between different parts of distributed execution paths. A path correlation node contains the fields forkId 1942, sensorId 1943, call depth 1944, and child path references 1945. The forkId 1942 identifies activations of other threads, performed by the current thread, within the scope of the current thread. Activations of other threads may be performed by explicit thread activation, remote method invocation, or sending of messages. The list child path references 1945 contain references to paths triggered by the thread activation described by the current path correlation node 1941. The functionality of sensorId 1943 and call depth 1944 is as specified in the description of FIG. 19*b*.

FIG. 19*d* describes a path sampling method node 1951. A path sampling method node represents a method call in a monitored transaction which was detected via a method call stack of a thread sample. Path sampling method nodes 1951 are created when path nodes 1924 of a start path node 1901 are merged with its temporary path sampling nodes 1925. The result of this merging process is a new path nodes 1924 list, which contains path nodes 1931 and path correlation nodes 1941 as the original path nodes 1924 list, together with the created path sampling nodes 1951 inserted in list positions according to the detected call sequence and call nesting depth. For details see FIGS. 26 to 34.

Payload data 1952 of a path sampling method node 1951 contains calculated data describing one execution of a sampling detected method, which may contain but is not limited to execution time, synchronization time, or CPU times. The methodId 1953, together with the agentId 1922 of the containing start path node 1901, allows identifying the corresponding methodId event record 1361 in the agent method repository 410 to retrieve information like method name, name of class defining the method, method modifiers, method signature, name of source file containing the method, line number of method start, etc. for the method. The call depth 1954 indicates the nesting depth of the described method call.

The statistic data 1960 contains data about the statistical distribution of the detected method call in call stack samples. For example, the statistic data may contain the number of times the method was a leaf in a call stack sample for each different thread state 1961 as provided by the payload data of the path sampling event nodes 1356 which contained tracing data of the method execution described by the path sampling method node 1951.

The process 2000 depicted in FIG. 20 shows the processing of an incoming start path event node 1301 by the correlation engine 407. A start path event node 1301 is transformed into a start path node 1901, which is inserted into the path repository 408. Each start path node 1301 represents one execution path of a thread.

After receiving a start path event node 1301, the correlation engine first queries the path repository 408 for an existing start path node 1901 with the same pathId and agentId as the received start path event in step 2001. If such a start path node is found, the payload data of said start path node is updated with the payload data of the received start path event node 1301 in step 2004. Otherwise, a new start path node 1901 is created and inserted into the path repository 408 and its path info section 1920 is initialized with data from the local data section 1320 of the incoming start path event node 1301 in step 2003. In step 2005, the correlation engine determines whether the parent data section 1310 of the received start path event node 1301 is initialized. If the parent data section 1310 is determined not to be initialized, then the correlation engine 407 resets the parent path info section 1910 of the created or updated start path node 1901 in step 2006, and terminates the processing of the received start path event in step 2017. Otherwise, the correlation engine 407 initializes the parent path info section 1910 of said start path node 1901 with the data from the received start path event node 1301 in step 2007. Afterwards, the correlation engine 407 queries the path repository 408 for a start path node 1901 representing the parent path addressed by the received start path event node 1301 in step 2008. If no matching start path node 1901 is found, the correlation engine 407 creates a new start path node 1901 and initializes its pathId 1921 and agentId 1922 with parent local pathId 1312 and parent agentId 1311 from the received start path event node 1301 in step 2010. Additionally, a path correlation node 1941 is created, and added to the temporary correlation nodes 1926 of the start path node 1901 created in step 2010. The forkId 1942 of the created path correlation node 1941 is initialized with the forkId 1313 of the received start path event node 1301, and a reference to the start path node 1901, created or updated in step 2003 or 2004, which represents the path described by the received start path event node 1301, is added to the child path references 1945 of said created path correlation node 1941. SensorId 1943 and call depth 1944 of said path correlation node are reset. After execution of step 2010, processing of the received start path event is terminated in step 2017.

If a start path node 1901 representing the parent execution path was found in step 2008, execution continues with step 2011, where the correlation engine queries the path nodes 1924 of the found parent path for a path correlation node with a forkId 1942 as the forkId 1313 of the received start path event node 1301. If such a path correlation node 1941 is found, a reference to the start path node 1901 which was created or updated in step 2003 or 2004 is added to the child path references of the path correlation node in step 2016, and the processing of the received start path event node 1301 is terminated in step 2017.

If no path correlation node 1941 is found in step 2011, execution continues in step 2013, and the temporary correlation nodes of the start path node 1901 are queried for a path correlation node with a forkId 1942 as the received forkId 1313. If a corresponding path correlation node is found, execution continues with step 2016, which adds a reference to the created or updated start path node 1901 to the child path referenced 1945 of the found path correlation node 1941. Otherwise, a new path correlation node 1941 is created and added to the temporary correlation nodes 1925 of the start path node 1901 in step 2015. The forkId 1942 of the created path correlation node 1941 is set to the forkId of the received start path event 1301 and sensorId 1943 and call depth 1944 are reset. After step 2015, execution continues with step 2016.

A method 2100 that is used to process an incoming path correlation event 1341 by the correlation engine 407 is shown in FIG. 21. On receiving a path correlation event 1341, the correlation engine first checks if a start path node 1901 with pathId 1921 and agentId 1922 equal to local pathId 1343 and agentId 1342 of the received path correlation event node 1341 exists in the path repository 408 (steps 2101 and 2102). If no corresponding start path node 1901 is found, the path correlation event 1341 is ignored (step 2105) and processing of the event is finished in step 2108.

Otherwise, the temporary correlation nodes 1926 of the start path node 1901 found in step 2101 are queried for a path correlation node 1941 with forkId 1942 matching the forkId 1346 of the received path correlation event node 1341 in step 2103. If the temporary correlation nodes 1926 do not contain a matching path correlation node 1941, a new path correlation node is created in step 2107, initialized with the data of the received path correlation event node 1341 and appended to the path nodes 1924 of the start path node 1901 found in step 2101. Otherwise, the path correlation node 1941 found in step 2103 is removed from the temporary correlation nodes 1925, call depth 1944 and sensorId 1943 are initialized with the corresponding values of the received path correlation event node 1341, and the path correlation node 1941 is appended to the path nodes 1924 in step 2107. The process ends with step 2108.

FIG. 22 describes a method 2200 for the processing of an incoming path event node 1331 by the correlation engine 407. In step 2201 the correlation engine 407 checks if a start path node 1901 with agentId 1922 and pathId 1921 equal to the local agentId 1332 and local pathId 1333 of the received path event node exists in the path repository 408. If no matching start path node 1901 is found, the incoming path event node 1301 is ignored (step 2203) and processing of the event is finished in step 2208.

Otherwise, the correlation engine evaluates the entry/exit indicator 1334 of the path event node 1331 to determine if the received path event node described entry or exit of an instrumented method 210 in step 2205. If the received path event node 1331 describes a method entry, a new path node 1931 is created, payload data 1932, sensorId 1933 and call depth 1934 are initialized with the corresponding values of the received path event node 1331 and the path node 1931 is appended to the path nodes 1924 of the start path node 1901 found in step 2201. If the correlation engine 407 detects in step 2205 that the received path event node 1331 describes a method exit, the correlation engine 407 queries the path nodes 1924 of the start path node 1901 found in step 2101 for a path node 1931 representing the corresponding method entry event in step 2106. The corresponding path node 1931 representing the corresponding method entry is detected by scanning the path nodes 1924 of the start path node 1901 found in step 2101 backwards, beginning with the last added path node 1931 until a path node 1931 describing a method entry with the same call depth 1934 as the received path event node 1331, which describes a method entry is found, and which has the same sensorId 1933 as the received path event node 1331. The first detected path node matching these criteria is the path node 1931 that describes the corresponding method entry.

In a final step 2207, the payload data 1932 of the path node 1931 found in step 2206 is merged with the payload 1337 of the received path event node 1331. Merging of payload may contain but is not limited to calculating the execution duration of the method call described by the path node 1931, adding captured method return values to the payload 1932 of the path node 1931, or setting a flag in the path node 1931 indicating that execution of the described method is terminated.

The separate signalization of method entries and method exits by the agent 203 allows the correlation engine 407 to provide valid descriptions of execution paths while execution of said paths is still ongoing. Together with a concurrent access of correlation engine 407 and analysis module 409 to the path repository 408, this provides real-time visualization of execution paths, while execution is still ongoing. This mechanism is especially useful in visualizing the execution of paths which are blocked, because it allows the visualization of all method entries, up to the method that caused the block.

FIG. 23 shows a method 2300 for the processing of a path sampling event node 1351 by the correlation engine 407. On receiving a new path sampling event node, the path repository 408 is queried for a start path node 1901 with matching pathId 1921 and agentId 1922 in step 2301. If no such start path node is found, the event is ignored (step 2304) and the process ends with step 2306.

Otherwise, a new incremental path sampling node 2501 is created and its payload data 2502 and reusable call depth index are set to the corresponding values of the received path sampling event node 1351 in step 2303.

Subsequent step 2304 creates a method list entry node 2521 for each methodId in the new methodIds list 1355 of the received path sampling event node 1351 and sets the methodIds 2522 to the corresponding methodId of the new methodIds list 1355. The create method list entry nodes 2521 are appended to the incremental method list 2504 of the created incremental path sampling node 2501. It is noteworthy that the sequence of method list entries 2521 in the incremental method list 2504 is equal to the sequence of the methodIds in the new methodIds list 1355. For each method list entry, the sensor repository 409 is queried for a matching sensor context node 301 (e.g. a sensor context node 301 with the same method name, signature, modifiers, and class name as the corresponding method list entry). If such a sensor context node is found, then the instrumented indicator 2523 is set and the value of the sensorId 2524 is set to the sensorId 302 of the matching sensor context node 301. Processing ends with step 2306.

FIG. 24 shows a method 2400 for the processing of received methodId event nodes 1361 by the correlation engine 407. On receiving a methodId event node 1361, the event node is stored in the agent method repository 410 in step 2401. Processing ends with step 2402.

FIG. 25 displays incremental path sampling nodes 2501, for method call stacks, path sampling nodes 2511 containing full call stacks, and method list entries 2521 describing a method call within a call stack.

An incremental path sampling node as shown in FIG. 25a, contains payload data 2502, which may be used to store static information about the sampled thread, like its name, together with dynamic information about the thread like e.g. its run state at the point of time the sample was created. The run state may be e.g. "runnable", "blocked", "waiting" etc. The reusable call depth index 2503 contains the number of method calls which can be reused from the top of the call stack of the previous incremental path sampling node. The incremental methods list 2504 contains method list entries 2521 describing method calls that differ from the previous incremental path sampling node. The sample acquisition timestamp 2505 describes the point in time when the sample was acquired.

Path sampling nodes as shown in FIG. 25b are created by expanding the incremental method list 2504 of one or more incremental path sampling node 2501 into a method list describing a full method call stack. The payload data 2512 of a path sampling node is set to the payload data of the incremental path sampling node 2501 used to create the path sampling node which provided the call stack fragment with the highest nesting level. The method list 2514 contains method list entries 2521 describing the full method call stack from all contributing incremental path sampling nodes. The sample acquisition timestamp 2514 describes the point in time when the sample was acquired.

A method list entry 2521, as shown in FIG. 25c models a method call within a method call stack. It contains a methodId 2522, which may be used to identify a methodId event node 1361, stored in the agent method repository 401. The instrumented indicator 2523 indicates if the called method was instrumented and is thus also represented in the path nodes 1924 of the enclosing start path event node 1901. The sensorId 2524 is set if the called method is instrumented, and allows to identify the corresponding sensor context node 305 in the sensor context repository 209. Instrumented indicator 2523 and sensorId 2524 may be used to merge instrumentation-based tracing data and sampling data.

FIG. 26 provides a conceptual overview of a method 2600 for performing event correlation to gather tracing information for a specific transaction, followed by merging of instrumentation-based tracing data with sampling-based data, and calculation payload data of sampling data derived method calls.

In step 2601 and 2602, all instrumentation-based and sampling data for a specific transaction are gathered, and assigned to the matching start path event nodes. If step 2602 detects that no more events can be expected for the specific transaction, processing continues with step 2603. It is noteworthy that this may be the case when all expected events were received by the correlation engine, or if transaction processing was stopped by a timeout and not all expected events could be received.

In step 2603, sampling data and instrumentation-based data are merged to create comprehensive transaction tracing information. Merging may be based on comparing call stacks provided by instrumentation derived method calls and sampling-derived method calls and then arranging all method calls according to call sequence and call nesting level. Alternatively, merging could be performed based on the creation sequence of instrumentation-based and sampling events, as samples created between entry and exit of an instrumented method must be nested to the instrumented method. To achieve information about the correct creation sequence, additional communication between the monitored threads and the sample creation thread 505 is required, which may increase the monitoring overhead. The optimal approach depends on the expected load of the correlation engine and the allowed monitored overhead generated in the monitored application. However, embodiments of the present invention cover both merging methods.

Step 2604 calculates the payload data of sampling derived method calls. The measured payload data for the nearest instrumented parent method (i.e., the closest ancestor method that is instrumented) is distributed to the sampling derived method calls according to statistic distribution of the method calls in call stack samples. E.g. methods which are present in more samples, or which are leaf nodes in more samples may be allotted more execution time, CPU time, execution time, block or wait time, etc. Additionally, the thread state provided by path sampling event nodes may be used to derive wait and synchronization times to sampling derived methods. As an example, if instrumentation based data detects a method calls stack A→B, which is then enriched by sampling based data to a call stack like A→B→c→d, then the execution time measured for B may be distributed to B, c and d according to the number of times B, c and d occurred as leaf of a sample. As another example, if instrumentation based data detects a call stack such as A→B, and enrichment with sampling based data detects A→c→d, which indicates that A called B and c, then the difference of the execution times measured for A and B may be used as base for calculating the execution time of c and d according to the times the methods appeared as sample leaf. The method 2600 ends with step 2605.

A comparison with a conventional monitoring system which only relies on sampling based performance data may help to understand the improvements provided by a combined approach in terms of interpretation of the sampling data.

A conventional sampling system would e.g. measure CPU consumption per thread between start of sampling based monitoring (i.e. start of sample acquisition) and end of sampling based monitoring (i.e. end of sample acquisition). In a post processing step, method executions are derived from acquired samples for each thread, and the measured CPU consumption is assigned to those method executions according to e.g. the number of times a method was seen as top level element of a sample. Although this correct from the mathematical and statistical perspective, it may introduce inaccuracies, because the measured performance data provides an average performance value that represents the complete monitoring period. This average performance value levels out fluctuating performance behavior, caused by e.g. sporadically called methods with high CPU consumption. This effect makes it difficult to identify those methods with high CPU consumption, because their contribution to the overall CPU consumption is equally distributed to each sample.

A combined tracing and monitoring system, which provides instrumentation based performance data for executions of instrumented methods, together with sampling based monitoring information is capable to determine which sampling derived method calls were executed by which instrumented method execution. This information may be used to perform a more fine-grained calculation of performance data of those sampling derived method calls. The performance calculation of sampling derived method calls may be based on the measured performance data of the next instrumented ancestor method call. This measured performance data may be assigned to sampling derived method executions directly or indirectly called by this next instrumented ancestor method call according to the frequency of those sampling derived methods in samples.

This enhances the conventional performance calculation process of existing sampling based monitoring systems by using more measured performance data provided by instrumented method calls and by using this measurement performance data to calculate performance data of sampling derived method executions which were called exactly the instrumented methods that provided the measured performance data.

FIG. 27 to FIG. 34 describe call stack based merging of instrumentation-based data with sampling-based data.

FIG. 27 shows an overview of a method 2700, starting with an initialization step 2701, which is described in detail in FIG. 29. If step 2702 detects that initialization was not successful, the process ends with step 2712. Otherwise, it is checked if a next path sampling node 2511 is available (step 2703). If such a path is available, it is fetched in step 2704. Step 2705 compares the method call stack derived from instrumentation derived method calls with method calls of the current path sampling node. The comparison is described in detail in FIG. 30. Possible results of the comparison are: "full match," which means that the sample call stack contains all instrumented method call of the call stack built from instrumentation bases method calls in the same sequence, and no other instrumented methods; "partial match," which is similar to a full match, except that there are nested instrumented calls in the sample which are not in the call stack built from instrumentation based methods; and "no match" for all other cases.

In case of no match, the call stack built from instrumentation based method calls is decomposed until it matches a top level portion of the sequence of instrumented calls in the sample in step 2708. If an instrumentation-based method is pushed from the stack, then all samples relevant for this method are also processed, and the payload for the sample-derived method calls nested to the pushed method can be calculated. For a detailed description of this process, please see FIG. 31. The process then continues with step 2705.

In case of a partial match, the instrumentation-based call stack is expanded until all instrumented methods in the sample are represented in the instrumentation-based call stacks in step 2709. Additionally, path sampling method nodes are created for intermediate sampling based methods and appended to the merged transaction tracing data. A detailed description of this process can be found in FIG. 33. The process continues with step 2705.

If a full match is detected, the sample acquisition time of the current path sampling node 2511 is compared with the measured method end time of the path node on top of the instrumented call stack in step 2713. If the sample acquisition time is later than the method end time, then the current sample cannot describe method calls nested to the method call described by the path node on top of the instrumented call stack, because it was acquired after the method was finished. If this plausibility check fails, the process continues with step 2715 and pops the top level path node from the instrumented node call stack, because no subsequent path sample nodes can be matched to this path node. Otherwise, process continues with step 2710.

As mentioned before, timing information obtained from different threads may deviate, because different threads may be executed on different CPU cores with deviating timing information. To overcome this problem, the sampling agent may store the registration time stamp for each thread, which describes the same wall clock timestamp as the first entry of an instrumented method within the thread. Both timestamps may be used to calculate an offset between the time of the two threads which may be used to align sampling acquisition timestamp and method end time before comparison.

In step 2710, path sampling method nodes are created for each sampling-based method nested to the last instrumented method, and appended to the merged transaction tracing data (for a detailed description of this process, please see FIG. 34). In this case, processing of the current path sampling node is finished and the process continues with step 2703 to fetch the next path sampling node.

If no more path sampling nodes 2511 are available, the original path nodes 1924 of the start path node 1901 are replaced with the new path nodes list, created in step 2901, which now represents the merged transaction tracing data in step 2711. The process ends with step 2712.

FIG. 27b shows an exemplary execution of a monitored transaction with highlighted sampling based and instrumentation based tracing data acquisitions. It also shows two different results of the merged and correlated tracing data, whereas one result is based only on received stack trace data, and the other result also considers timing data, including measured end time of instrumented methods and the time when specific stack trace samples were obtained.

The transaction execution depicted in FIG. 27ba shows the execution of a monitored transaction D1 within a specific thread, consisting in an entry method M1, which repeatedly calls the instrumented method M2, which in turn calls the not instrumented method M3. The sampling points S2 to S4 are of special interest here, because they only hit method calls of M3 and provide all identical stack traces of M1 calling M2 calling M3. Because there is no intermediate sampling available showing only M1 and M2 or only M1, a call stack only based merge of instrumentation based and sampling based tracing data could create a misleading result as shown in FIG. 27bb, where all samples and are assigned to the first execution of M2 and the calls of M3 in the subsequent invocations of M2 are not shown.

An approach also considering timing information (see steps 2713 to 2715 of FIG. 27) correctly detects that the samples showing M3 belong to different executions of M2 and accordingly creates a correct tracing result, showing that each execution of M2 also calls the method M3. The process 2800 depicted in FIG. 28 converts incremental path sampling nodes 2501 into path sampling nodes 2511. Step 2801 checks if a next incremental path sampling node is available. If no one is available, the process ends with step 2808. Otherwise, the next incremental path sampling node is fetched in step 2802, and a new path sampling node 2511 is created in step 2803 and its payload data 2512 is set to the payload data 2502 of the fetched incremental path sampling node. Additionally, the sample acquisition time 2514 is set to the corresponding value 2505 of the incremental path sampling node.

Step 2804 checks if the reusable call depth index 2503 of the fetched incremental path sampling node is 0. In this case, the process continues with step 2806. Otherwise, the method list entries 2521 of the method list 2513 of the previously created path sampling node are fetched from the start up to the reusable call depth index in step 2805. The fetched method list entries are appended to the method list 2513 of the created path sampling node 2511. The process continues with step 2806.

The method list entries of the current incremental path sampling node 2501 are fetched in step 2806 and appended to the method list 2513 of the create path sampling node, and in step 2807 the fetched incremental path sampling node is replaced by the new created path sampling node in the temporary path sampling nodes list 1925 of the current start path node 1901.

If no more incremental path sampling nodes are available, the process ends with step 2808. After step 2808, all incremental path sampling nodes 2501 in the temporary path sampling nodes list 1925 of the processed start path node 1901 are replaced by equivalent path sampling nodes 2511.

FIG. 29 describes the initialization process 2900 which is required for merging instrumentation-based tracing data with sampling data. The process starts with expanding all incremental path sampling nodes in step 2901, as described in FIG. 28. Afterwards, a new path nodes list is created which will later contain the combined tracing data in step 2902. Then, an instrumented nodes stack is created in step 2903. This stack is used to reconstruct the call stack of nested instrumented methods. Step 2904 fetches the first path node 1931 from the path nodes list 1924 of the start path node 1901 and pushes it to the instrumented nodes stack. This path node represents the top level instrumented method call. In step 2905 all path sampling nodes which do not contain this top level instrumented node are removed from the temporary path sampling nodes list 1925. Such samples may occur due to timing glitches between the transaction thread and the sample creation thread 505 and must be filtered out before processing goes on. Step 2906 checks if still sampling nodes are available in the temporary path sampling nodes list 1925. If no more sampling nodes are available, the process continues with step 2911 indicating that initialization failed and ends with step 2912.

Otherwise, the first path sampling node is fetched, and path method sampling nodes 1951 are created for each method list entry in the method list of the path sampling node before the first instrumented node. The methodId 1953 is set to the methodId of the corresponding method list entry, and the call depth 1954 is set to the list index of the corresponding method list entry. The created path method sampling nodes are appended to the new path nodes list and represent the parent method calls of the first instrumented node.

In step 2908 the first path node of the path nodes list 1924 of the processed start path node 1901 is copied and its call depth is set to the list index of the matching method list entry. The copied path node is appended to the new path nodes list.

The process continues with step 2909 indicating a successful initialization and ends with step 2910.

FIG. 30 shows a method 3000 for the comparison of the instrumented call stack with the instrumented methods of a path sampling node. In an initial step 3001, a temporary call stack is created, and all method list entries with set instrumented indicator are pushed on this temporary stack as they appear in the method list.

In step 3002 the temporary stack is compared with the instrumented call stack. If both call stacks describe the same method call stack, then a full match is detected, and the process continues with step 3004 and ends with step 3005 indicating a full match.

If the two stacks are not identical, it is checked in step 3003 if the temporary stack contains all method calls of the instrumented call stack in the same order. In this case, a partial match is detected and the process continues with step 3006 and ends with step 3007 indicating a partial mach.

Otherwise, the two call stacks do not match, and the process continues with step 3008 and ends with step 3009 indicating no match.

It is obvious for those skilled in the art that creating a new temporary call stack for each compare is inefficient, and it would be much more efficient to create one permanent stack which is maintained and reused during processing of path sampling nodes. However, those having ordinary skill in the art will understand, based on the description provided herein, how to create such a single permanent stack, and therefore a specific description of how to create such a stack is not provided herein.

FIG. 31 shows a method for decomposing the instrumented call stack if the instrumented call stack does not match with the instrumented calls of the current sample. In an initial step 3101, a temporary stack is created and the method list entries 2521 of the current path sampling node 2511 with set instrumented indicator 2523 are pushed to the stack. In step 3102, the last matching method call on both stacks is detected, e.g., by searching from the bottom of both stacks until a method call deviating between the two stacks is found.

Step 3103 gets the path node from the top of the instrumented call stack and step 3104 checks if the fetched path node matches the last matching method call detected in step 3102. This may be done by comparing sensorIds 1933 and call depths 1954.

If a match is detected, the process ends in step 3108. Otherwise, the new path nodes list, containing the combined transaction tracing data that has been calculated so far is searched for a path node matching the path node from the top of the instrumented stack in step 3105. This may be done by, e.g., maintaining a stack of path nodes from the new path nodes list which is kept in sync with the instrumented node stack from the original path nodes. Such a stack allows finding the matching path node without searching the new path node list. But as such an approach would be obvious for those skilled in the art, this is not described in detail here.

Step 3106 calculates the payload data for the path sampling method nodes describing nested method calls of the path node found in the new path nodes list. For details of this process, please see FIG. 32.

Step 3107 pops the top level element from the instrumented node stack and process continues with step 3103.

FIG. 32 a method 3200 for calculating payload data of method sampling nodes which are nested to a path node. Basically, the measured payload data of the path node which is the direct or indirect parent of all method sampling nodes processed here is used as the base for calculating payload data of method sampling nodes, based on statistical deviation of the method calls in the samples. Payload data may contain but is not limited to method call duration, CPU time, synchronization times and wait times.

Step 3201 first gets the measured payload data of the path node found in step 3105 of the process described in FIG. 31 and subsequent step 3202 calculates the fractions of measurement payload data which is allotted to method sampling nodes according to their statistical data 1960 which may describe number of times the method appeared in a sample, was leaf in a sample, while thread was running, waiting or blocked etc. The relevant method sampling nodes may be fetched from the temporary leaf method nodes list 1935, which avoids searching the new path nodes list. The temporary leaf method list 1935 contains path method sampling nodes which are directly or indirectly nested to the path node without any other intermediate path node, and which are derived from a leaf method call in a call stack sample. For details about adding path method sampling nodes to the temporary leaf method see FIG. 34.

Step 3203 clears the temporary leaf sampling nodes list 1935, which is no longer needed, and step 3204 resets or adjusts the payload data of the path node if required. This may, e.g., be required if the CPU time consumed by a method directly, not including nested method calls, is provided. In this case, the respective CPU time of the path node must be reduced by the CPU time allotted to the nested method calls. The process ends with step 3205.

FIG. 33 shows the process 3300 of expanding the instrumented node stack until it fully matches the method list entries 2521 with set instrumented indicator 2523 of the current path sampling node 2511. In an initial step 3301, a temporary stack is created and the method list entries 2521 of the current path sampling node 2511 with set instrumented indicator 2523 are pushed to the stack and in step 3302 it is checked if the temporary stack describes the same method call stack of the instrumented node stack. In this case, the process ends with step 3311.

Otherwise, the top level path node from the instrumented node stack is fetched in step 3303 and the matching method list entry is detected in step 3304. This may be performed by getting the method list entry from the temporary stack which is at the same stack position as the path node.

Step 3305 then fetches the next method list entry 2521 from the path sampling node 2511, after the method list entry matching the top level path node of the instrumented node stack and step 3306 checks if the instrumented indicator 2523 is set. If it is set, the next path node 1931 from the original path node list is fetched in step 3307. Subsequent step 3312 creates a copy of the fetched path node and sets the call depth of the copied path node to the current list index of the expanded method list. Following step 3308 pushes the path node fetched in step 3307 to the instrumented node stack. The process continues with step 3302 by checking again if both stacks match.

Otherwise, if the instrumented indicator 2523 is not set, the new path nodes list is searched for a matching path sampling method node in the new path nodes list, which indicates that the method call was already detected by a previous sample in step 3309. The search can be performed by scanning the new path nodes backward, starting from the end until a path sampling method node 1951 with matching methodId 1953 and with a call depth 1954 equal to the list index of the current method list entry 2521 in the method list 2513 is found, indicating the existence of a matching path sampling method node, or if a call depth 1954 lower than the list index is found, indicating that no such node exists. If a matching path sampling method node is found, the process continues with step 3305 and fetches the next method list entry 2521 in the method list 2513.

Otherwise, a new path sampling method node 1951 is created, its methodId 1953 is set to the methodId 2522 of the current method list entry 2521, and its call depth 1954 is set to the list index of the current method list entry 2521 in the method list 2513. The created path sampling method node 1951 is appended to the new path nodes list in step 3310 and the process continues with step 3305 to fetch the next method list entry 2521.

FIG. 34 shows a method 3400 for processing of a path sampling node in case of a full match with the instrumented node stack. In an initial step 3401, the list index within the method list 2513 of the first method list entry 2521 after the last method list entry 2521 with set instrumented indicator 2523 is calculated and the method list entry with this index is fetched in step 3402. This method list entry represents the method call directly nested to the last instrumented method.

Step 3403 checks if the new path nodes list already contains a path sampling method node describing the same method call as the current method list entry. If such a path sampling method node is available, it is fetched in step 3405 and the process continues with step 3406 by checking if the current method list entry 2521 is a leaf, which means that it represents the method with the highest call depth of the current sample, and that it is the last in the method list 2513.

If no such path sampling method node 1951 is available, a new one is created in step 3404, its methodId 1953 is set to the methodId 2523 of the current method list entry 2521, and its call depth 1954 is set to the list index of the current method list entry 2521. The created path sampling node is appended to the new path nodes list, and the process continues with step 3406.

If step 3406 detects that the current method list entry 2521 is not the leaf of the current sample, the process performs step 3405 which fetches the next method list entry 2521 from the current path sampling node, and continues with step 3403.

If the current method list entry 2521 is the leaf of the current sample, the statistical data of the corresponding path sampling method node, either fetched in step 3405 or created in step 3404 is updated in step 3408. This may include but is not limited to incrementing the respective leaf count according to the thread state stored in the payload data of the current path sampling node 2511.

Step 3409 fetches the path node 1931 from the new path nodes list matching the path node on top of the instrumented nodes stack, and step 3410 checks if the current path sampling method node 1951 is already in the temporary sampling method nodes list 1935 of the path node fetched from the new path nodes list in step 3409. If the current path sampling method node 1951 is already in the list, the process ends with step 3412.

Otherwise, the path sampling method node 1951 is added to the temporary sampling method nodes list in step 3411. The temporary sampling method nodes list 1935 is used for fast fetching of path sampling method nodes nested to a path node which is required for payload calculation of path sampling method nodes.

FIG. 34*b* depicts a situation where call stack only based merge of instrumentation based on sampling based tracing data may provide incorrect results for sibling method calls, where a portion of the detected sibling method calls are detected traced by instrumentation, and the other siblings are detected by sampling. In such cases, if the instrumentation detected method calls are not also detected by a sample, the reported temporal sequence of between instrumentation detected and sampling detected method calls may be erroneous.

FIG. 34*ba* shows a situation where an instrumented method M1 first calls another instrumented method M2, and afterwards executed not instrumented methods M3 and M4. The thread sampling is performed in a way that M1 is hit by S2, S3, S4, S5 and S6. M3 is hit by S3 and S4 and M4 is hit by S5. M2 is not hit by any sample. In such situations, the temporal sequence of M1, M2 and M3 cannot be determined by call stack only based merging, because neither sampling nor instrumentation based tracing data provide relevant information.

The result of call stack only based merging may show results as depicted in FIG. 34*bb*, which e.g. reports overlapping method calls within one thread, which is clearly not possible.

A post processing and potential rearranging of such heterogeneous sibling method calls may in such cases enhance the tracing result.

In the exemplary situation depicted in FIG. 34ab, temporal sequence of M3 and M4 is clear, because M3 appears in samples before M4, and also the delay between start of M1 and start of M2 and the duration of M2 are available via instrumentation based tracing data. Comparing the delay between start of M1 and start of M2 with the calculated execution time of M3, M3 cannot be started before M2 and must thus be started afterward. This information allows to determine that M3 was executed after M2. Additionally as the temporal sequence between sampling detected method calls is always determined, execution of M4 was started after M3. This leads to a corrected result as described in FIG. 34bc.

FIG. 34c shows an abstract process 3420 of finding and correcting situations as described in FIG. 34b.

The process is started after call stack based merge of instrumentation based and sampling based tracing data is finished for a start path node 1901. In an initial step 3401c, the process searches the path nodes list 1924 of the start path node for a first path node for which path nodes and path sampling nodes are available that describe method calls which are directly nested to the method call described by the first method call. Step 3401c also checks if at least one of the nested method calls described by path nodes was never visible in a sample, because only such situations can cause erroneous tracing results as shown in FIG. 34bb. If no such first matching path node is found, the process ends with step 3405c. Otherwise, the process continues with step 3403c, which rearranges the sequence of the child path nodes and path sampling nodes in a way that the path sampling nodes fill the gaps between the path nodes, and that no overlapping method executions are reported. The process then continues with step 3404c, which finds the next path node with potential erroneous sequence of child nodes. Afterwards, the process continues with step 3402c, and ends if no more matching path node is found.

The following documents are referenced above using the reference numbers contained within square brackets: [1] Kazi et al., "JaViz: A client/server Java profiling tool", IBM SYSTEMS JOURNAL, VOL 39, NO 1, 2000; [2] "Monitoring and Diagnosing Applications with ARM 4.0", opengroup.org/tech/management/arm, 2004; [3] Rees et al., "Synthesizing Application Response Measurement (ARM) Instrumentation, Hewlett-Packard, US2005/0039172 A1; [4] Avakian et al., "Using Interceptors and Out-of-Band Data to monitor the Performance of Java 2 Enterprise Edition (J2EE) Applications", Hewlett-Packard, US2005/0039171 A1; [5] Fung et al., "Method for Tracing Application Execution Path in a Distributed Data Processing System", Poon Fung, Cupertino, Calif. (US), US2007/7194664 B1; [6] Maccabee et al., "Application End-to-End Response Time Measurement and Decomposition", International Business Machines Corporation, US2000/6108700; [7] xprof: Internal profiler for hotspot. java.sun.com/docs/books/performance/1stedition/html/JPAppHotspot.fm.html; [8] hprof: an open source java profiler. java. sun. com/developer/technicalArticles/Programming/HPROF.html; [9] Ej technologies: Commercial java profiler, www.ej-technologies.com/products/jprofiler/overview.html.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A computer-implemented method comprising:
   (1) identifying, by instrumented bytecode, a transaction executed by a plurality of threads on at least one host system connected by a computer network, where a portion of the transaction is executed by a given thread in the plurality of threads and the instrumented bytecode is executed by the given thread;
   (2) collecting, by the instrumented bytecode, performance metrics regarding the transaction during execution of the transaction;
   (3) identifying, by the instrumented bytecode, when execution of the portion of the transaction by the given thread has started;
   (4) sampling the given thread in response to the identification that the execution of the portion of the transaction in the given thread has started, where the given thread is sampled by cyclically fetching stack data from a call stack for the given thread and associating the stack data with the given thread, wherein the stack data defines nesting relationships of methods associated with the transaction;
   (5) identifying, by the instrumented bytecode, when the execution of the portion of the transaction in the given thread has ended;
   (6) stopping sampling of the given thread in response to the identification that the execution of the portion of the transaction by the given thread has ended
   (7) associating the stack data for the given thread and the collected performance metrics with the identified transaction.

2. The method of claim 1, wherein the plurality of threads are distributed across a plurality of virtual machines.

3. The method of claim 1, wherein (1) comprises
   (1)(a) determining that at least one method executed by the transaction contains instrumented bytecode containing a sensor; and
   wherein (4) comprises sampling the at least one or more of the plurality of threads in response to determining that at least one method executed by the transaction contains instrumented bytecode containing a sensor.

4. The method of claim 3:
   wherein the plurality of threads contains at least one thread that does not execute any instrumented bytecode, and
   wherein (4) comprises sampling the plurality of threads but not sampling the at least one thread that does not execute any instrumented bytecode.

5. The method of claim 1, further comprising:
   (8)(a) capturing original bytecode executed by a first one of the plurality of threads;
   (8)(b) instrumenting said original bytecode with sensor bytecode to form the instrumented bytecode, where the instrumenting said original bytecode occurs prior to the step of identifying a transaction; and
   (8)(c) collecting, by the instrumented bytecode, performance metrics during execution of the instrumented bytecode by the first one of the plurality of threads.

6. The method of claim 1, further comprising:
   (8) for each of the plurality of threads, creating and collecting first correlation information that uniquely identifying the thread;
   (9) using the first correlation information for the plurality of threads to generate relationship data representing relationships among the at least one or more of the plurality of threads;
   (10) for each of the plurality of threads, creating and collecting method correlation information identifying call nesting level and call sequence of individual invocations of an instrumented method executed by the thread;
   (11) using the identified relationships to generate thread measurement data representing performance metrics of each of the at least one or more of the plurality of threads;
   (12) storing the thread measurement data;
   (13) using the method correlation information to generate method measurement data representing performance metrics of the individual method invocations;
   (14) storing the method measurement data; and
   (15) associating each thread sample with the first correlation information identifying the corresponding one of the plurality of threads.

7. The method of claim 1, wherein (4) comprises:
   (4) (a) measuring a delay introduced by sampling the at least one or more of the plurality of threads; and
   (4) (b) limiting the introduced delay to no more than a maximum target sampling overhead rate.

8. The method of claim 1 wherein an instrumentation configuration repository includes an instrumentation configuration, wherein the instrumentation configuration includes at least one instrumentation rule and at least one sensor,
   wherein the instrumentation configuration repository is accessible to a first agent for instrumenting a first corresponding application,
   the method comprising:
   (A) at the first agent, attempting to receive a modified instrumentation configuration from the instrumentation configuration repository over a network;
   (B) failing to receive the modified instrumentation configuration from the instrumentation configuration repository;
   (C) in response to the failure, instrumenting the first corresponding application in according with a default instrumentation configuration;
   (D) successfully receiving the modified instrumentation configuration from the instrumentation configuration repository;
   (E) in response to the success, instrumenting the first corresponding application in according with the modified instrumentation configuration; and
   (F) at the first agent, storing the received modified instrumentation configuration.

9. A computer-implemented method for monitoring performance of execution threads in a distributed computing environment, comprising:
   detecting, by a sensor, start of execution of a given method, where the sensor is instrumented in the given method which is executed by a given thread and the sensor is executed by a computer processor of a computing device;
   determining, by the sensor, whether the given thread is registered with a sampling agent;
   registering, by the sensor, the given thread with the sampling agent in response to a determination that the given thread is not registered with the sampling agent, where the given thread is registered by adding the given thread to a listing of threads;

cyclically fetching, by the sampling agent, stack data from a call stack for threads contained in the listing of threads during execution of the given method, where the stack data is a sampling of methods executed by the threads contained in the listing of threads at a given points in time and call relationships between the sampled methods according to their nesting level;

detecting, by the sensor, end of execution of the given method by the given thread; and unregistering, by the sensor, the given thread with the sampling agent by removing the given thread from the listing of threads, where the given thread is unregistered in response to detecting the end of execution of the given method by the given thread.

10. The computer-implemented method of claim 9 further comprises determining whether the given thread is registered by querying a data store maintained by the sampling agent, where the data store includes the listing of threads registered with the sampling agent.

11. The computer-implemented method of claim 9 further comprises determining whether the given thread is registered by determining if the given method execution is nested within execution of another method that is instrumented with a sensor, and registering the given method with the sampling agent in response to detecting the start of execution of the given method and the determination that the given method is not nested within the execution of another method that is instrumented with a sensor.

12. The computer-implemented method of claim 11 further comprises determining if the given method execution is nested within execution of another method that is instrumented with a sensor by querying a tag node stored locally on the computing device, where the tag node maintains relationships between methods that are instrumented with a sensor and that are executed by the given thread.

13. The computer-implemented method of claim 9 further comprises:

acquiring, by the sensor, performance data for the given method;

tagging, by the sensor, the performance data with tracing tag data, where the tracing tag data identifies the given method and the given thread;

sending, by the sensor, the tagged performance data to a correlation engine.

14. The computer-implemented method of claim 13 further comprises tagging, by the sampling agent, the fetched stack data with sampling tag data, where the sampling tag data identifies the given method and the given thread;

sending, by the sampling agent, the tagged stack data to the correlation engine.

15. The computer-implemented method of claim 13 further comprises receiving, by the correlation engine, the tagged stack data from the sampling agent;

receiving, by the correlation engine, the tagged performance data from the sensor;

extracting, by the correlation engine, statistical data from the received tagged stack data, where the statistical data is a statistical distribution of methods called by the given method on the given thread;

determining, by the correlation engine, if the tracing tag data and the sampling tag data match;

in response to a match, correlating, by the correlation engine, the tagged performance data with the statistical data.

16. The computer-implemented method of claim 15 wherein correlating the tagged performance data with the tagged statistical data includes allocating a portion of a performance metric for the given method to one or more methods identified in the stack data for the given thread, where the allocation is according to the statistical distribution of methods called by the given method.

17. The computer-implemented method of claim 15 further comprises sending the tagged performance data and the tagged stack data over a computer network to the correlation engine, where the correlation engine is located remotely from the computing device.

* * * * *